United States Patent [19]

Beth et al.

[11] 3,811,015

[45] May 14, 1974

[54] SWITCHING SYSTEMS WITH SPECIAL CUSTOMER SERVICE

[75] Inventors: Ronald Valentine Beth, Reynoldsburg; John Mason Catterall, Columbus, both of Ohio

[73] Assignee: Bell Telephone Laboratories, Incorporated, Murray Hill, N.J.

[22] Filed: Oct. 27, 1972

[21] Appl. No.: 301,370

[52] U.S. Cl. .......... 179/18 BG
[51] Int. Cl. .......... H04m 3/42
[58] Field of Search .......... 179/18 BG

*Primary Examiner*—William C. Cooper
*Attorney, Agent, or Firm*—S. N. Turner

[57] ABSTRACT

A marker controlled crossbar telephone switching system provides call waiting service to special customer lines by attaching call waiting circuits to the lines through a crossbar switch link. Lines terminate on verticals of the link and call waiting circuits terminate on all levels (horizontals) of the link except level zero. Each line is connected to its usual system line terminal through contacts of the unoperated hold magnet for that link vertical. When the hold magnet is operated, the line is connected either (a) to its line terminal through crosspoints controlled by the select magnet for level zero or (b) to a call waiting circuit through crosspoints controlled by the select magnet for the level corresponding to that call waiting circuit. Also, when a select magnet for a call waiting circuit and a hold magnet for a line are operated, the call waiting circuit is also connected through crosspoints controlled by its corresponding select magnet to the line terminal of the line corresponding to the operated hold magnet. The call waiting circuits also terminate in system terminals assigned thereto. Whenever any line is connected to its line terminal over crosspoints of level zero no call waiting circuit may be attached thereto. Whenever any line is connected to its line terminal over contacts of its unoperated hold magnet a call waiting circuit may be attached thereto by means of crosspoints of the level corresponding to that call waiting circuit.

14 Claims, 43 Drawing Figures

BLOCK DIAGRAM

FIG. 1 BLOCK DIAGRAM

CALL WAITING LINK (CWL)

FIG. 3
LEVEL 00 LINKAGE
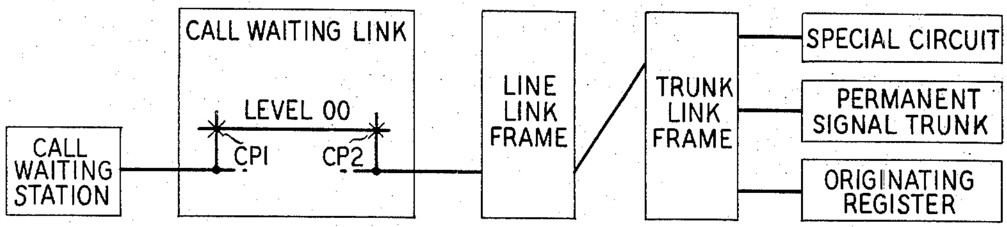
FIG. 4
NON-CALL WAITING LINKAGE
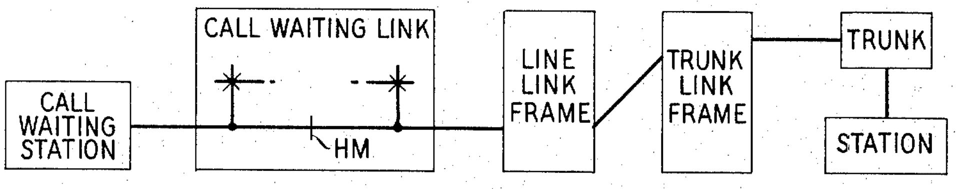
FIG. 5
CALL WAITING LINKAGE
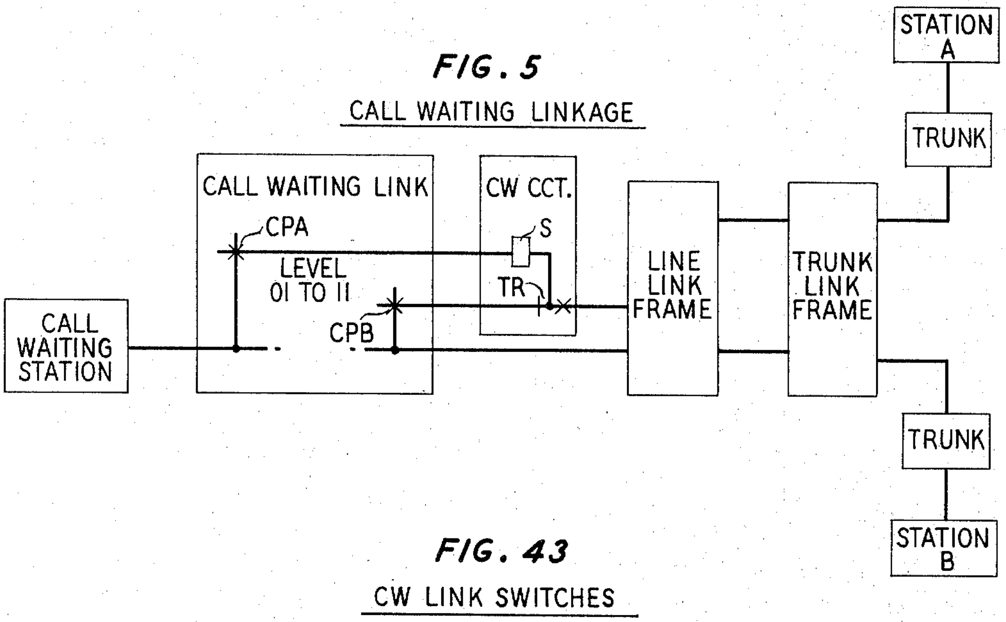
FIG. 43
CW LINK SWITCHES
| | | | |
|---|---|---|---|
| FIG. 6 | FIG. 8 | FIG. 10 | FIG. 12 |
| FIG. 7 | FIG. 9 | FIG. 11 | FIG. 13 |

PATENTED MAY 14 1974

3,811,015

SHEET 06 OF 39

CW LINK SWITCHES

PATENTED MAY 14 1974 3,811,015

SHEET 08 OF 39

CW LINK SWITCHES

CW CCT 01
(SUPERVISION CONTROL)

FIG. 16 CW CCT 01 (TRANSFER CONTROL)

CW CCT 01
(TIMING & CONTROL)

CW LINK - TRANSLATION & LINE PREFERENCE

CW LINK - TRANSLATION & LINE PREFERENCE

CW LINK - TRANSLATION & LINE PREFERENCE

CW LINK - TRANSLATION & LINE PREFERENCE

CW LINK-CW CCT PREFERENCE

CW LINK-CW CCT PREFERENCE

CW LINK-SELECT MAGNET OPERATION

CW LINK - HOLD MAGNET OPERATION & CIRCUIT BUSY

CW LINK-HOLD MAGNET OPERATION

LINE LINK MARKER CONNECTOR

LINE LINK CONNECTOR

MARKER

MARKER

MARKER

MARKER

SWITCHING SYSTEMS WITH SPECIAL CUSTOMER SERVICE

BACKGROUND OF THE INVENTION

The field of the invention is generally switching systems for interconnecting customer lines and for providing special services to special service customer lines. More particularly, the invention relates in its narrower context to providing call waiting service to call waiting customers in a telephone switching system.

In this field, special services have been provided in many forms and by many circuit arrangements, including the type of arrangement whereby special service circuits may be selectively attached to or detached from special service customer lines as needed under the control of special switching links. For instance, in the call waiting service area, some arrangements require a call waiting circuit to be involved in every connection completed to or from a call waiting customer line, thus requiring a call waiting circuit to be dedicated to each call waiting line; whereas, other arrangements provide switching means, such as a special service switching link, for attaching a call waiting circuit to a line only when needed for that particular service and for detaching the call waiting circuit when its services are no longer required. In the latter arrangements a more efficient use may be made of such special circuits.

The invention relates to such arrangements as those mentioned above wherein the selective attaching and detaching of special service circuits is employed under the control of a special service switching link.

In the above outlined field of selectively attaching and detaching special service circuits, such as call waiting circuits for call waiting customer lines, there occur from time to time and to or from such lines certain connections during the existence of which it is not desirable to allow the attachment of special service circuits. For instance, in the call waiting area, whenever a call waiting customer line is involved in a so-called dial tone connection it is undesirable to allow control circuitry to be able to attach a call waiting circuit to that line since such control action might interfere with the signaling which is or should be taking place during the initiation of a call from such a line. Also, whenever such a line might be involved in a permanent signal connection (to a permanent signal trunk for instance) due to a customer having failed to initiate or to complete signaling during a dial tone connection, it is undesirable to allow attachment to that line of a call waiting circuit. There are other connections to or from a line, such as certain test connections, whereunder it is also not desirable to allow the attachment thereto of a call waiting circuit.

Such situations as the above, whereunder it is undesirable to allow attachment of special service circuits, have been referred to as situations requiring so-called dialing protection since a dial tone connection is the most frequently occurring of such connections. The provision of dialing protection however also covers those other certain connections which may require the same type of protection.

Dialing protection has been provided in the prior art generally by the provisions in one or more of the circuits (the line circuit, the special service circuit, etc.) of some form of memory registration to indicate the status of a connection. Such memory registration in a special service switching system using a selectively controllable special service circuit switching link is illustrated by the disclosure of U.S. Pat. No. 3,584,156 to R. V. Beth of June 8, 1971. Such arrangements as Beth are quite adequate functionally and structurally so long as one is satisfied to provide the protection on a memory registration basis in one or more of the connected or attached circuits. To do the latter, however, may not be the most advantageous solution of the dialing protection problem in all situations.

The present invention solves the dialing protection problem in a different way by eliminating the necessity of memory registration in one or more of the connected or attached circuits. Since the present invention relates to the special service area wherein the selective attachment and detachment of special service circuits is under the control of a special service switching link, the dialing protection feature has been provided as part of the switching link itself, thus removing from the attached or connected circuits themselves the additional burden of the memory registration.

SUMMARY OF THE INVENTION

The invention is an improvement in a switching system, such as Beth, having special service customer lines, special service circuits, the usual switching network line terminals for such lines, a selectively settable special service switching link terminating the lines and the special circuits and the network line terminals, and control means (A) effective under normal service conditions to cause one of a number of normal settings of the link whereby a line is normally connected to its network line terminal without being connected to a special service circuit and (B) effective under a special service condition to cause one of a number of special settings of the link whereby a line is specially connected to its network line terminal and to a special service circuit.

In the above prior art context, the improvement of the present invention comprises (1) means in the control means effective upon the occurrence of different types of normal service conditions to cause different types of normal settings of the link and (2) means in the control means effective upon the occurrence of a special service condition with respect to a normally connected line to change the normal link setting to a special link setting but only if the normal setting is a particular one of the different types.

Particularly, in such a system using a crossbar switch call waiting link terminating lines on verticals and call waiting circuits on all levels (horizontals) other than level zero, the invention provides means for using level zero on the link for the above particular one type of normal link setting. Whenever a line is involved in such a level-zero connection, the control circuitry is prevented from attaching a call waiting circuit thereto. Another normal setting of the link might exist when a line is connected to its network line terminal without using any level of the link, permitting the control circuitry to attach to that line, if required, a call waiting circuit.

Other aspects of the invention will be apparent from the subsequent description of an exemplary embodiment thereof.

BRIEF DESCRIPTION OF THE DRAWING

The drawing consists of FIGS. 1 through 42 on 39 sheets and described briefly as follows:

FIGS. 3, 4, and 5 show respectively single-line functional diagrams illustrating three basic settings of the call waiting link, namely a level 00 (zero) linkage, a noncall waiting linkage and a call waiting linkage.

Figure 1:
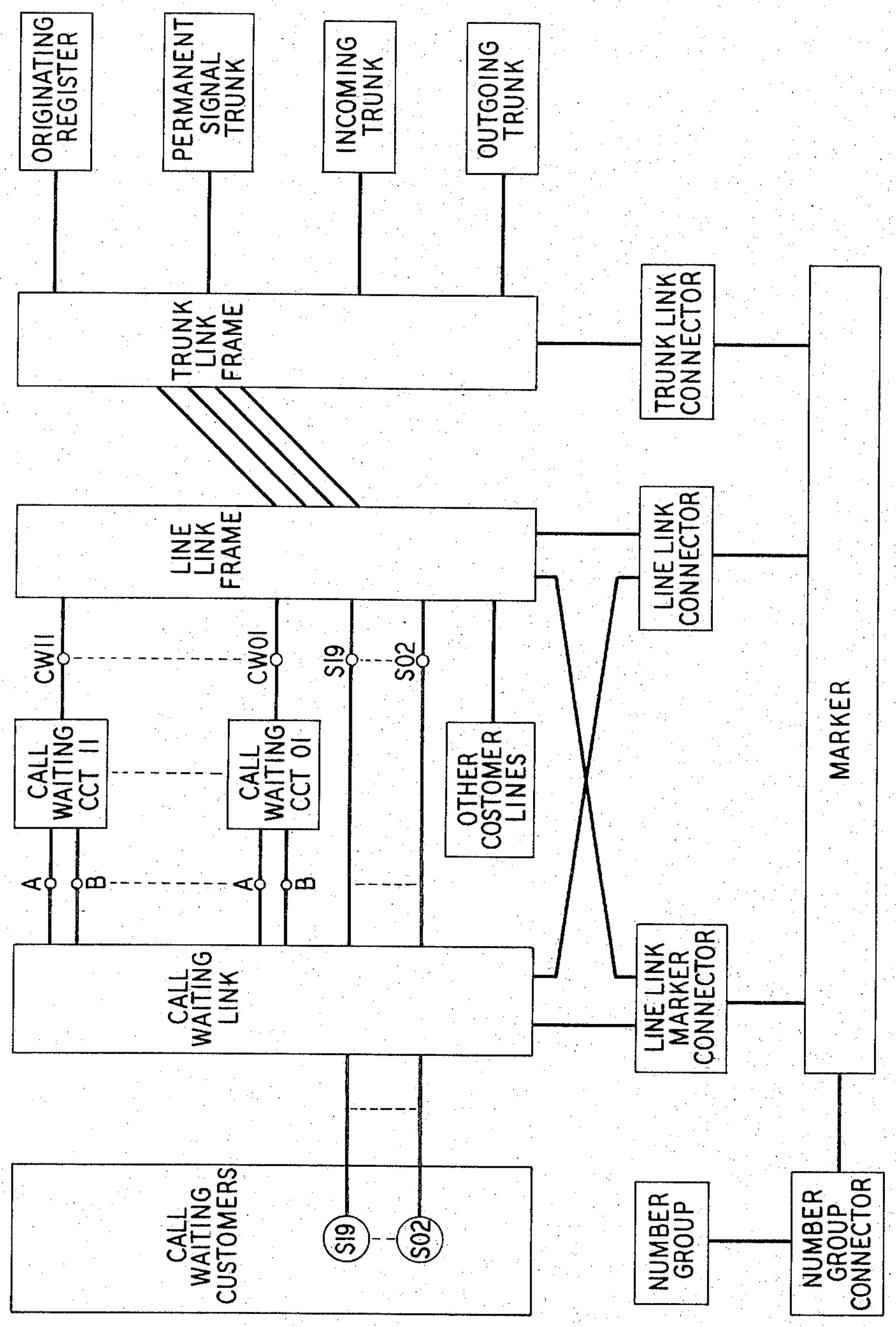
FIG. 1 is a block diagram showing the main functional parts of the well-known Bell System No. 5 Crossbar telephone switching system with a call waiting link and a number of call waiting circuits interposed between the call waiting link and the line link frame, the usual line terminating network of the switching system.

And, FIGS. 32 through 42 show those parts of a No. 5 Crossbar system marker circuit helpful in explaining the illustrative embodiment.

ARRANGEMENT OF DISCLOSURE

The rest of the disclosure is arranged under a number of main sections and sub-sections having the following headings:

PRIOR ART CONTEXT

Symbols and Conventions

Signal Potentials
Crossbar Switch Crosspoints
Relay Contacts
Repeated Circuit Parts
Dotted Lines
Cabling
Old and New Circuitry
Reference Characters Detailed Description Block Diagram (FIG. 1)
Call Waiting Link (FIGS. 2 and 6 through 13)
Linkage Diagrams (FIGS. 3, 4 and 5)
Basic Control Between Marker and Line Link Frame Establishing Dial Tone Connection — Generally
Completing Dial Tone Connection — Non-Call Waiting Line
Completing Dial Tone Connection — Call Waiting Line
Trouble Conditions — CW LK — Dial Tone Job
Establishing Originating Connection — Intraoffice Call
Establishing Originating Connection — Outgoing Call
Establishing Permanent Signal Connection
Attempting Terminating Connection — Generally
Attempting Terminating Connection — Level Zero Connection Existing
Terminating Connection to Idle Line
Attaching Call Waiting Circuit to Line Busy on Usual Line Link Terminal — Not Level Zero of CW LK Irregularities During Call Waiting Link Attachment Transfers Between Call Waiting Parties
On-Hook Disconnect by Customer S02
Disconnect by Parties Other than Customer S02
Miscellaneous Considerations

PRIOR ART CONTEXT

The exemplary embodiment of the invention is disclosed as a modification to the well-known Bell System No. 5 Crossbar telephone switching system, an early version of which is fully disclosed in U.S. Pat. No. 2,585,904 to A. J. Busch of Feb. 19, 1952. Since the No. 5 Crossbar system (herein referred to as Busch) is so well known only sufficient details thereof are shown and described herein as are considered helpful in understanding how the exemplary embodiment of the invention may be practiced in that context. Busch is referred to from time to time as an example of such a prior art environment. It will be apparent to those skilled in the art that the invention may be applied to other particular switching systems, which may not necessarily be switching systems for telephone use especially.

SYMBOLS AND CONVENTIONS

Before getting into details of circuit operation it is considered helpful to explain certain symbols and circuit conventions as used herein.

SIGNAL POTENTIALS

Basically, central office battery is used for the power supply. A circle with a minus sign therein indicates the negative terminal of a battery supply, the positive terminal of which is assumed to be grounded, as indicated by the usual symbol for ground. A circle with a plus sign therein indicates the positive terminal of a battery supply whose negative terminal is assumed to be grounded. Battery potential is assumed to be 48 volts direct current unless otherwise shown.

Figure 14:
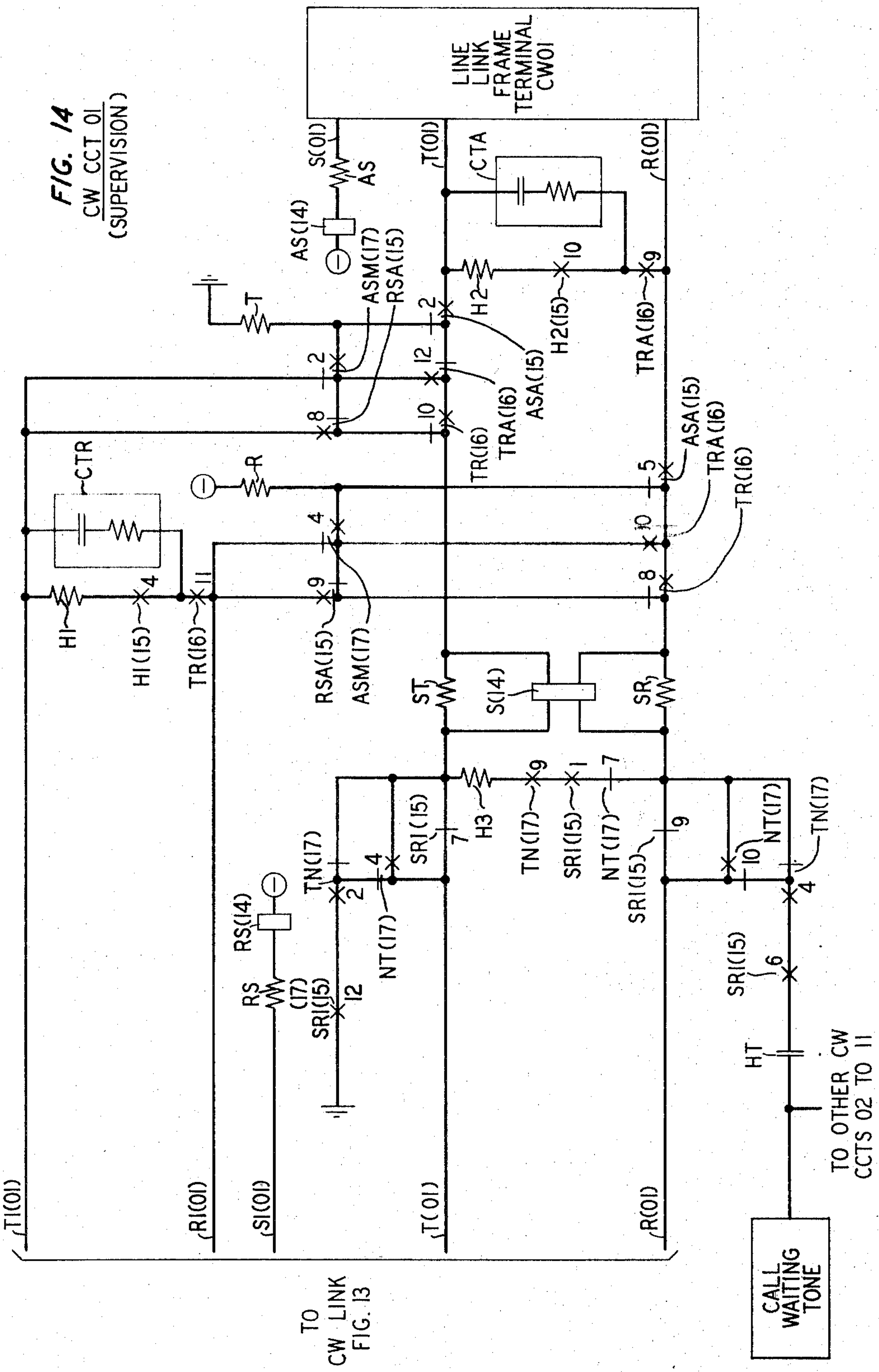
FIGS. 14 through 17 show the details of one complete call waiting circuit 01 terminated on level 01 of the call waiting link.

In one instance a well-known signal source is shown as a box, namely the call waiting tone source in the lower left corner of FIG. 14.

CROSSBAR SWITCH CROSSPOINTS

As is well known, a crossbar switch has a number of vertical wires and a number of level (horizontal) wires arranged in a coordinate array so that under control of a select magnet per level and a hold magnet per vertical those vertical and level wires corresponding to that set of two magnets may be connected together at what is referred to in the art as a crosspoint. For instance, in FIG. 13 is shown part of vertical 19 and parts of levels 00 and 01 of the crossbar switch call waiting link of FIGS. 6 through 13. One vertical and one level consist of six wires each. The crosspoint is shown as a series of six crosses where the vertical and level wires intersect on the diagram. When a select magnet, such as SM01(27) in FIG. 13, is operated, followed by the operation of a hold magnet, such as HM19(28) in FIG. 13, the crosspoint is closed at the coordinate location corresponding to those two magnets. In FIG. 13, the crosspoint involved is in the upper part of the drawing and includes the six symbols marked 0,1,2,3,4 and 5.

RELAY CONTACTS

The so-called detached schematic type of relay contact arrangement is used herein, where the contacts controlled by a relay winding are not necessarily shown as physically associated with the winding. For instance, in FIG. 15 the winding for relay ASA(15) is shown in the lower right corner while contacts controlled by that winding appear in FIGS. 14, 15 and 17. However, as will be explained later, each contact is given a reference character which fully identifies its relationship to its controlling relay winding.

Figure 15:
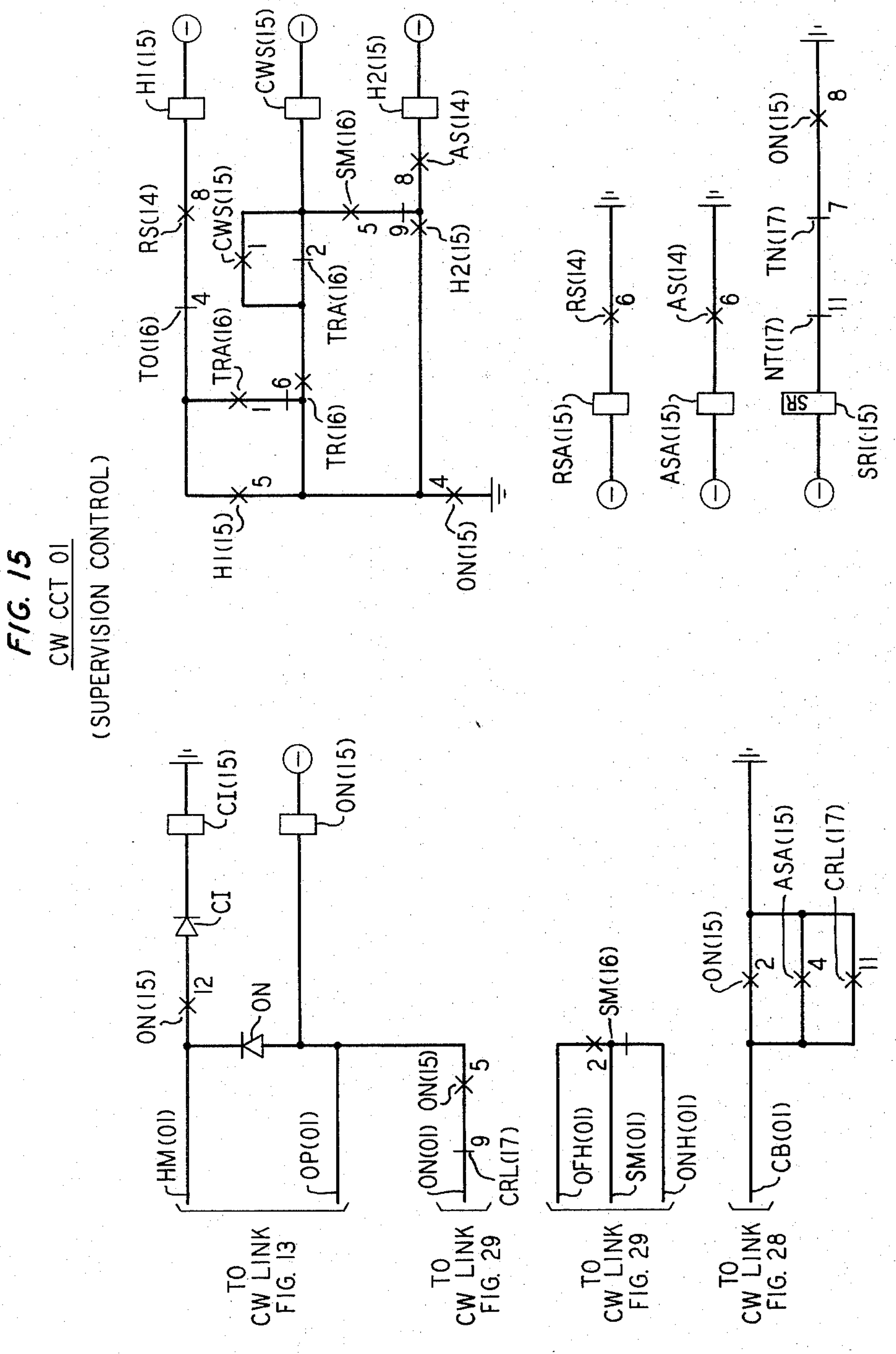

A make or front contact (opened when the relay is released and closed when the relay is operated) is shown as a cross on a circuit lead, such as in the lower right corner of FIG. 15 for the make contact number 8 of relay ON(15). A break or back contact (closed when the relay is released and opened when the relay is operated) is shown as a short line across a circuit lead, such as in the lower right corner of FIG. 15 for the break contact number 7 of relay TN(17). A transfer contact is shown as a pair of make and break contacts, such as in the lower left corner of FIG. 15 for the transfer contact number 2 of relay SM(16) or as in the upper right corner of FIG. 15 for the transfer contact number 9 of relay H2(15), and so forth.

REPEATED CIRCUIT PARTS

Figure 2:
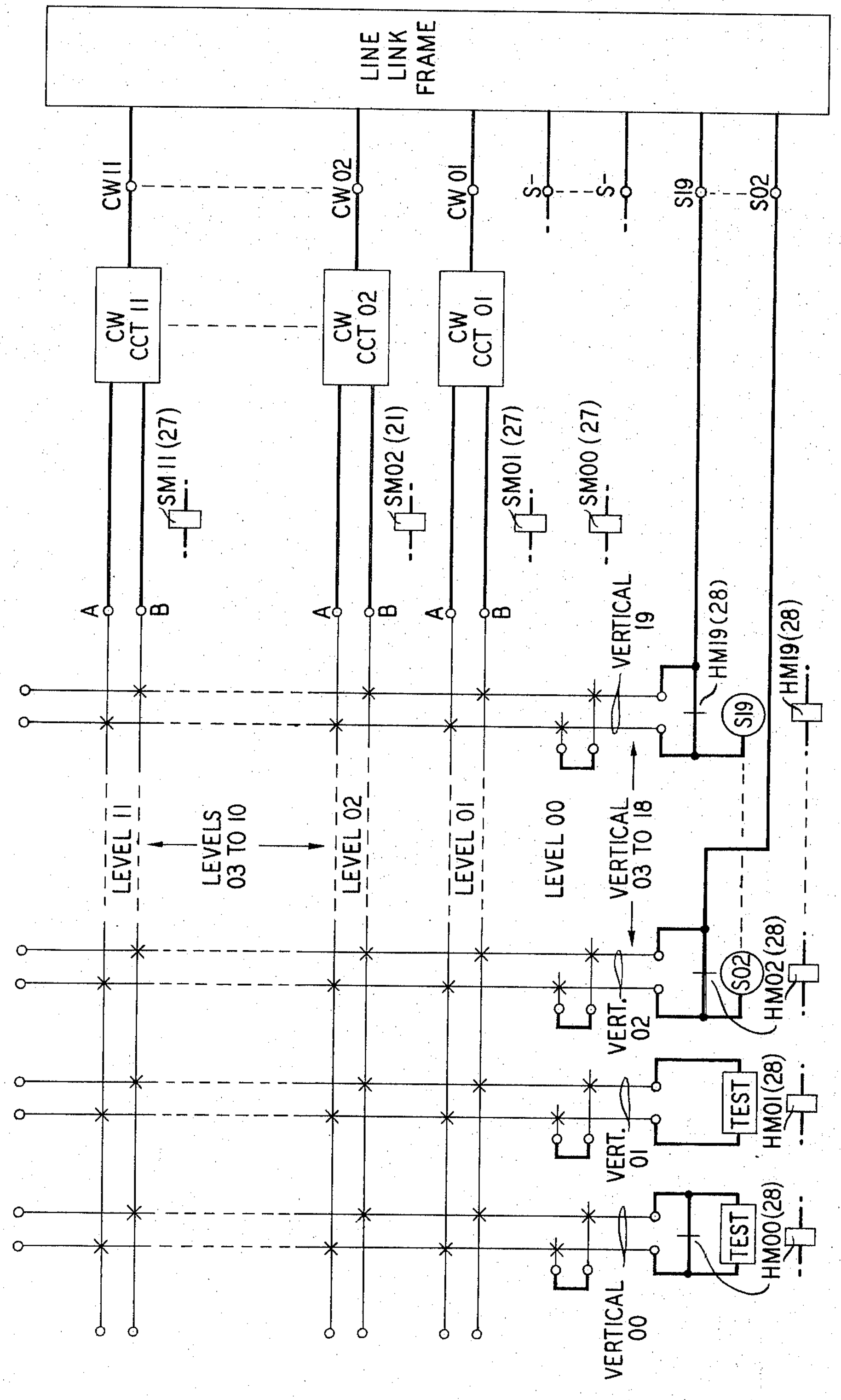
FIG. 2 is a skeletonized functional showing of the general arrangement of the call waiting link and of the relationship thereto of the call waiting customer lines, the call waiting circuits, and the line link frame.
Figure 6:
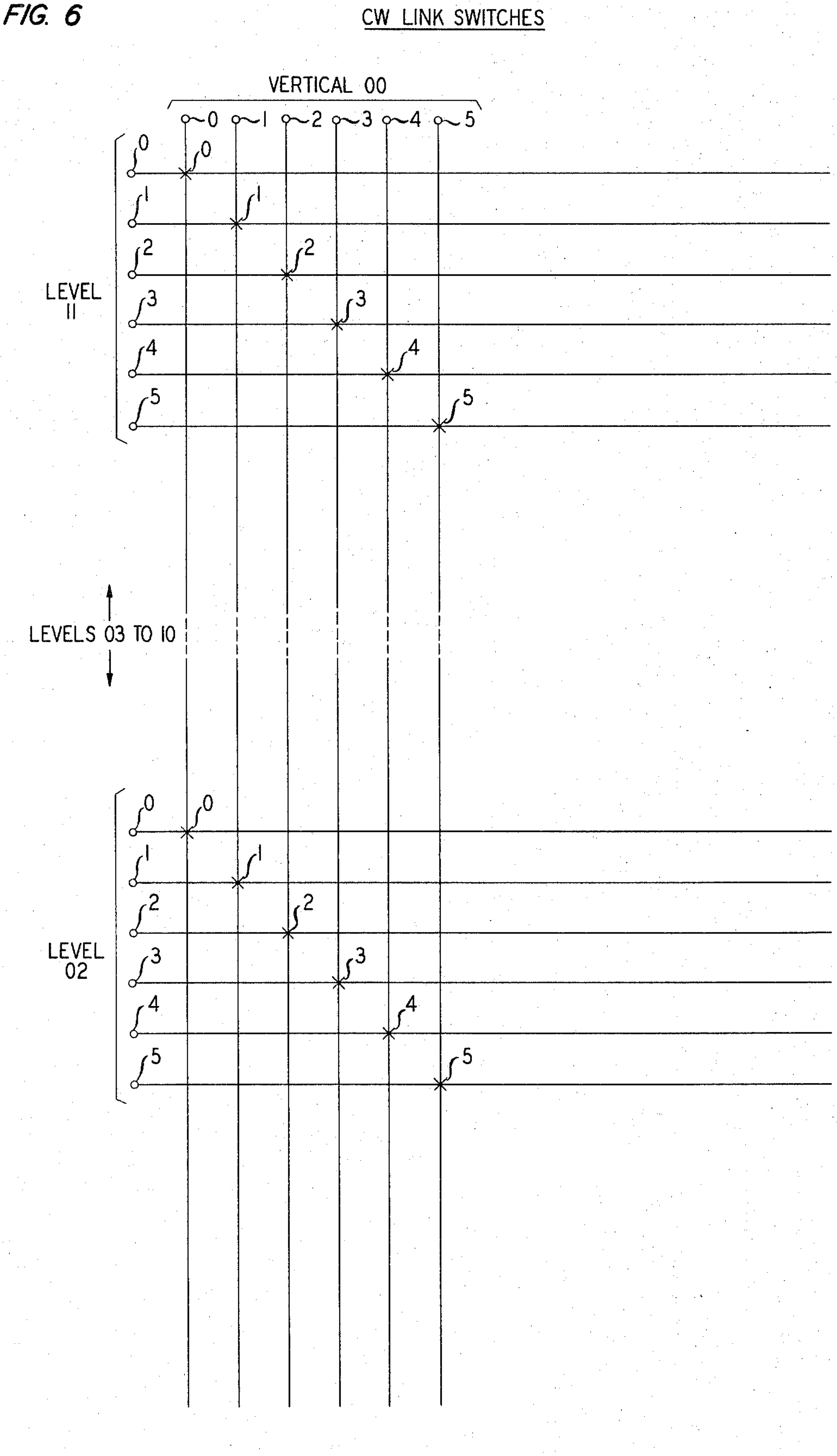
FIGS. 6 through 13, arranged as shown in FIG. 43 (on same sheet as FIGS. 3, 4 and 5), show details of the call waiting link consisting of a 6-wire, 20-vertical, 12-level crossbar switch link terminating up to 18 call waiting customers S02 to S19 on verticals 02 to 19 (verticals 00 and 01 may be reserved for test purposes) and terminating up to 11 call waiting circuits 01 to 11 on levels 01 to 11 (level 00 or zero is reserved for dialing protection control).
Figure 16:
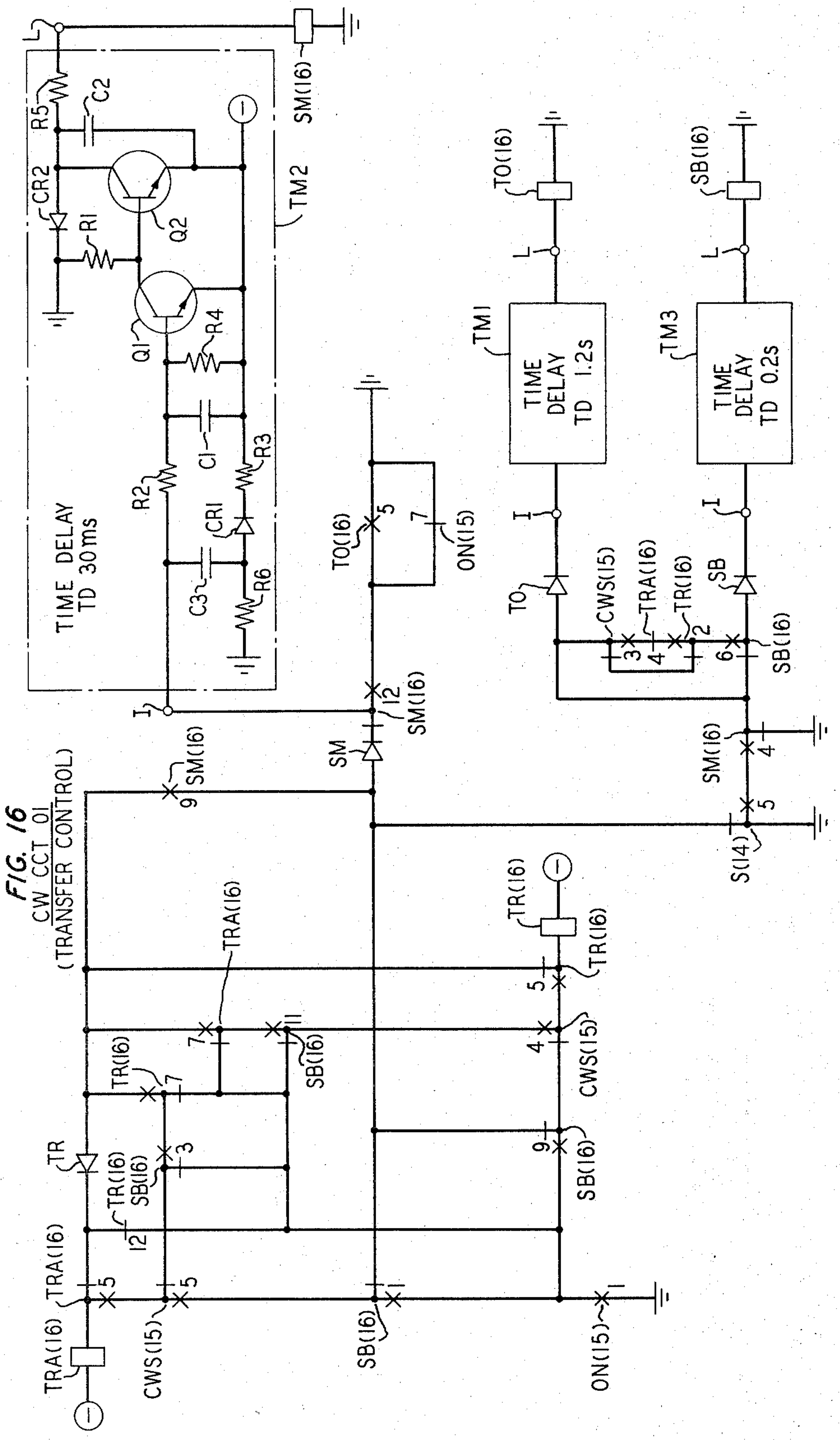

In some instances where a circuit part appears more than once, the details of one such circuit are shown, with boxes indicating other such circuits. For instance, in FIG. 2 are shown three call waiting circuits 01, 02 and 11, FIGS. 14 through 17 showing one such circuit 01 in detail. Also, in FIG. 16 is shown in detail a time delay circuit TM2, with two other such circuits TM1 and TM3 indicated by boxes in FIG. 16 and one other such circuit TM indicated by a box in FIG. 26.

DOTTED LINES

Throughout the disclosure dotted lines are used to indicate more than one situation. As in FIG. 1, dotted lines are used to indicate the presence of (but not shown) similar circuitry, such as call waiting circuits 02 through 10, terminals CW02 through CW10, and so forth. In FIG. 2, dotted lines are used to indicate the presence of omitted circuit detail, such as the crossbar switch link verticals 03 through 18 and levels 03 through 10. As in FIG. 7, dotted lines are used to indicate parts of circuit paths wherein some undisclosed details exist but which are not significant, such as in the leads T00, R00 and S00 shown as extending to the master test control. As in FIG. 18, where a repeated circuit pattern occurs, dotted lines are used to indicate undisclosed parts of the pattern, such as for relays VGA02 through VGA04 and VGA06 through VGA12, along with their corresponding control leads VG02 through VG04 and VG06 through VG12. On FIG. 22, cross-connections between terminals are shown by dotted lines, such as the cross-connection from terminal LP02 to the terminal for vertical file 0 (VF0), horizontal group 0 (HG0) and vertical group 00 (VG00).

CABLING

Figure 7:
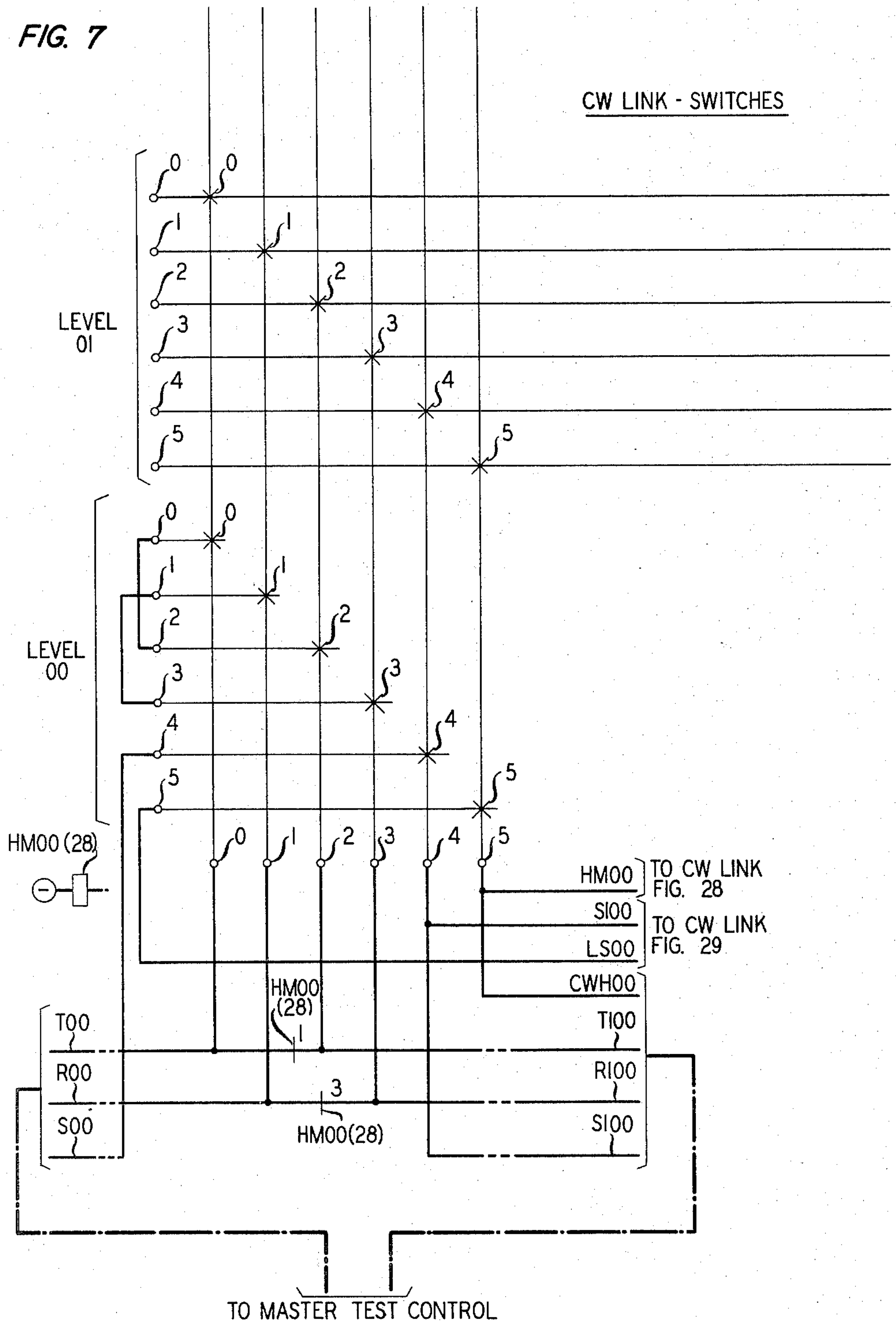
Figure 8:
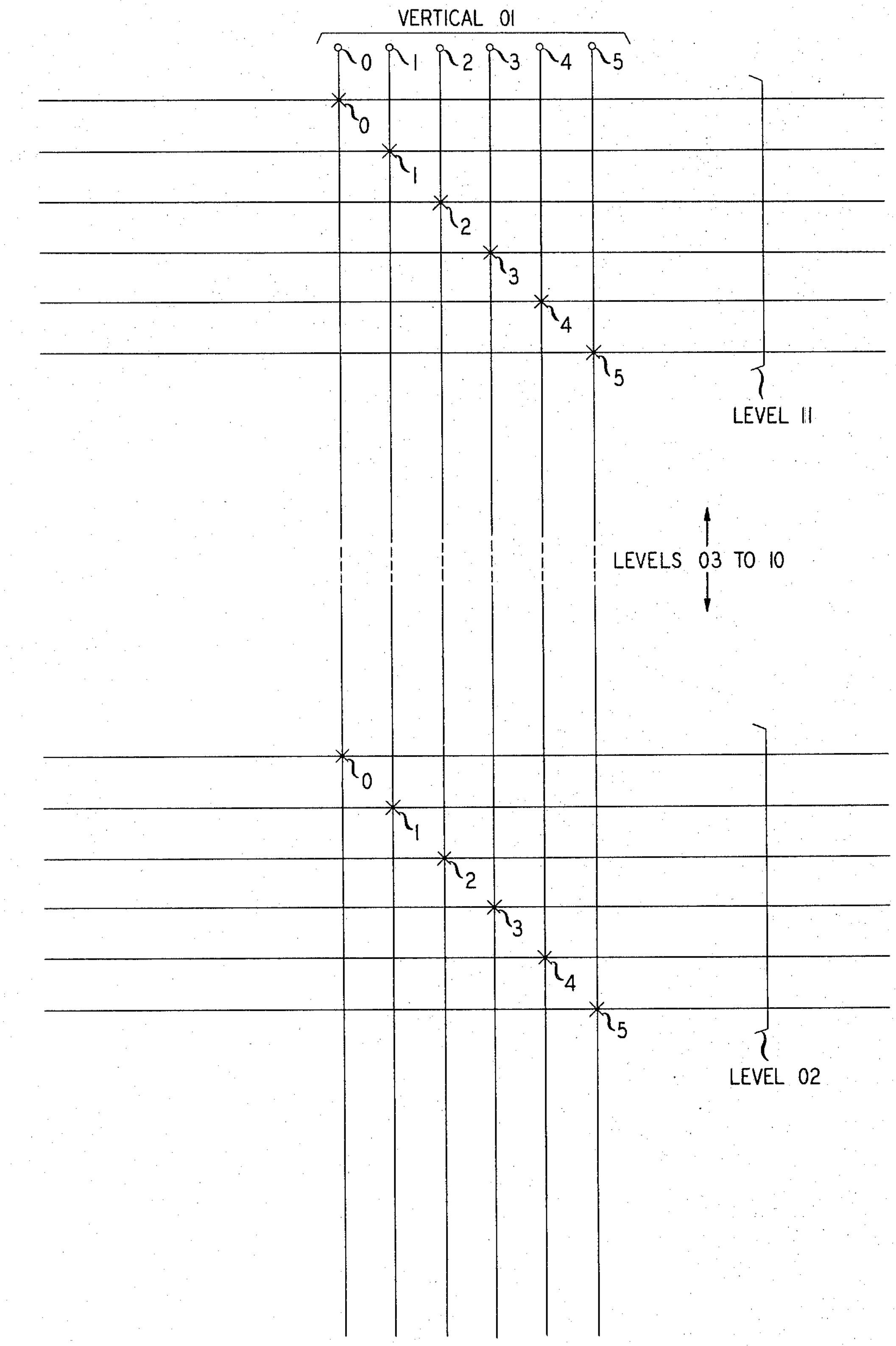
Figure 9:
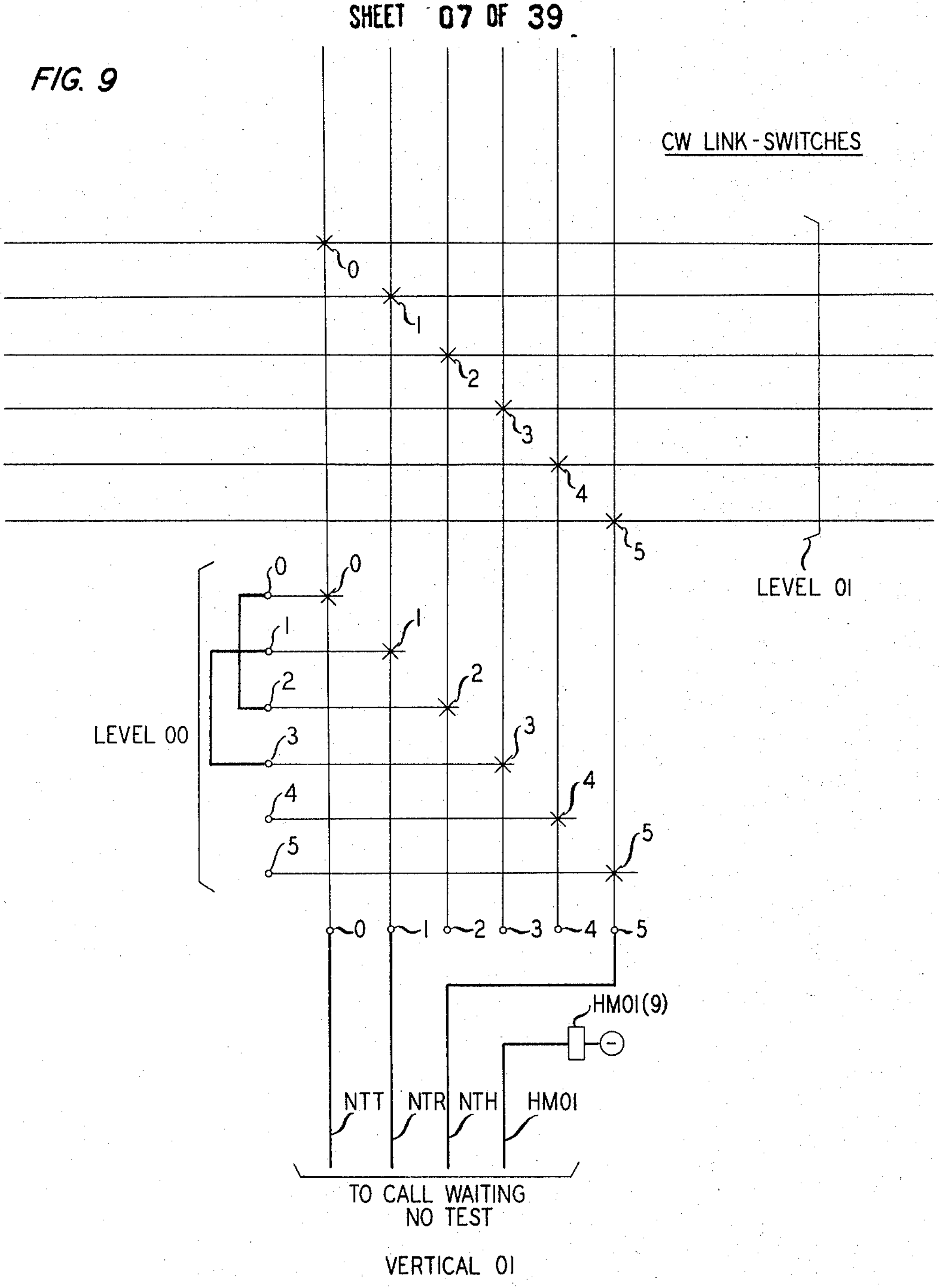
Figure 10:
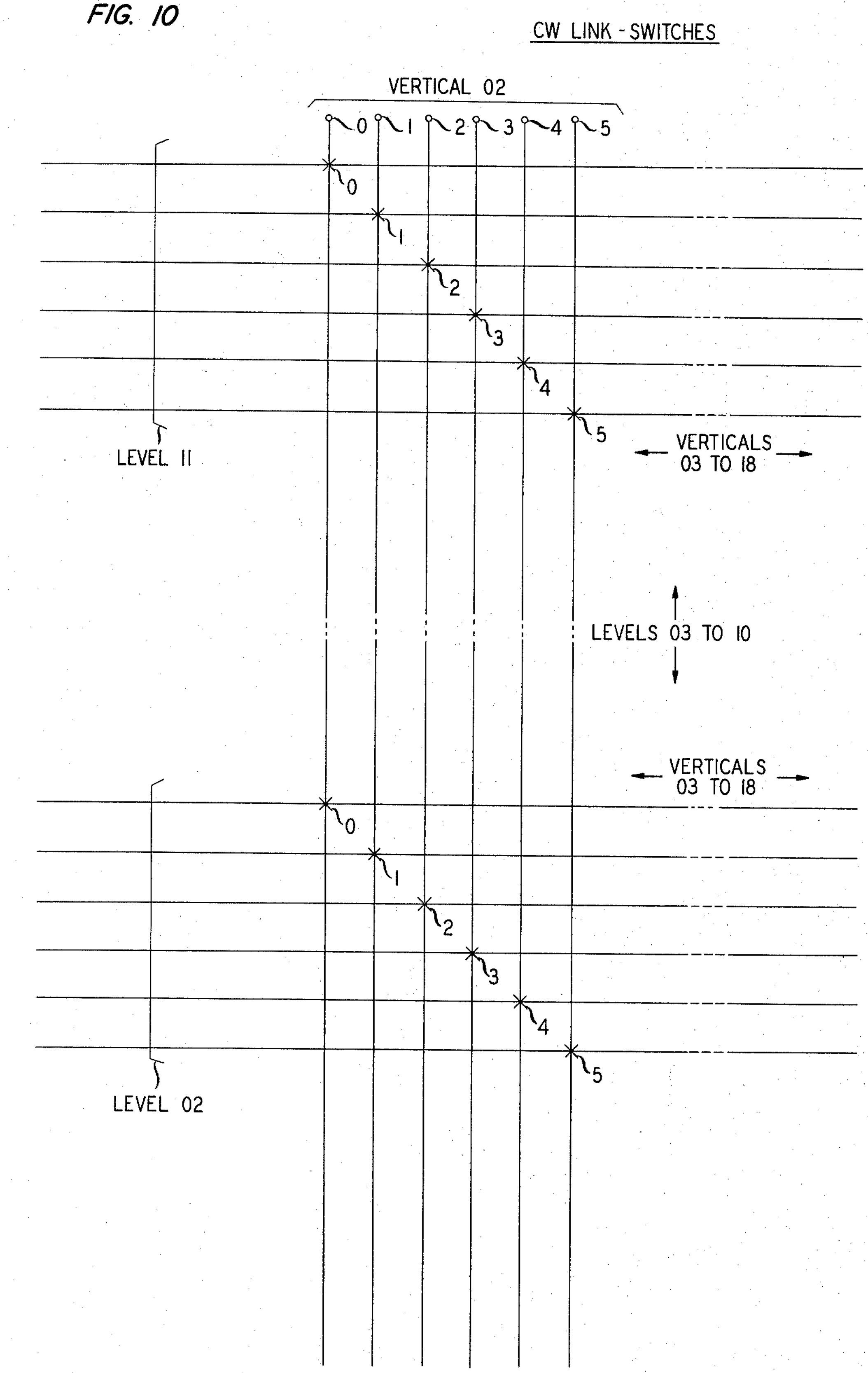

In a number of instances a plurality of leads are combined into a cable to simplify the showing. In FIG. 7, for instance, leads T00, R00 and S00 are shown entering a cable to the master test control, the cable being indicated by a line broken by short dashes. Also, in FIG. 7 leads S100 and LS00 are combined by a bracket indicating where those leads reappear, this symbol being considered equivalent to an actual cable between those two circuit locations.

OLD AND NEW CIRCUITRY

Generally, old or prior art circuitry has been shown by heavy lines and new circuitry by lighter lines. For instance, in FIG. 11, the old circuitry of subscriber line S02, as disclosed in Busch, is shown by heavy lines over the tip and ring leads T02 and R02 to its line link frame terminal and thence over tip lead T02 to ground over a break contact of the line hold magnet LH00(5)(11), over ring lead R02 and another break contact of line hold magnet LH00(5)(11) to battery through the winding of the line relay L00(5)(11), the sleeve lead S02 appearing also as extending to battery through the winding of the line hold magnet LH00(5)(11) and to other places on lead 650. It will be noted in FIG. 11 that parts of the tip and ring leads T02 and R02 have been cross-hatched to indicate that those parts of the old circuitry are to be omitted when the new circuitry (lighter lines) is added as shown.

In FIGS. 30 and 31, again heavy lines show old circuitry and light lines show new circuitry. This same arrangement is carried throughout FIGS. 32 through 42 to show where modifications are made to the marker circuit of Busch in order to embody the control necessary for proper marker operation in the exemplary embodiment of the invention. In some cases cross-hatching shows those parts of the old circuit which are to be eliminated. In other cases, new circuitry has merely been added to the old circuitry. In a few instances, such as FIGS. 37, 38 and 40, an entire sheet of marker circuitry is new.

Figure 33:
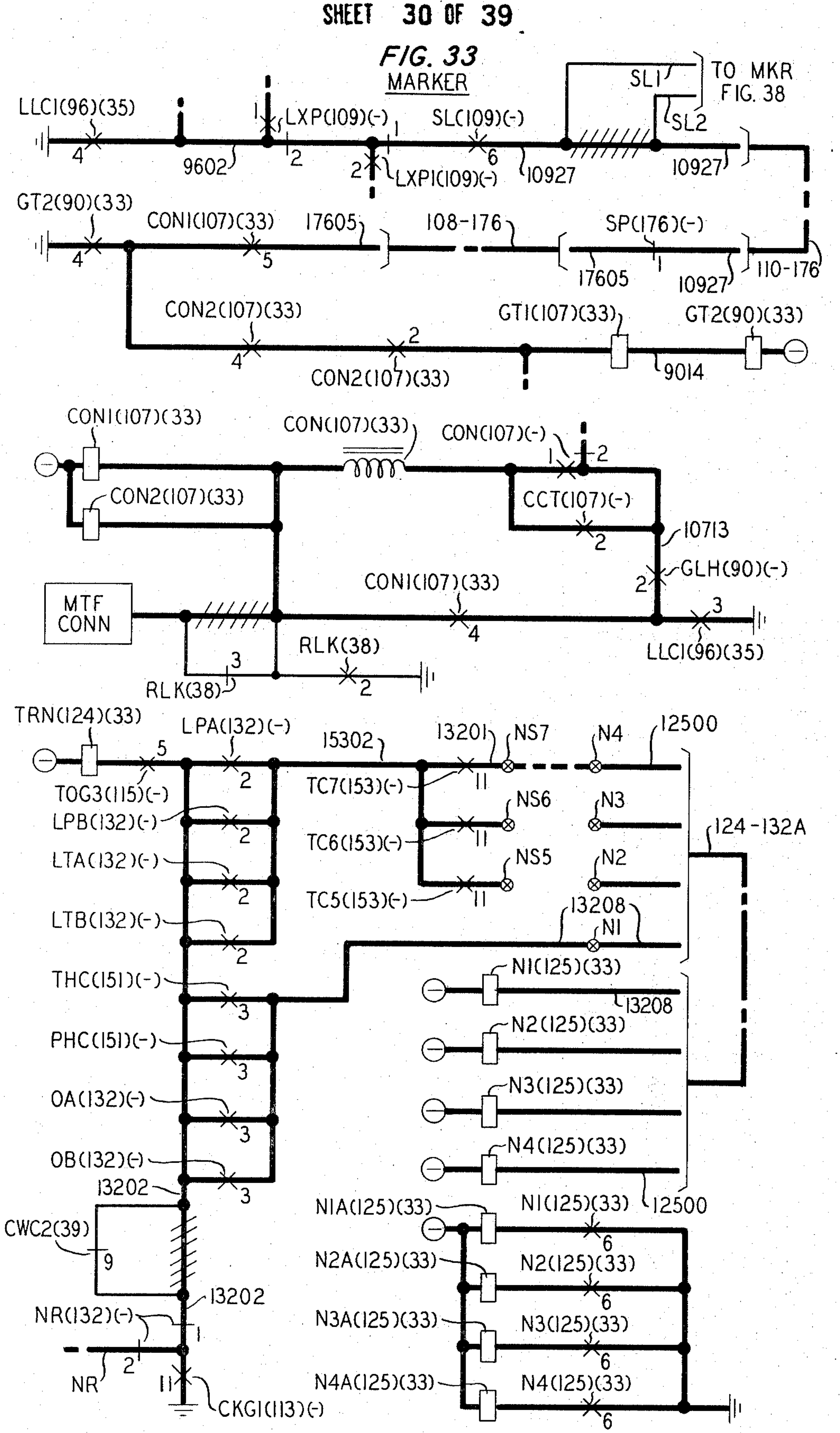
Figure 34:
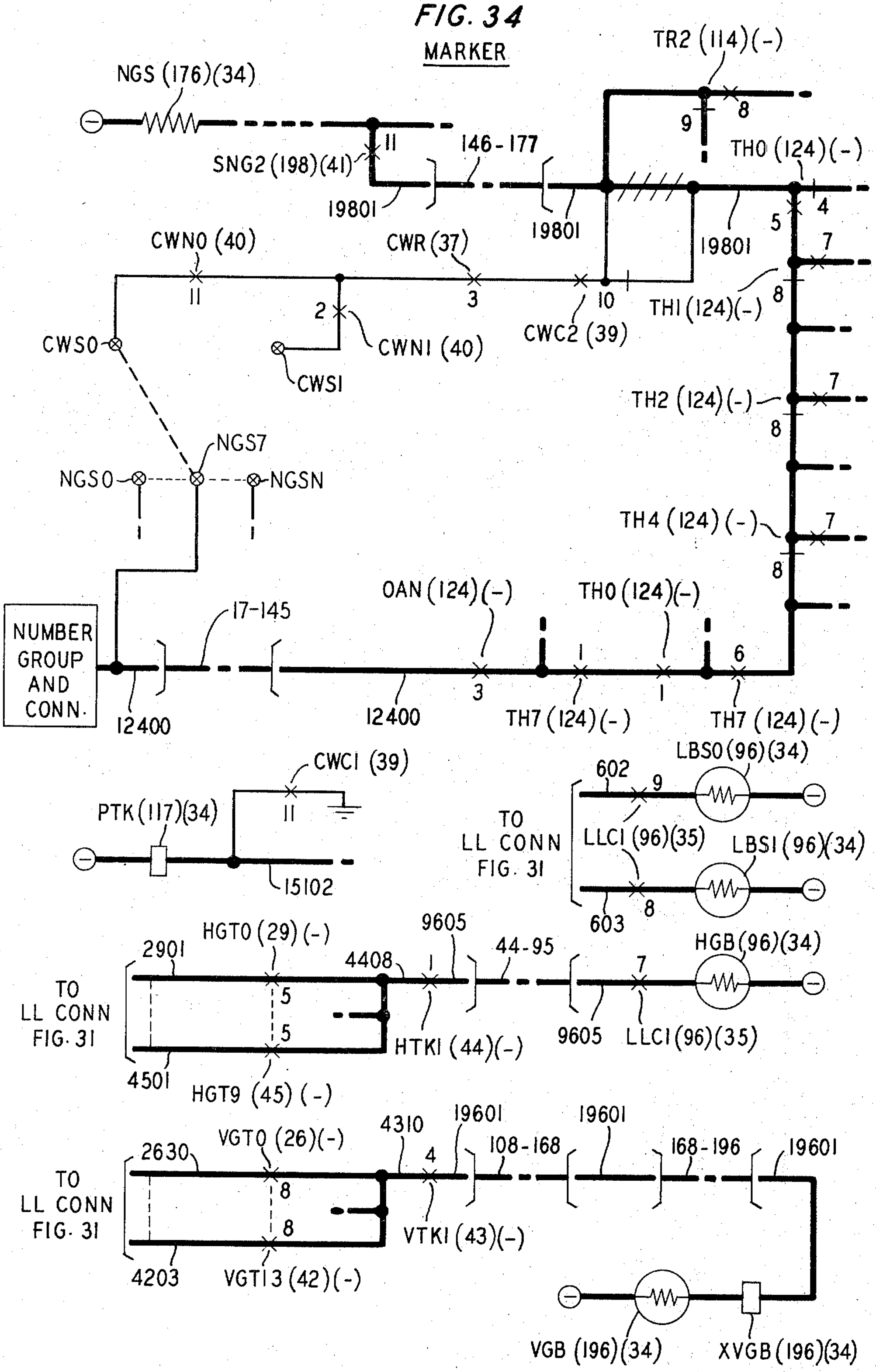
Figure 35:
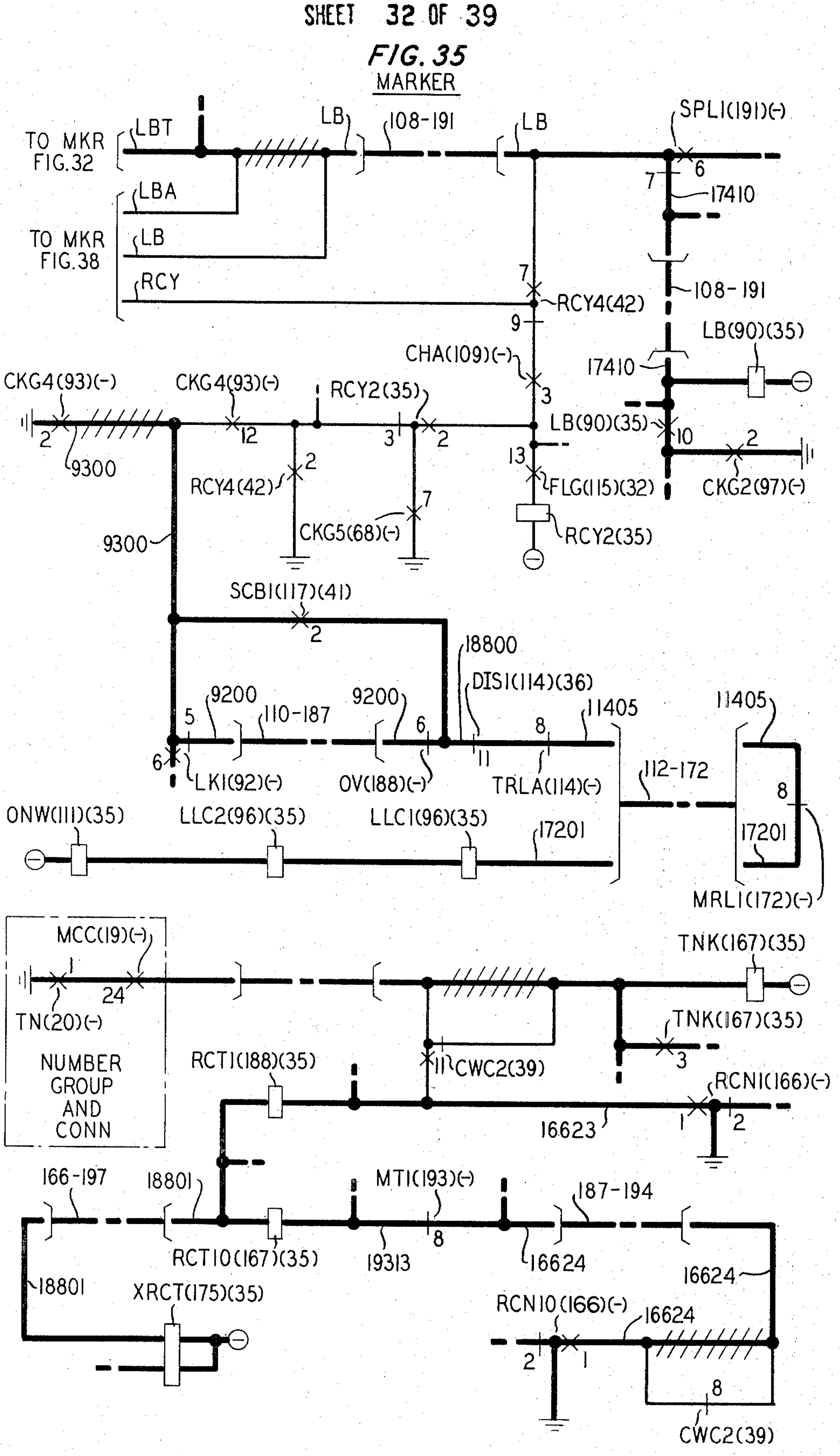

Three boxes have been shown, one each on FIGS. 33, 34 and 35, to illustrate certain circuit relationships of Busch and with respect to which details are not herein necessary. In FIG. 33, a box is shown for the master test frame connector, in FIG. 34 is indicated by a box the number group and connector, and in FIG. 35 is shown a box for the number group and connector but including two relay contacts of some interest to the subsequent detailed description.

REFERENCE CHARACTERS

A system of reference characters has been chosen as self-explanatory once the system is understood. When an old relay (as found in Busch) is shown it is given a reference character which identifies the figure number of Busch where it appears and also the figure number of the present drawing where it appears. For instance, in FIG. 32, relay DT3(76)(36) indicates by the first parenthetical number (76) that the same relay DT3 appears on FIG. 76 of Busch and by the second parenthetical number (32) that it appears on FIG. 32 of the present disclosure. When a relay, such as relay DT6(32) of FIG. 32, has only one parenthetical number (32) in its reference character, the relay does not appear in Busch but only in the present disclosure as a new relay. The same system applies to other items of apparatus such as resistors VGB(196)(34) in FIG. 34 and LBS2(32) in FIG. 32. When a relay contact is shown for an old relay appearing in Busch, such as relay LLC1(96)(35), the contact may already exist in the Busch circuitry such as make contact 4 of relay LLC1(96)(35) shown in the upper part of FIG. 33 as part of the old circuitry (heavy line) or the contact may be an additional one such as make contact 12 of relay LLC1(96)(35) shown in the upper part of FIG. 32. The old contact will carry the same contact number as in Busch; whereas, the new contact number will be a contact number unused in Busch.

Figure 32:
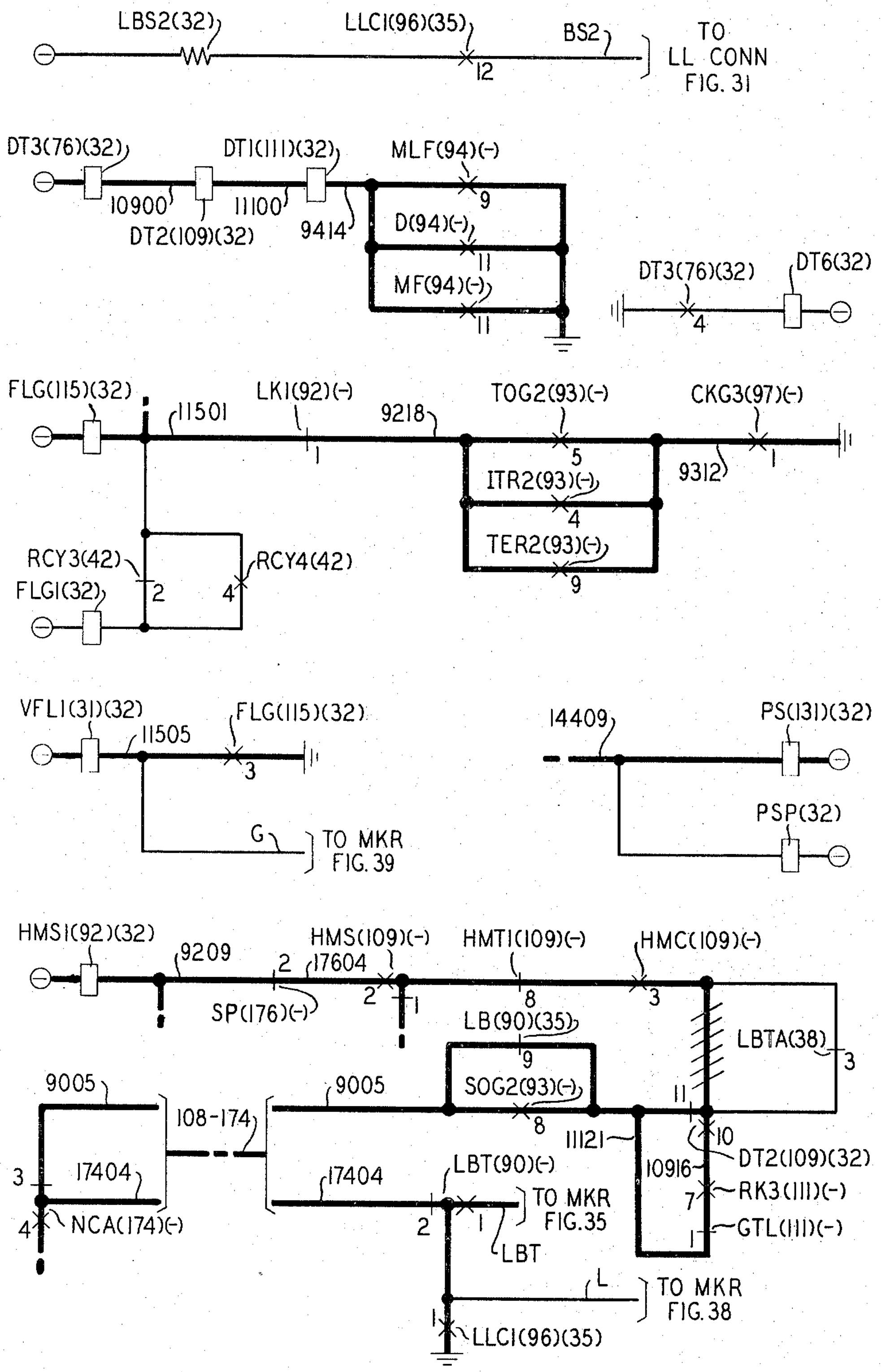

In a large number of instances, a contact (old or new) of an old relay of Busch may be shown such as in the upper part of FIG. 32 where make contact 9 of relay MLF(94)(-) is shown in the circuit for relays DT1(111)(32), DT2(109)(32) and DT3(76)(32). The first parenthesis (94) indicates that the winding of relay MLF appears on FIG. 94 of Busch and the second parenthesis (-) with a dash indicates that the winding of relay MLF does not appear on the present circuitry. It is considered not necessary to complicate the present disclosure by including the control winding circuitry of certain relays of the prior art (Busch) unless the new circuitry in some way affects or is affected by the operation or release of such relays.

Figure 31:
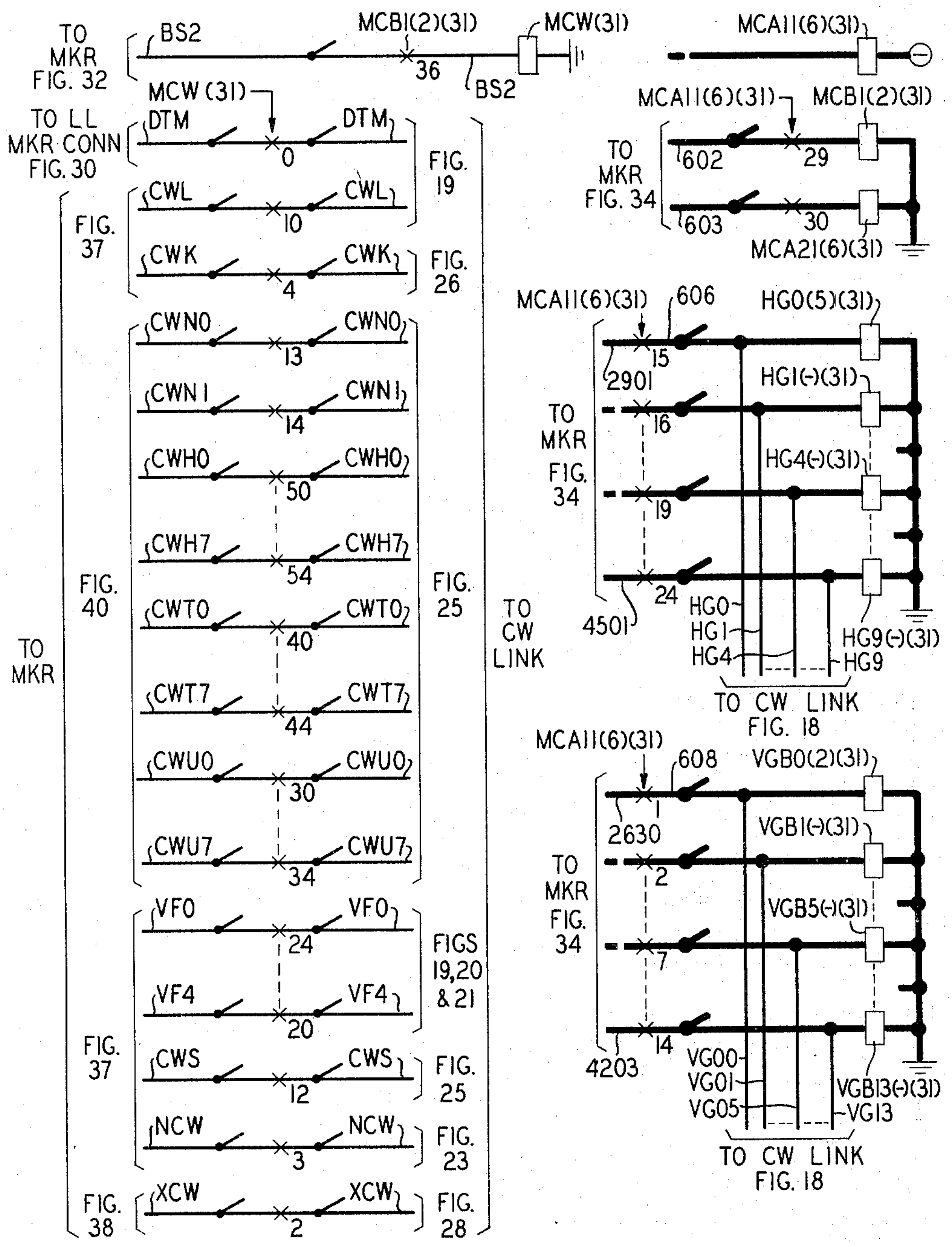

In a few instances, such as in FIG. 31, a relay winding, such as HG9(-)(31), has a dash in the first parenthesis to indicate that the actual relay winding is not shown in Busch but is considered to exist in that context, as will be obvious from the Busch disclosure.

Certain lead designations, such as lead 602 in the right part of FIG. 31, are the same as in Busch.

As in FIG. 32, certain cables such as cable 108–174 carry the same designations as in Busch, wherein the designation shows the two figure numbers of Busch between which the cable extends.

DETAILED DESCRIPTION

Previously, under the main heading "Arrangement of Disclosure," has been set forth the various sub-section headings to be found hereinafter.

BLOCK DIAGRAM (FIG. 1)

FIG. 1 shows in very general terms some of the main functional parts of the No. 5 crossbar telephone system with the addition of those parts necessary to provide call waiting service to call waiting customers. The call waiting circuits 01 to 11 are new parts as is the call waiting link. In the prior art system without call waiting service, the customers, S02 to S19 for instance, have their lines terminated in their usual system line terminals, such as S02 to S19, in the line link frame. The new call waiting link is provided for each line link frame serving call waiting customers and is interposed between those customer lines and the line link terminals for those lines. Other customers not being provided with call waiting service have their lines terminated directly at their usual line link terminals. Each call waiting circuit, such as 01, is terminated at the call waiting link at two terminals A and B and at the line link frame at a terminal CW01 dedicated thereto. When a call waiting customer is involved in a normal connection, the customer's line is connected through the call waiting link to its usual line terminal at the line link frame without being connected to a call waiting circuit. When a call waiting customer is involved in a special connection providing call waiting service, the customer line is connected via the call waiting link to the A terminal of a call waiting circuit; and, the B terminal of the call waiting circuit is connected via the call waiting link to the usual line link terminal of that customer line. One telephone connection may be made through the line link frame to the usual line terminal and another telephone connection may be made through the line link frame to the call waiting circuit line link terminal. As will be explained later, the call waiting customer may converse with either of the parties on either of these two connections.

CALL WAITING LINK (FIGS. 2 AND 6 THROUGH 13)

FIG. 2 shows a single-line diagram of the fundamental switching aspects of the call waiting link, details of which are shown in FIGS. 6 through 13. Referring particularly to FIG. 2, a call waiting customer, such as S02, is associated with one vertical 02 of the call waiting link (CW LK) and has its line connected through back contacts of the corresponding CW LK hold magnet HM02(28) to its usual line terminal S02 on the network line link frame. Under certain situations, such as dial tone connections and permanent signal trunk connections, line S02 will be connected over level zero crosspoints of the CW LK to its usual system line terminal S02 of the line link frame. When call waiting service is provided for line S02, the latter is connected to the A terminal of a call waiting circuit (such as CW CCT 01) over part of a crosspoint for a CW LK switch level other than level zero (such as level 01) and the B terminal of CW CCT 01 is connected over part of the level 01 crosspoint to the usual line terminal S02 at the line link frame. When a customer S02 is connected to a CW CCT 01, two separate telephone connections may be available to customer S02, one at its usual line link terminal S02 and one at the line link terminal CW01 of the attached call waiting circuit CW CCT 01.

In the following detailed description, two types of connections of a call waiting customer line via the CW LK are referred to, a normal connection using a normal setting of the link and a special connection using a special setting of the link. By a normal setting is meant a setting whereby the customer line is connected over back contacts of its CW LK hold magnet or over a level zero crosspoint to the usual system line terminal (such as S02) at the line link frame without the line being connected to a call waiting circuit. By a special setting is meant a setting whereby the customer line is connected over a crosspoint on any CW LK level other than level zero whereby the line is connected to a call waiting circuit and to its usual line link terminal (via the call waiting circuit).

A level zero connection, as will be seen from subsequent description, is used for dial tone connections and permanent signal trunk connections and may also be used for certain test connections. These situations involve the types of connections during the existence of which it is not desirable to allow any call waiting circuit to be attached to the line. The fact that a CW LK level zero crosspoint is involved in such connections is the means employed to exercise the preventive control.

Whenever a line is connected to its usual line link terminal over back contacts of its corresponding CW LK hold magnet, a CW CCT may, if required, be attached. Attaching a CW CCT involves substituting a level 01 to 11 crosspoint setting of the CW LK for the hold magnet back contact type of normal setting of the CW LK.

As will be apparent, the CW LK is controlled by selective select and hold magnet operations to close appropriate crosspoints as required.

Figure 11:
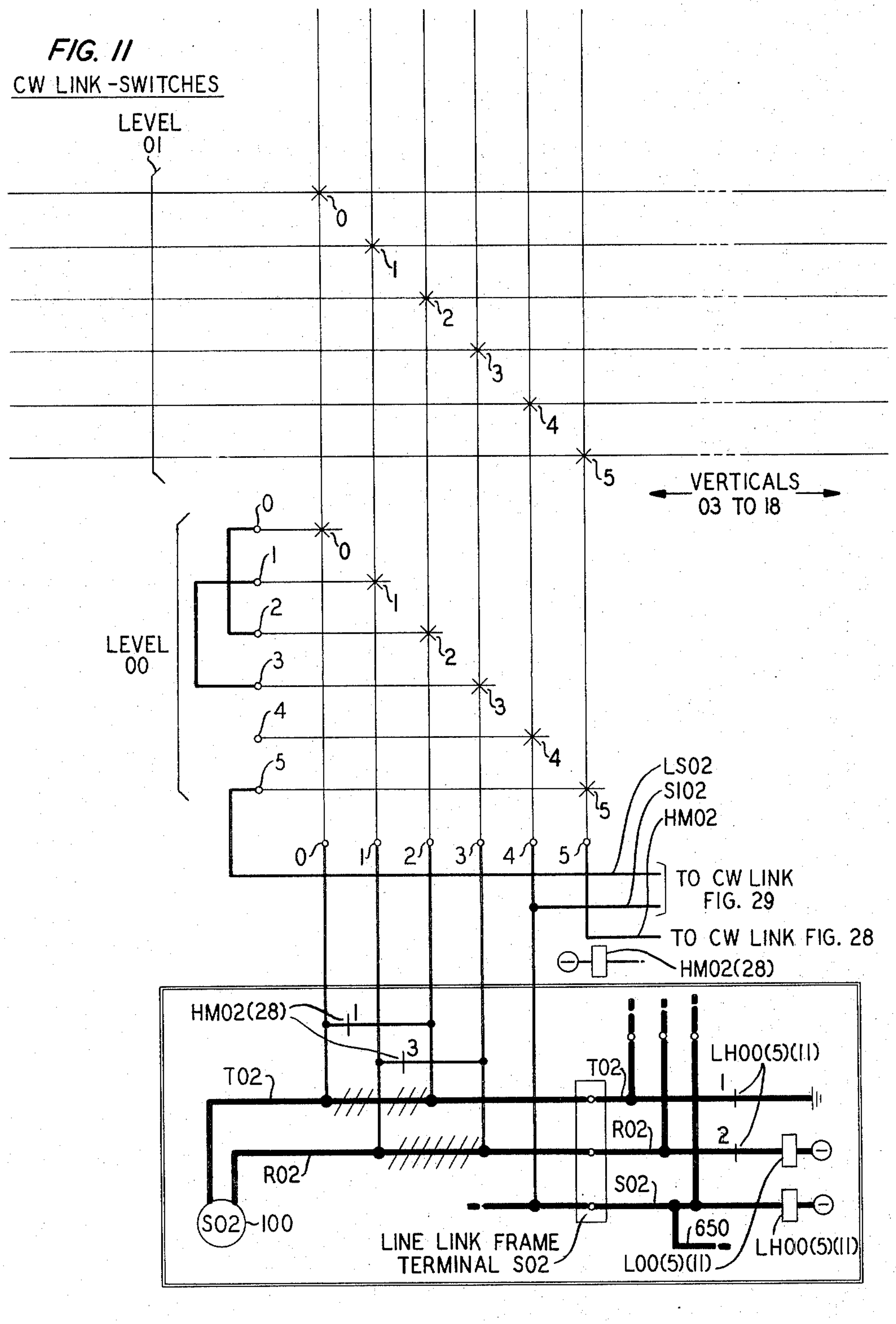
Figure 12:
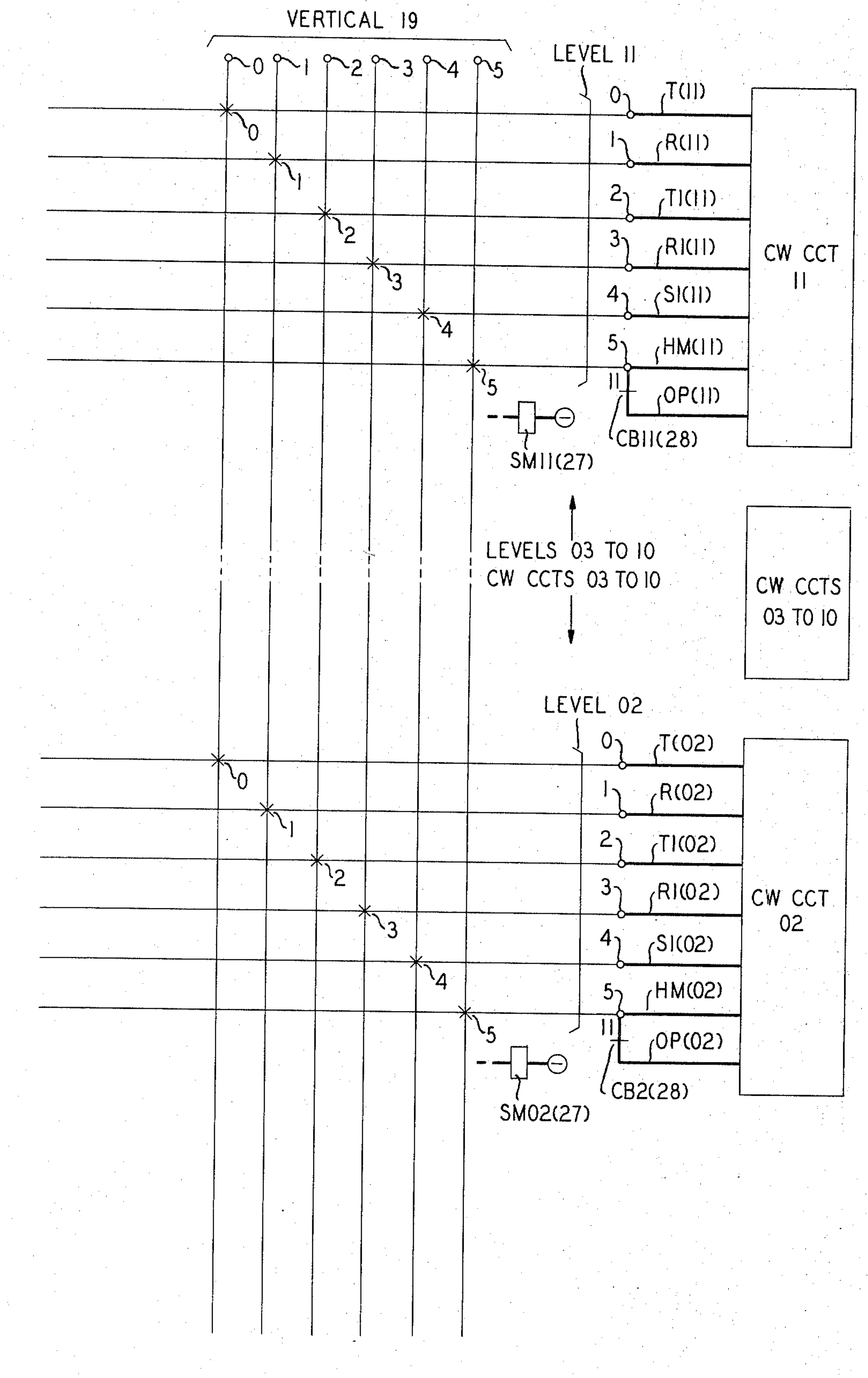
Figure 13:
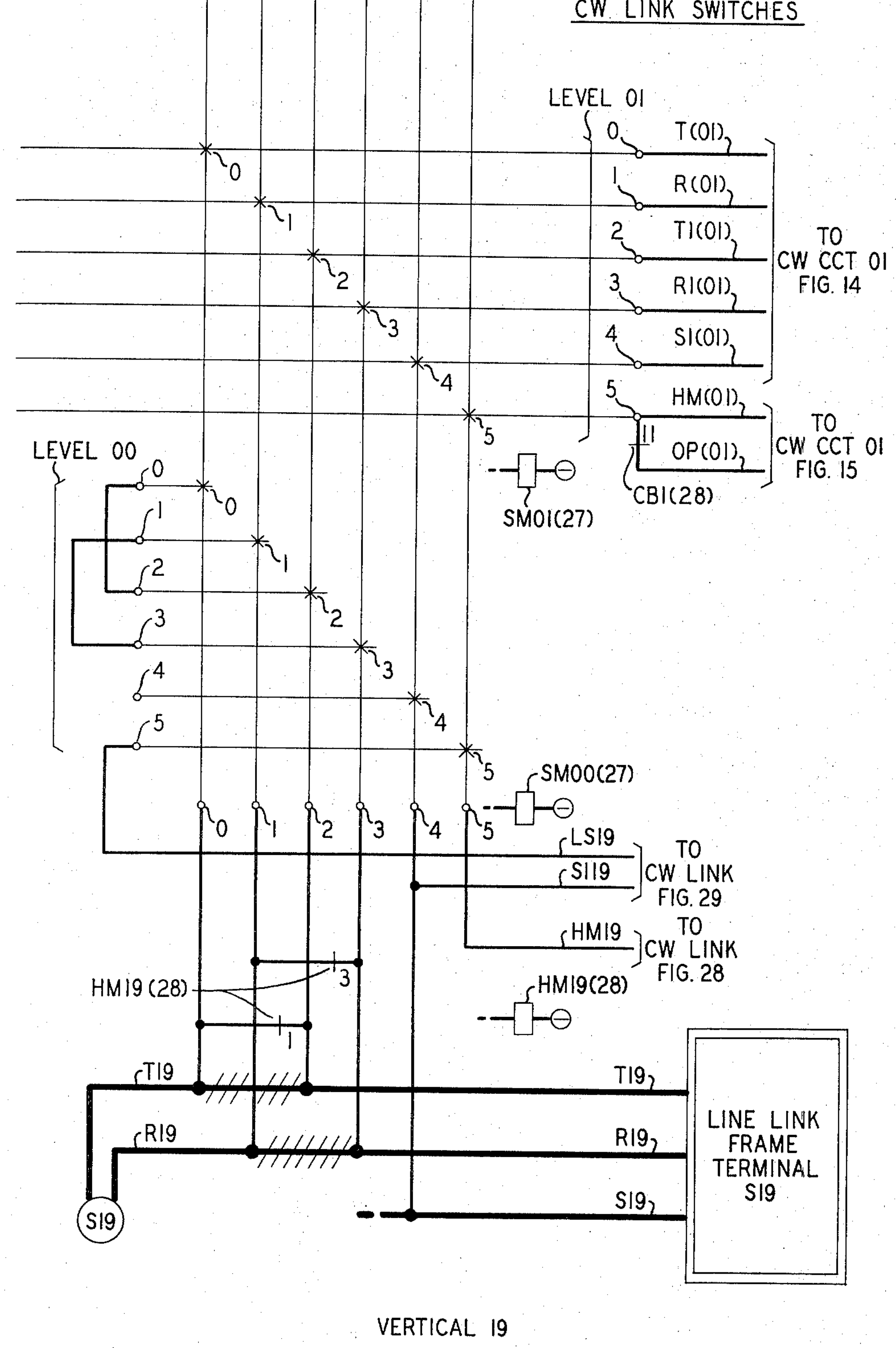

FIGS. 6 through 13, arranged as shown in FIG. 43 (same sheet as FIGS. 3, 4 and 5), disclose the details of a CW LK switch array consisting of a 6-wire, 20-vertical, 12-level crossbar switch. Only levels 00, 01, 02 and 11 are shown along with verticals 00, 01, 02 and 19. Verticals 00 and 01, as shown on FIGS. 6, 7, 8 and 9, are reserved for test purposes; whereas, verticals 02 (FIGS. 10 and 11) through 19 (FIGS. 12 and 13) terminate the line circuitry for 18 call waiting customers SO2 to S19. In FIGS. 12 and 13 are indicated eleven CW CCTs 01 to 11 terminating on levels 01 to 11 of the CW LK.

In FIG. 11 the call waiting customer S02, identified as reference numeral 100 to correspond to customer line 100 in Busch, has its tip and ring leads T02 and R02 connected to vertical wires 0 and 1 of vertical 02 and has its usual tip and ring line link frame leads T02 and R02 connected to vertical wires 2 and 3 of vertical 02, with back contacts 1 and 3 of hold magnet HM02(28) completing these tip and ring lead connections as in Busch. The sleeve lead of line S02, namely lead S02 at the line link frame, is connected to vertical wire 4 of vertical 02. The level zero crosspoint for vertical 02, as well as for the other verticals, has horizontal wires 0 and 2 connected together as well as horizontal wires 1 and 3 so that when a level zero crosspoint is operated, meaning hold magnet HM02(28) operated, the customer's tip and ring leads are connected through the crosspoint to the usual line link frame tip and ring lead terminals.

In FIG. 13 it will be observed that when a crosspoint is closed on any CW LK level other than level zero, such as level 01 corresponding to CW CCT 01, the customer S19 tip and ring leads are connected over the 0 and 1 wires and the closed crosspoint to the tip and ring leads T(01) and R(01) into the CW CCT 01 and the usual line link frame tip and ring terminals of customer S19 are connected over the 2 and 3 wires to the tip and ring leads T1(01) and R1(01) into CW CCT 01.

It is to be noted in FIGS. 7, 9, 11 and 13 that the CW LK switch level zero horizontal wires do not extend the full length of the CW LK but are used only for the dialing protection feature for each customer on its own vertical.

LINKAGE DIAGRAMS (FIGS. 3, 4 and 5)

FIG. 3 shows the basic linkage involved in a level zero (00) connection. The call waiting station is connected over a level zero crosspoint (CP1 and CP2 are two parts of the same 6-wire crosspoint) on the CW LK to its usual network line terminal on the line link frame, thence over interframe linkage to the trunk line frame where the connection finally terminates in an originating register (dial tone connection) or in a permanent signal trunk (permanent signal connection) or in some special circuit such as might be used for some test purpose. This level zero linkage or connection is the type of normal connection during the existence of which no call waiting circuit may be attached to the call waiting customer's station line.

FIG. 4 shows another type of normal CW LK connection linkage where the call waiting station line is connected to its usual network line terminal on the line link frame through back contacts of the CW LK unoperated hold magnet HM, thence to the trunk link frame where the connection might, for example, extend through a trunk to another station. During the existence of this type of normal CW LK connection, it is permitted to attach to the call waiting station line, if required, a call waiting circuit.

FIG. 5 shows the CW LK connections involved when a CW CCT is attached to a call waiting station line. Here, the call waiting station line is connected over the CPA part of a CW LK level crosspoint other than level zero to a CW CCT; and, the CW CCT is connected over the CPB part of the same CW LK crosspoint to the usual network line terminal for that call waiting station at the line link frame. From the line link frame, one connection may extend from the usual line terminal of the call waiting station to a second station B and another connection may extend from the line link frame terminal of the CW CCT to a third station A.

As is typical in the call waiting circuit art, in the arrangement of FIG. 5 the call waiting station may transfer back and forth between stations A and B while placing the other station on hold. Also, the call waiting station is provided with a signal whenever a second connection is added by means of a call waiting circuit.

BASIC CONTROL BETWEEN MARKER AND LINE LINK FRAME

There are at least three situations of interest here where a marker is called upon to complete some kind of a connection to or from a call waiting line, such as a dial tone connection, a permanent signal connection and a connection other than those two. The dial tone and permanent connections must be effected over level zero of the CW LK. Another type of connection must be made over some CW LK level other than level zero.

As is seen from FIG. 1, the marker has access to the CW LK through the line link connector in all cases when a marker secures access to the line link frame with which the CW LK is associated. Also, whenever a line link frame calls in a marker under a circumstance which appears to be a dial tone request from a call waiting line, the line link marker connector also is involved.

When an apparent dial tone request (it might be a permanent signal condition) is detected as a result of a call waiting line going off-hook, such as line S02 (100 of Busch) in FIG. 11, the corresponding line relay L00(5)(11) operates in a circuit extending from ground, over break contact 1 of the line link hold magnet LH00(5)(11), over tip lead T02 to the line link frame line terminal for line S02, thence over tip lead T02, break contact 1 of the CW LK hold magnet HM02(28) for line S02, over tip lead T02, through the closed loop of the off-hook station of line S02, over ring lead R02, break contact 3 of hold magnet HM02(28), ring lead R02 to the line link frame terminal for line S02, ring lead R02, break contact 2 of hold magnet LH00(5)(11), and to battery through the winding of line relay L00(5(11).

Figure 30:
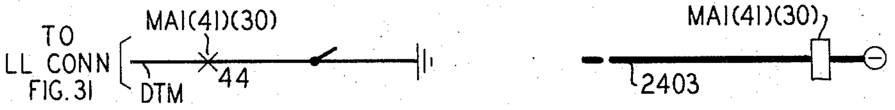
FIGS. 30 and 31 show respectively some significant parts of the line link marker connector and the line link connector of a No. 5 Crossbar system.

As a result of the operation of line relay L00(5)(11), the line link marker connector seizes a marker which in turn eventually seizes the line link frame through the line link connector. The marker is informed that a dial tone connection is required for line S02, which is identified to the marker as to the line link frame location of the line terminals for line S02. In FIG. 30 is shown a line link marker connector relay MA1(41)(30) which is operated incident to the seizure of a marker for the dial tone job. In FIG. 31 is shown a line link connector relay MCA11(6)(31) which is eventually operated by the seized marker to effect connection with the particular line link frame in order to complete the dial tone connection.

During the marker operation, relays CKG4(93)(-) and CKG5(68)(-) are operated resulting in the operation in FIG. 35 of relays LLC1(96)(35), LLC2(96)(35) and ONW(111)(35) in a circuit extending from ground in FIG. 35, over make contact 7 of relay CKG5(68)(-), break contact 3 of relay RCY2(35), make contact 12 of relay CKG4(93)(-), lead 9300, break contact 5 of relay LK1(92)(-), lead 9200, cable 110–187, lead 9200, break contact 6 of relay OV(188)(-), lead 18800, break contact 11 of relay DIS1(114)(36), break contact 8 of relay TRLA(114)(-), lead 11405, cable 112–172, lead 11405, break contact 8 of relay MRL1(172)(-), lead 17201, cable 112–172, lead 17201, and to battery through the windings in series of relays LLC1(96)(35), LLC2(96)(35) and ONW(111)(35). As a result of the operation of relay LLC1(96)(35), connector relays MCB1(2)(31) and MCA21(6)(31) in the line link connector are operated in circuits extending from battery in FIG. 34, through resistors LBSO(96)(34), and LBS1(96)(34), make contacts 9 and 8 of relay LLC1(96)(35), leads 602 and 603 into FIG. 31, thence over make contacts 29 and 30 of connector relay MCA11(6)(31), to ground through the windings of connector relays MCB1(2)(31) and MCA21(6)(31). Also, in FIG. 31 the new line link connector relay MCW(31) is operated in a circuit extending from battery in FIG. 32, through resistor LBS2(32), over make contact 12 of relay LLC1(96)(35), lead BS2 into FIG. 31, thence over make contact 36 of connector relay MCB1(2)(31) and lead BS2 to ground through the winding of connector relay MCW(31).

With connector relays MA1(41)(30), MCA11(6)(31) and MCW(31) operated, some basic control information is shared by the marker and the CW LK circuitry. The marker is informed that the request for service involves a line link frame with which is associated a call waiting link and that the request is for dial tone service. The call waiting link is informed that the marker connected thereto is at the moment acting as a dial tone marker.

Figure 37:
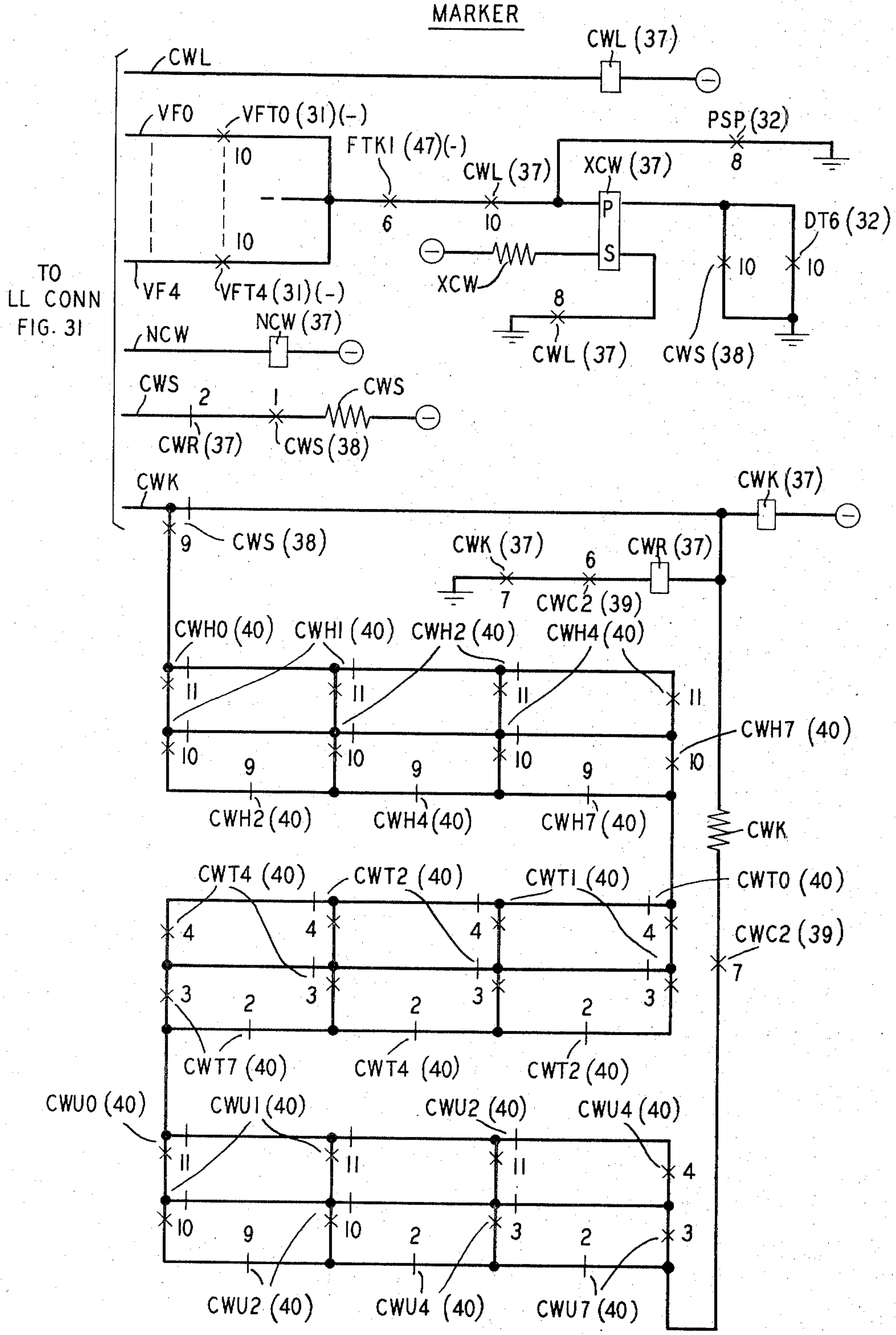

The marker is informed by the operation in FIG. 37 of relay CWL(37) that the service request is from a line link frame having a call waiting link associated therewith. The operating circuit for relay CWL(37) extends from ground in FIG. 19, over lead CWL to FIG. 31, thence over make contact 10 of connector relay MCW(31), lead CWL into FIG. 37, and to battery through the winding of relay CWL(37).

The marker is informed by the operation in FIG. 32 of relays DT1(111)(32), DT2(109)(32) and DT3(76)(32) that the request is for dial tone service. The operating circuit for these relays is under the control of one of the make contacts 9 and 11 of relays MLF(94)(-), D(94)(-) and MF(94)(-). Relay DT3(76)(32), in operating, causes the operation of the new relay DT6(32) in an obvious circuit in FIG. 32 under the control of make contact 4 of relay DT3(76)(32).

Figure 19:
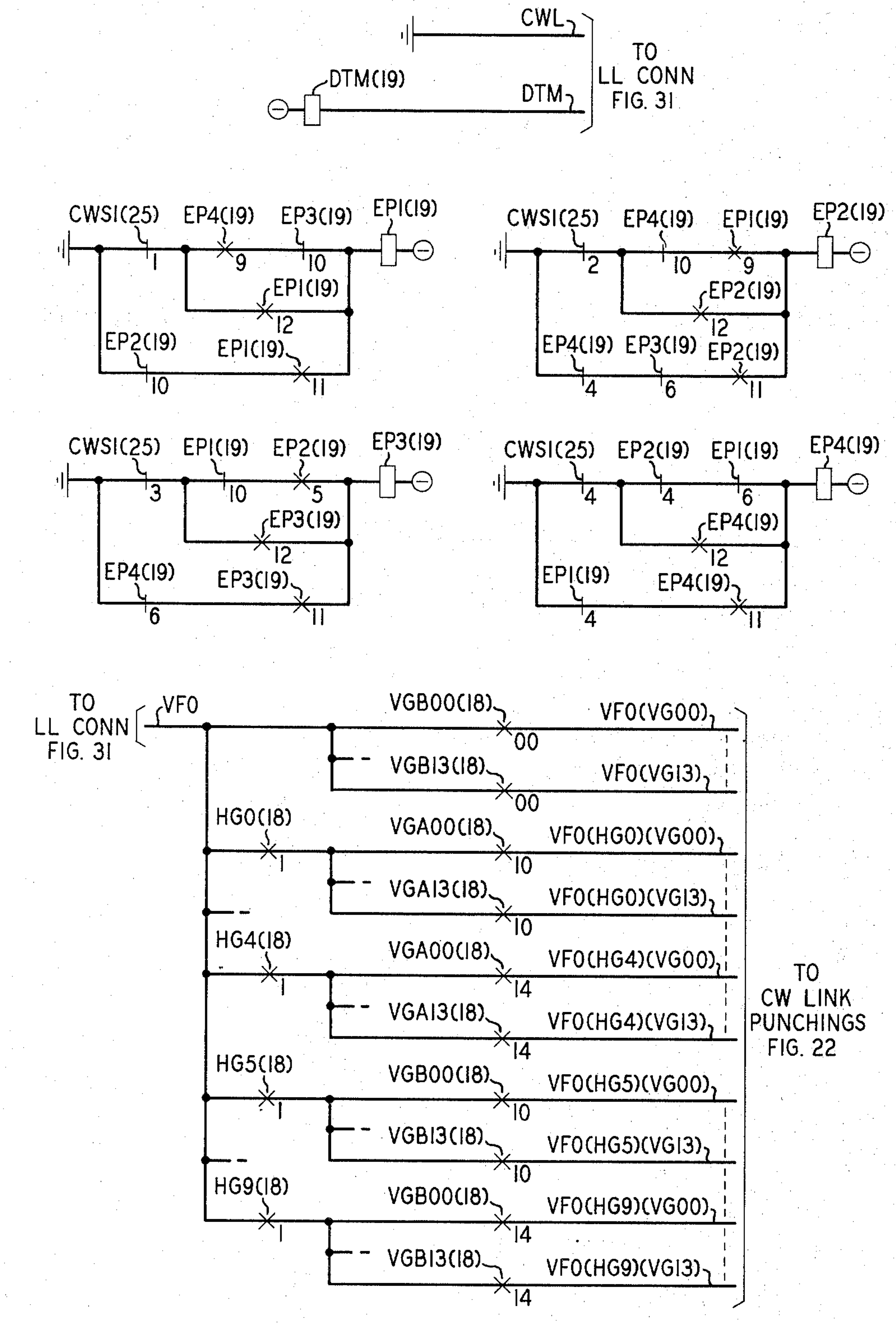

The call waiting link is informed by the operation in FIG. 19 of relay DTM(19) that a dial tone marker is connected therewith. The circuit for operating relay DTM(19) extends from ground in FIG. 30, over make contact 44 of connector relay MA1(41)(30), lead DTM into FIG. 31, over make contact 0 of connector relay MCW(31), lead DTM into FIG. 19, and to battery through the winding of relay DTM(19).

When a marker connects to a line link frame upon the request of another circuit, such as an originating register or an incoming register, the line link marker connector (FIG. 30) is not involved but the line link connector (FIG. 31) is involved. Under such circumstances, relay DTM(19) will not be operated nor will relays DT1(111)(32), DT2(109)(32), DT3(76)(32) and DT6(32). Relay CWL(37) of the marker will be operated as in the dial tone request situation.

Whenever an originating register requests the services of a marker to handle what appears to be a permanent signal condition (i.e., a line, such as S02 in FIG. 11 has been connected to an originating register in a dial tone connection but has failed to dial a called number into the originating register), the permanent signal relays PS(131)(32) and PSP(32) of FIG. 32 will be operated.

Whenever a marker connects to a line link frame in order to attempt to complete some kind of connection to a line terminated in that frame, the marker will contain the line link frame location of the line, namely the line's horizontal group, vertical group, and vertical file identities. With such information, secured from an originating register or from a number group translation, the marker will, at the appropriate time, cause (1) the operation in FIGS. 31 and 18 in one of the line link relays HGO(5)(31) through HG9(-) (31) in parallel with one of the CW LK relays HG0(18) through HG9(18) according to the horizontal group on the line link frame wherein the line is located and (2) the operation in FIGS. 31 and 18 of one of the line link relays VGB0(2)(31) through VGB13(-)(31) in parallel with one of the CW LK relays VGA00(18) through VGA13(18) according to the vertical group on the line link frame wherein the line is located. Also, under the control of the vertical file formation, the marker will cause one of the terminals in FIG. 22 to be energized so that one of the relays NCW(22) and LP02(22) through LP19(22) will be operated to indicate whether the line is non-call-waiting, NCW(22), or call-waiting, LP02(22) through LP19(22).

If relay NCW(22) is operated, the marker handles the connection in the usual manner since no call waiting service is provided for that line.

If one of the relays LP02(22) through LP19(22) is operated, the marker and the CW LK cooperate to provide call waiting service if required.

ESTABLISHING DIAL TONE CONNECTION-GENERALLY

It will be assumed that call waiting customer line S02 in FIG. 11 is of the dial pulse type of line (rotary dial) and goes off-hook to initiate the circuit functions required to complete a dial tone connection. The line relay L00(5)(11) will operate, as previously mentioned, to initiate the request for dial tone. This is followed in due course by the operation in FIG. 30 of the line link marker connector relay MA1(41)(30) to extend a number of control leads between the line link and the marker. Part of the preparation of the marker results in the operation of relays CKG2(97)(-), CKG3(97)(-), CKG4(93)(-) and CKG5(68)(-), the latter two of which in turn cause the operation, as previously mentioned, in FIG. 35 of relays LLC1(96)(35), LLC2(96)(35) and ONW(111)(35). Also, in FIG. 32, as a result of the operation of relay D(94)(-) in the marker, indicating by example that all lines on the line link frame are dial pulse lines, relays DT1(111)(32), DT2(109)(32) and DT3(76)(32) are operated to inform the marker that a dial tone connection is required. Incident to the operation of relay DT2(109)(32), relay RCTA(107)(-) is operated as in Busch and incident to the operation of relay DT1(111)(32), relay GTL(111)(-) is operated as in Busch.

During the time that the marker is preparing to connect to the trunk link frame to select an idle dial pulse originating register for the desired dial tone connection, the marker will have received from the line link circuit part of the calling line location information such as the line link frame number, the horizontal group, the vertical group, the vertical file, and the calling line class. This includes the operation of one of the ten horizontal group relays HGTO(29)(-) to HGT9(45)(-), one of the fourteen vertical group relays VGTO(26)(-) to VGT13(42)(-), the operation of the vertical group check relay VTK1(43)(-), and the operation of the horizontal group check relay HTK1(44)(-). Further identification is delayed until the marker connects to the line link frame through the line link connector (FIG. 31) after seizing the trunk line frame upon which an idle originating register is found. When the marker has seized a trunk link frame and has selected an idle originating register a number of relay operations take place including the operation of relay LCK(76)(-).

After having seized the trunk link frame and an idle originating register, the marker effects connection with the line link frame through the line link connector of FIG. 31, including the operation of connector relay MCA11(6)(31). Then, connector relays MCB1(2)(31) and MCA21(6)(31) are operated in circuits extending from battery in FIG. 34, through resistors LBS0(96)(34) and LBS1(96)(34), over make contacts 9 and 8 of relay LLC1(96)(35), leads 602 and 603 into FIG. 31, thence over make contacts 29 and 30 of connector relay MCA11(6)(31), to ground through the windings of connector relays MCB1(2)(31) and MCA21(6)(31). These connector relays close through a number of leads between the marker and the line link frame for control purposes and for transfer of information. The new connector relay MCW(31) is operated in a circuit extending from battery in FIG. 32, through resistor LBS2(32), over make contact 12 of relay LLC1(96)(35), over lead BS2 into FIG. 31, over make contact 36 of connector relay MCB1(2)(31) and to ground through the winding of connector relay MCW(31). Connector MCW(31) extends a number of leads between the call waiting link circuit and the marker in order to enable call waiting control functions.

One of the horizontal group relays HG0(5)(31) through HG9(-)(31) is operated according to the horizontal group line link frame location of the calling line S02, which is assumed to be in horizontal group 0. Relay HG0(5)(31) is operated in a circuit from battery in FIG. 34, through resistor HGB(96)(34), over make contact 7 of relay LLC1(96)(35), over lead 9605, cable 44–95, lead 9605, make contact 1 of relay HTK1(44)(-), lead 4408 make contact 5 of relay HGT0(29)(-), lead 2901 into FIG. 31, thence over make contact 15 of connector relay MCA11(6)(31), lead 606, to ground through the winding of relay HG0(5)(31). The left side of relay HG0(5)(31) is also connected over lead HG0 into FIG. 18 and to ground through the winding of relay HG0(18) of the CW LK. Relays HG0(18) and HG0(5)(31) operate in parallel in the above circuit.

Figure 18:
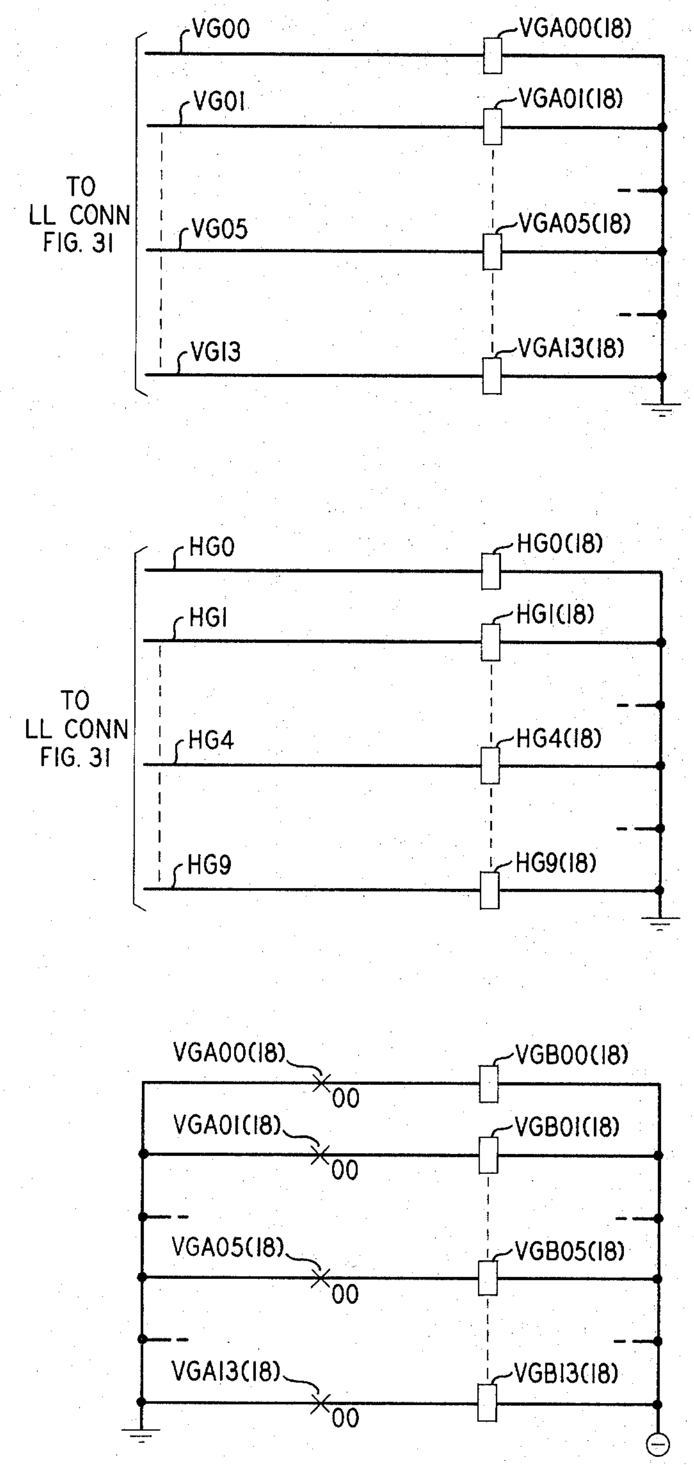
FIGS. 18 through 29 show the details of the control part of the call waiting link.

One of the vertical group relays VGB0(2)(31) through VGB13(-)(31) is operated according to the vertical group line link frame location of the calling line S02, which is assumed to be in vertical group 00. Relay VGB0(2)(31) is operated in a circuit extending from battery in FIG. 34, through resistor VGB(196)(34), through the winding of relay XVGB(196)(34), lead 19601, cable 168–196, lead 19601, cable 108–168, lead 19601, make contact 4 of relay VTK1(43)(-), lead 4310, make contact 8 of relay VGT0(26)(-), lead 2630 into FIG. 31, over make contact 1 of connector relay MCA11(6)(31), lead 608, and to ground through the winding of relay VGB0(2)(31). The left side of relay VGB0(2)(31) is also connected over lead VG00 into FIG. 18 and to ground through the winding of relay VGA00(18) of the CW LK. Relays VGB0(2)(31) and VGA00(18) operate in parallel in the above circuit. Relay XVGB(196)(34) was used in Busch to detect an undesirable condition involving the possible erroneous operation of more than one relay in parallel of the group of relays VGB0(2)(31) through VGB13(-)(31). The function of relay XVGB(196)(34) in the present situation is to properly operate when relay VGBO(2)(31) and VGA00(18) operate in parallel. Relay XVGB(196)(34) operates as an indication that both of relays VGB0(2)(31) and VGA00(18) have operated, the operation of relay XVGB(196)(34) in its new context, as will be seen in later discussion, entering into the control of some of the new marker circuitry used for CW LK control, such as in FIG. 38. In the prior circuitry of Busch, as in FIG. 36, the operation of relay XVGB(196)(34) was used to cause the operation of relay XAVGB(196)(36) to exercise marker control under a crossed-vertical-group failure condition. As in FIG. 36, relay XAVGB(196)(36) is no longer operated due to an operated relay XVGB(196)(34) but is controlled over lead XCW from FIG. 38 as will be discussed. In FIG. 18, upon the operation of relay VGA00(18), relay VGB00(18) is operated under control of make contact 00 of relay VGA00(18).

Figure 22:
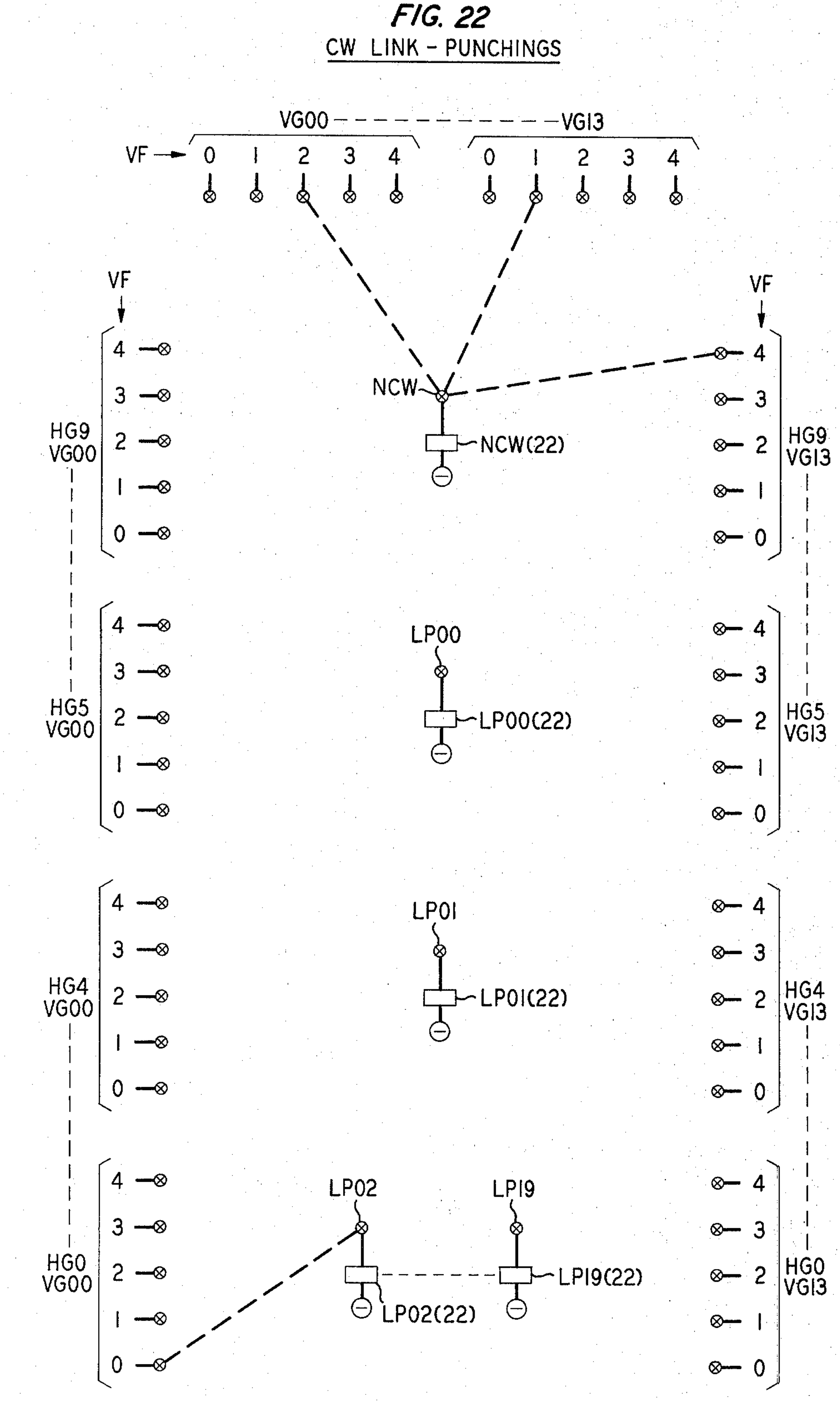

The vertical file information results in the completion of a circuit for energizing one of the terminals in the cross-connection field of FIG. 22 in the CW LK. One of the relays VFTO(31)(-) to VFT4(31)(-) will have been operated in the marker according to the vertical file location of the calling line S02, which will be assumed to be located in file zero. Also, relay FTK1(47)(-) will have operated as a check of accurate vertical file information. Relay CWL(37) will have been operated in a circuit extending from ground in FIG. 19, over lead CWL into FIG. 31, over make contact 10 of connector relay MCW(31), lead CWL into FIG. 37, and to battery through the winding of relay CWL(37). In FIG. 37, the lower or secondary winding of relay XCW(37) is biased in an obvious circuit over make contact 8 of relay CWL(37) so that relay XCW(37) can detect, on its upper or primary winding, any undesirable crossed condition of the leads VF0 to VF4 into FIG. 31. The terminal in FIG. 22 corresponding to vertical file 0, horizontal group 0 and vertical group 00, namely the terminal in the left bottom of FIG. 22, will be energized in a circuit extending from ground in FIG. 37, over make contact 10 of relay DT6(32), through the upper primary winding of relay XCW(37), over make contacts 10, 6 and 10 of respective relays CWL(37), FTK1(47)(-) and VFT0(31)(-), over lead VF0 into FIG. 31, over make contact 24 of connector relay MCW(31), lead VF0 into FIG. 19, thence over make contacts 1 and 10 of respective relays HG0(18) and VGA00(18), lead VF0(HG0)(VG00) into FIG. 22 to the lower left terminal in FIG. 22, which is identified as the terminal for vertical file 0 in vertical group 00 of horizontal group 0.

In FIG. 22, if a terminal corresponding to a particular line, such as terminal VF0–HG0–VG00, is cross-connected to an LP-terminal, such as LP02, then the LP-relay, such as LP02(22) will be operated as an indication that the line is provided with call waiting service. If, on the other hand, the terminal corresponding to a particular line, such as terminal VF4–HG9–VG13, is cross-connected to the NCW terminal, then the relay NCW(22) will be operated as an indication that the line is not provided with call waiting service.

Figure 20:
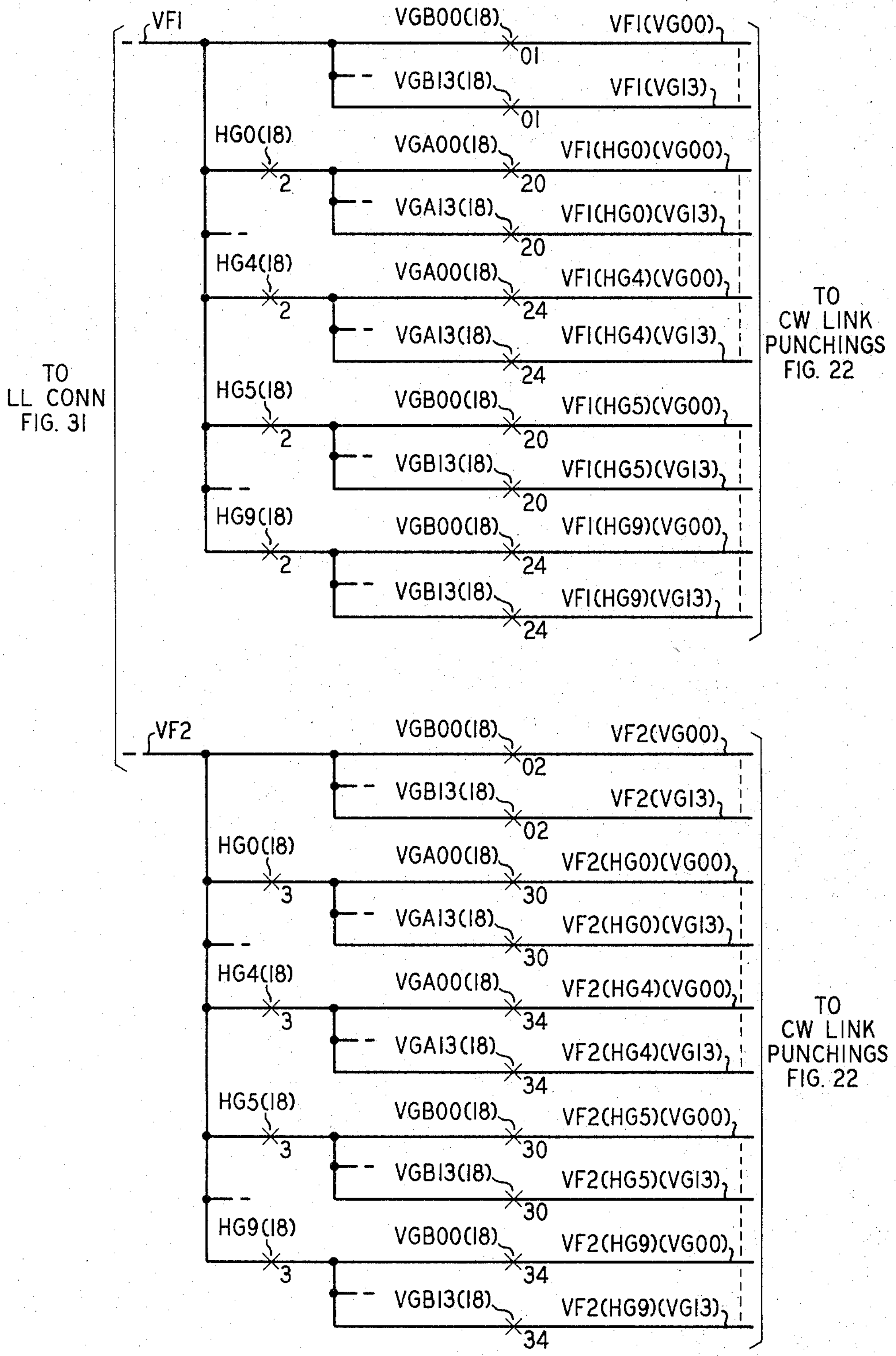
Figure 21:
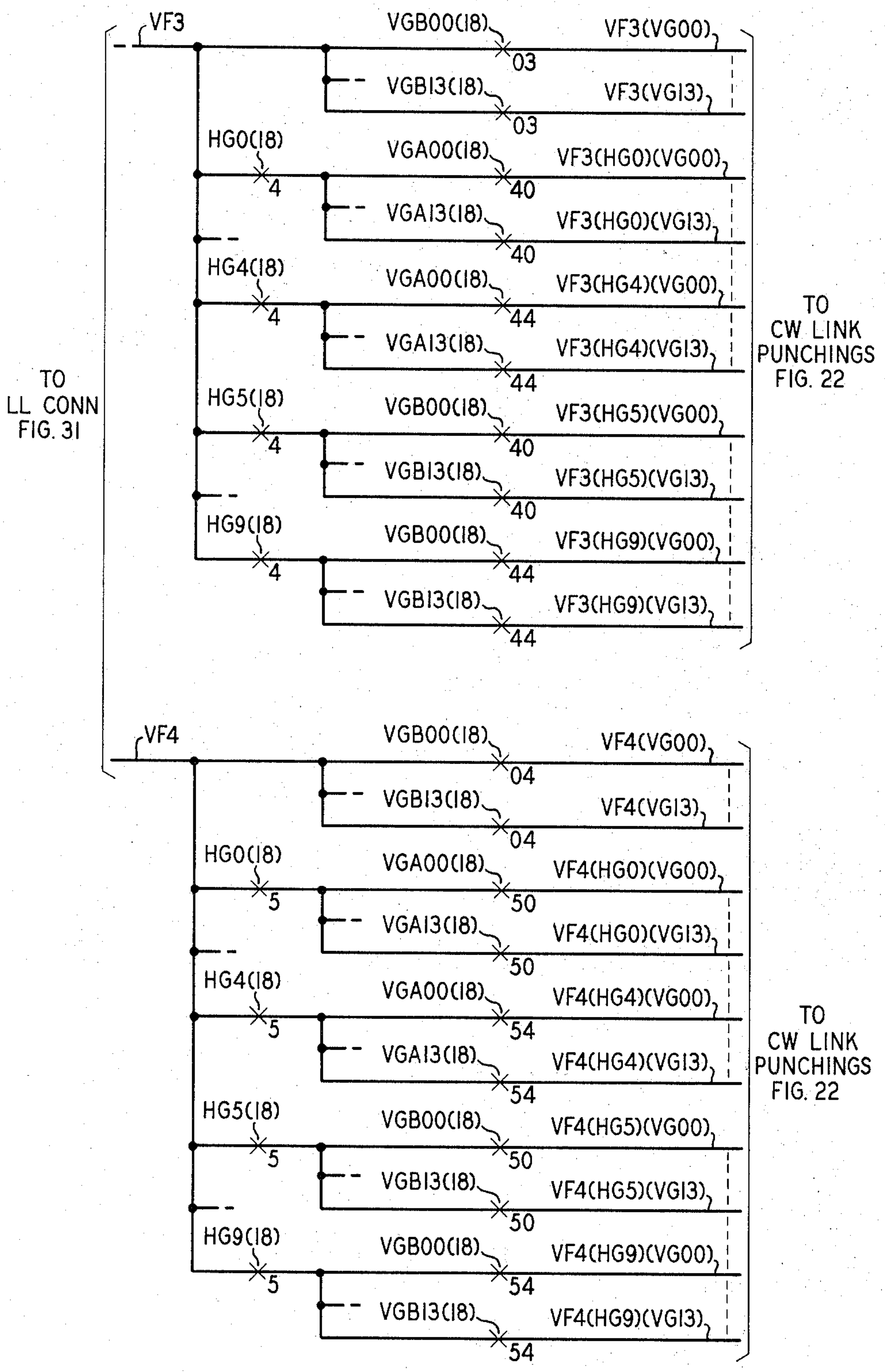

In FIG. 22, the terminals at the top show 70 terminals corresponding to the 5 vertical files of the 14 vertical groups. If an entire file, which extends the full height of the line link frame and thus is common to all horizontal groups, terminates only non-call waiting lines, then the appropriate terminal would be cross-connected to terminal NCW. It will be noted in FIGS. 19, 20 and 21 that the leads VF0 through VF4 from FIG. 31 extend over make contacts of only vertical group relays VGB00(18) through VGB13(18) and leads VF0(VG00) through VF4(VG13) into FIG. 22. There 70 leads are the ones, if at all, which could be connected to the 70 terminals at the top of FIG. 22. For instance, assuming that the entire vertical file 1 of vertical group 13 is non-call waiting, then lead VF1 into FIG. 20 from FIG. 31 would be grounded through the upper primary winding of relay XCW(37) and would extend in FIG. 20 over make contact 01 of relay VGB13(18) to lead VF1(VG13) into FIG. 22 to vertical file terminal VF1 of vertical group VG13 and over the cross-connection to terminal NCW. As another example in FIG. 22, vertical file VF2 of vertical group VG00 has been assumed to involve only non-call waiting lines. The circuit action which may take place as a result of the operation in FIG. 22 of either relay NCW(22) or an LP–(22) relay will be discussed later.

In the meantime, the operation of relay DTM(19) has biased the circuits of relays LK(28), XHM(28) and XS(27). Relay LK(28) is biased (in its non-operate direction) in a circuit extending from ground in FIG. 28, through resistor LK, over make contact 1 of relay DTM(19), through the upper primary winding of relay LK(28), and through the lower secondary winding of relay LK(28) to battery. Also, the plus 130 volt battery potential in FIG. 28, extends through resistor LH, make contact 4 of relay DTM(19), and over break contact 4 of relay HMS(26) to the right hand terminals of diode LH and capacitor LH. Relay LK(28) does not operate, as will be described later, unless relay HMS(26) is operated. Relay XHM(28) is biased (in its non-operate direction) in circuits extending from ground in FIG. 28, over make contact 12 of relay DTM(19), through resistor H2 to the left side of the lower secondary winding of relay XHM(28) and extending from ground in FIG. 28, over make contact 12 of relay DTM(19), and over break contact 5 of relay XHM(28) to the right side of the lower secondary winding of relay XHM(28). Relay XHM(28) does not operate unless, as will be discussed, a crossed hold magnet condition occurs in the CW LK. Relay XS(27) is biased (in its non-operate direction) in a circuit extending from ground in FIG. 27, over make contact 9 of relay DTM(19), through the lower secondary winding of relay XS(27), and through resistors XS and SM to battery. Relay XS(27) does not operate unless, as will be discussed, a crossed select magnet condition occurs in the CW LK.

COMPLETING DIAL TONE CONNECTION — NON-CALL WAITING LINE

In order to establish a prior art frame of reference for later discussion of modified circuit action in a call waiting base, it is considered helpful to review some of the basic control actions, as in Busch, which take place when a dial tone connection is completed to a line not having call waiting service. Subscriber line S02 in FIG. 11 may be used as the example assuming, for the time being, that line S02 is not a call waiting line. Later, the circuit action will be discussed in the context of line S02 having call waiting service, as actually connected as shown in FIG. 11.

If relay NCW(22) is operated, indicating that the calling line does not have call waiting service, the marker will proceed to connect the calling line (line link frame) to the originating register (trunk link frame) in the usual manner as in Busch. In such a case, the calling line will still be connected directly to its usual line link frame network terminal with no CW LK connection involved. For instance, in FIG. 11, showing the call waiting customer S02 connected to its usual line link frame network terminal over break contacts 1 and 3 of its CW LK hold magnet HM02(28), if line S02 were a non-call waiting line, then it would be connected as in Busch without the CW LK hold magnet break contacts: actually, the non-call waiting line would not even be connected to the CW LK.

Figure 23:
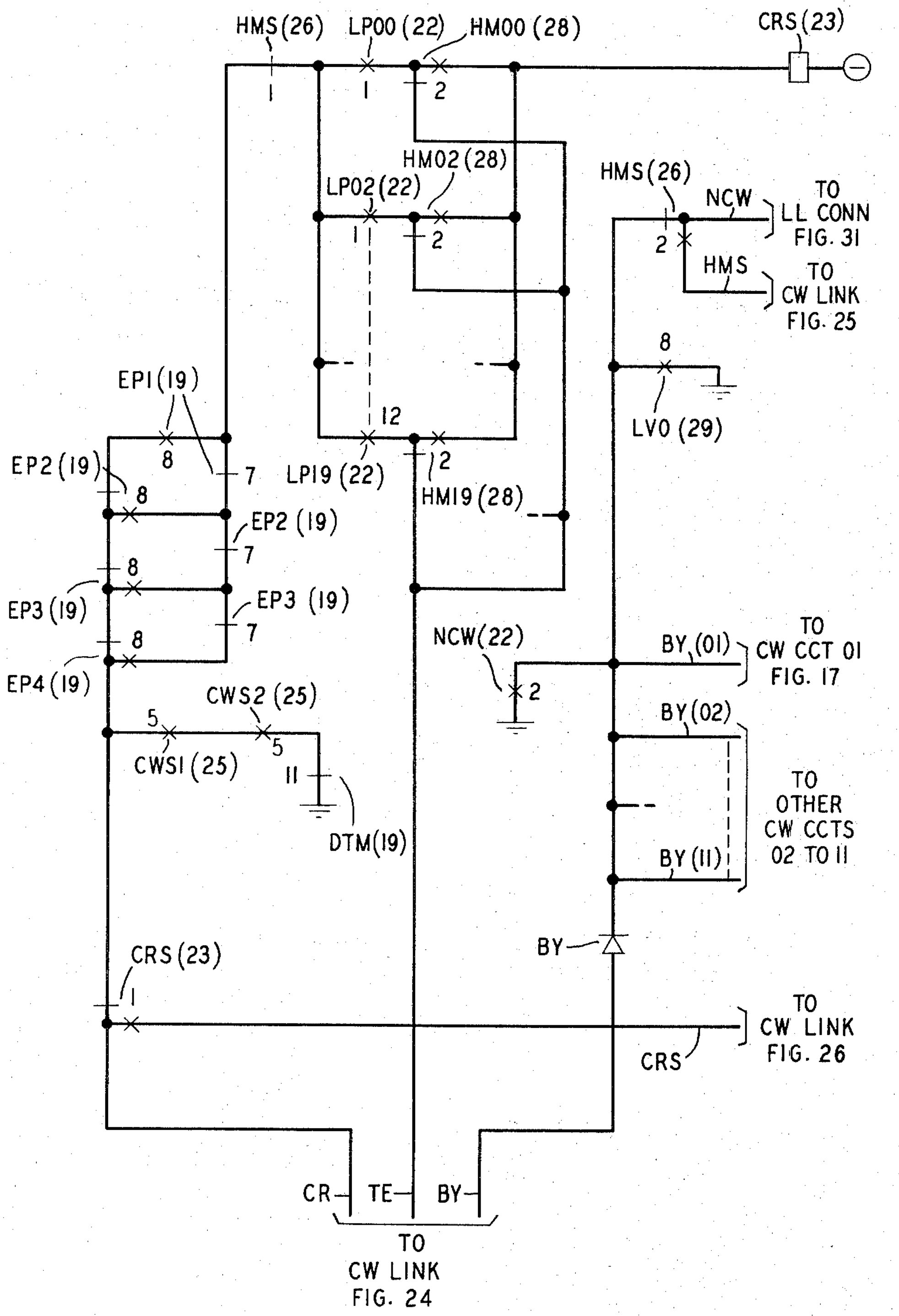

In a non-call waiting case with relay NCW(22) operated, relay NCW(37) of the marker is operated in a circuit extending from ground in FIG. 23, over make contact 2 of relay NCW(22), over break contact 2 of relay HMS(26), over lead NCW into FIG. 31, over make contact 3 of connector relay MCW(31), lead NCW into FIG. 37, and to battery through the winding of relay NCW(37).

The selection of an idle connecting path, or channel, between the line link frame and the trunk link frame results in the operation of a number of relays. Relays TCHK(76)(-), LK(76)(-), JCKO(82)(-), JCK1(82)(-

), TK(92)(-) and CHA(109)(-) operate to show satisfactory idle channel selection. Relays HMT1(109)(-) and LXP1(109)(-) will have been operated in preparation for functioning with the respective trunk link and line link frames. Also, relay HMC(109)(-) will have been operated upon marker seizure.

Following the proper transfer from the marker to the originating register of the line identification information, the selected channel is operated, resulting in the release of relay HMT1(109)(-) and the operation of relay HMS(109)(-) with relay RK3(111)(-) operated and relay GTL(111)(-) released, thereupon operating relay HMS1(92)(32) in a circuit extending from ground in FIG. 32, over make contact 1 of relay LLC1(96)(35), break contact 2 of relay LBT(90)(-), lead 17404, cable 108–174, lead 17404, break contact 3 of relay NCA(174)(-), lead 9005, cable 108–174, lead 9005, break contact 9 of relay LB(90)(35), lead 11121, break contact 1 of relay GTL(111)(-), make contact 7 of relay RK3(111)(-), lead 10916, make contact 10 of relay DT2(109)(32), thence over break contact 3 of new relay LBTA(38), make contact 3 of relay HMC(109)(-), break contact 8 of relay HMT1(109)(-), make contact 2 of relay HMS(109)(-), lead 17604, break contact 2 of relay SP(176)(-), lead 9209, and to battery through the winding of relay HMS1(92)(32), all as in Busch except for break contact 3 of relay LBTA(38) which, as will be seen later, prevents the operation of relay HMS1(92)(32) on call waiting recycle in the marker.

After the operation of the selected channel, certain tests are made with respect to the operated channel such as false ground test, cross test, continuity test and double connection test. Relay SL(109)(-) is operated and one of relays GLH(90)(-) and GLH1(90)(-) is operated depending upon whether the traffic condition is respectively heavy or light, the traffic condition being assumed to be heavy with relay GLH(90)(-) operated and relay GLH1(90)(-) released. Thereafter, the line link frame hold magnet LH00(5)(11) of the calling line is operated, resulting in the release of the line relay L00(5)(11). Relay LXP(109)(-) operates as a proper check of hold magnet continuity, resulting in the release of relay LXP1(109)(-), followed by the release of relay LXP(109)(-). Relay CON(107)(-) is operated during the continuity test and this will cause the operation of relays CON1(107)(33) and CON2(107)(33) in a circuit extending from ground in FIG. 33, over make contact 3 of relay LLC1(96)(35), make contact 2 of relay GLH(90)(-), lead 10713, make contact 1 of relay CON(107)(-), through inductor CON(107)(33), and to battery through the windings of relays CON1(107)(33) and CON2(107)(33), which operate and lock over make contact 4 of relay CON1(107)(33) to ground at make contact 3 of relay LLC1(96)(35), all as in Busch. The master test frame connector in FIG. 33 is provided with ground over break contact 3 of the new relay RLK(38), this ground indicating a satisfactory continuity test. As will be seen later, if RLK(38) is operated as a result of a CW LK failure, the operation of relays CON1(107)(33) and CON2(107)(33) will be forced by make contact 2 of relay RLK(38) in order to allow the marker to proceed; but, the opening of break contact 3 of relay RLK(38) will prevent a satisfactory continuity test signal (ground) from being sent to the MTF connector. Relay RCTA(107)(-) will release during its slow release time sufficient to allow the above operation of relays CON1(107)(33) and CON2(107)(33). If the latter relays have not operated when relay RCTA(107)(-) becomes released, then relay RCT(107)(-) will operate to allow another continuity test to be made in the reverse direction. It will be assumed that the latter does not take place so that relays RCTA(107)(-) and RCT(107)(-) will be released, with relays CON1(107)(33) and CON2(107)(33) operated to indicate a proper continuity test.

Figure 38:
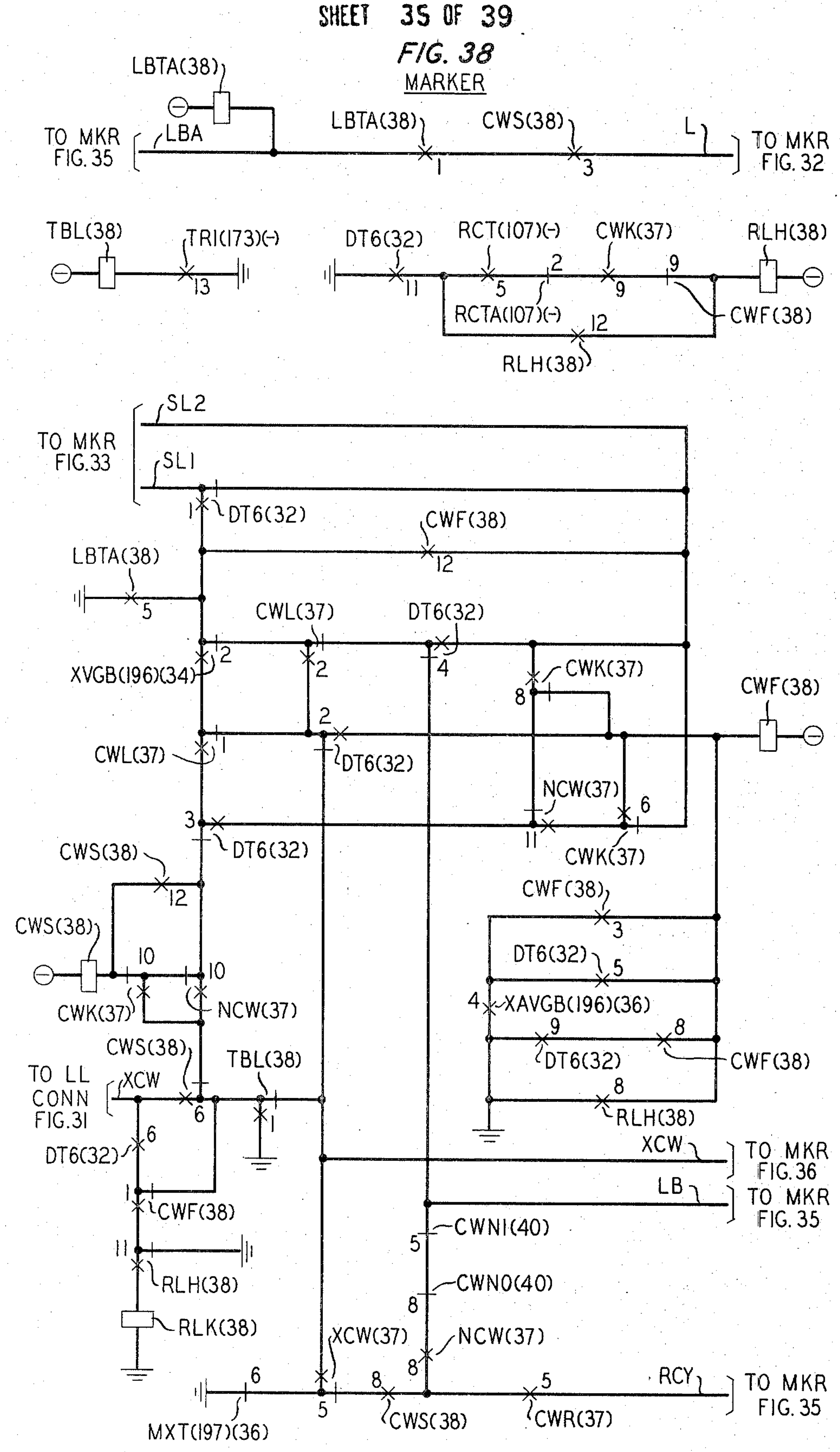

When the above continuity test is successfully made, relays GT1(107)(33) and GT2(90)(33) are operated to in turn cause the release of the select magnets on the line link and trunk link frames. The circuit for operating relays GT1(107)(33) and GT2(90)(33) extends, as in Busch, from ground in FIG. 33, over make contact 4 of relay LLC1(96)(35), lead 9602, break contact 2 of relay LXP(109)(-), break contact 1 of relay LXPl(109)(-) and make contact 6 of relay SL(109)(-) to lead 10927, cable 110–176, lead 10927, break contact 1 of relay SP(176)(-), lead 17605, cable 108–176, lead 17605, make contact 5 of relay CON1(107)(33) make contact 4 of relay CON2(107)(33), make contact 2 of relay CON2(107)(33), through the winding of relay GT1(107)(33), lead 9014, and to battery through the winding of relay GT2(90)(33). Relays GT1(107)(33) and GT2(90)(33) lock in an obvious circuit to ground over make contact 4 of relay GT2(90)(33). In the new circuit arrangement, in FIG. 33 the lead 10927 is opened and extends over two leads SL1 and SL2 into FIG. 38 where it will be observed that the above operating circuit for relays GT1(107)(33) and GT2(90)(33) will or will not be completed depending upon the operated or released conditions of one or more of a number of relays whose contacts are shown in FIG. 38. In the present situation, it will be recalled that relays DT6(32), XVGB(196)(34), CWL(37) and NCW(37) are operated, thus completing the connection in FIG. 38 (and thus in FIG. 33) between leads SL1 and SL2 over make contact 1 of relay DT6(32), make contact 2 of relay XVGB(196)(34), make contact 1 of relay CWL(37), make contact 3 of relay DT6(32), make contact 11 of relay NCW(37) and break contact 6 of relay CWK(37).

After completion of the double connection test, the dial tone completion functions take place including the disconnection of the tip, ring and sleeve leads from the marker and the extension of these leads to the originating register. When the marker is satisfied that the originating register is holding the connection, relay SL(109)(-) is released; and, relay LK1(92)(-) is operated to signify that the dial tone connection from the calling subscriber to an idle originating register has been completed, tested and found to be satisfactory.

Marker release is initiated by the operation of relay LK1(92)(-) which causes the release of relays ONW(111)(35), LLC2(96)(35) and LLC1(96)(35). Relay LK1(92)(-), in operating, causes the operation as in Busch of the disconnect relays DIS1(114)(36) and DIS2(114)(36) in a circuit extending from ground in FIG. 36, over make contact 8 of relay LK1(92)(-), lead 9310, break contact 8 of relay ITR2(93)(-), lead 19305, cable 110–172, lead 19305, break contact 4 of relay MT14(193)(-), lead 5907, over same circuitry not of particular interest herein, lead 11411, break contact 1 of relay TRS(114)(-), lead 13100, break contact 7 of relay CWF(38), lead 13100, break contact 3 of relay PS(131)(32), lead 13307, circuitry not of interest, lead 17301, circuitry not of interest, lead 19304, break contact 4 of relay MT1(193)(-), lead 11410, cable 116–172, lead 11410, and to battery through the windings of relays DIS1(114)(36) and DIS2(114)(36). It will be noted in FIG. 36 that break contact 7 of relay CWF(38), as will be discussed hereinafter, prevents the operation of relays DIS1(114)(36) and DIS2(114)(36) on a CW LK failure-relay CWF(38) operated — until after the making of a trouble record.

Eventually, the marker will be completely released with all of the following additionally operated marker relays released: D(94)(-), DT1(111)(32), DT2(109)(32), DT3(76)(32), DT6(32), CKG1(113)(-), CKG2(97)(-), CKG3(97)(-), CKG4(93)(-), CKG5(68)(-), HMS1(92)(32), HMS(109)(-), HMC(109)(-), RK3(111)(-), GT1(107)(33), GT2(90)(33), CON1(107)(33), CON2(107)(33), CON(107)(-), GLH(90)(-), HGT0(29)(-), HTK1(44)(-), VTGO(26)(-), VTK1(43)(-), XVGB(196)(34), CHA(109)(-), LK1(92)(-), DIS1(114)(36), DIS2(114)(36), VFT0(31)(-), FTK1(47)(-), TK(92)(-), LK(76)(-), TCHK(76)(-), LCK(76)(-), JCK1(82)(-) and JCK0(82)(-).

In FIGS. 30 and 31, the connector relays MA1(41)(30), MCA11(6)(31), MCB1(2)(31), MCA21(6)(31) and MCW(31) will have been released, as will the relays HG0(5)(31) and VGB0(2)(31) of the line link connector.

In FIG. 37, relays CWL(37) and NCW(37) will have been released at least by the time when the connectors of FIGS. 30 and 31 are released.

Likewise, in the CW LK circuit, the following relays will have been released when connection to the marker has been released: VGA00(18), HG0(18), VGB00(18), DTM(19) and NCW(22).

The calling line remains connected to an originating register without any involvement of the CW LK.

COMPLETING DIAL TONE CONNECTION — CALL WAITING LINE

The completion of a dial tone connection to a calling line having call waiting service is essentially the same as above described for a non-call waiting line except that the CW LK will be involved so that a level zero connection thereof may be used to provide dialing protection. The same basic control functions take place resulting in the operation of connector relays MA1(41)(30), MCA11(6)(31), MCA21(6)(31), MCB1(2)(31) and MCW(31) and of relays DTM(19), D(94)(-), DT1(111)(32), DT2(109)(32), DT3(76)(32), DT6(32), CKG2(97)(-), CKG3(97)(-), CKG4(93)(-), CKG5(68)(-), ONW(111)(35), LLC2(96)(35), LLC1(96)(35), CWL(37), HTK1(44)(-), VTK1(43)(-), FTK1(47)(-), and the customer line relay L00(5)(11).

It will be assumed that customer S02 in FIG. 11 is provided with call waiting service and thus, as shown in FIG. 11, is interconnected with the CW LK switch network. It will also be assumed that customer S02 terminates in vertical file 0 of vertical group 00 in horizontal group 0. Thus relays VFT0(31)(-), HGTO(29)(-) and VGTO(26)(-) will be operated in the marker. Relay HG0(5)(31) of the line link frame will be operated in parallel with relay HG0(18) of the CW LK; and, relay VGB0(2)(31) of the line link frame will be operated in parallel with relay VGA00(18) of the CW LK, with relay XVGB(196)(34) being operated in the marker. Also relay VGB00(18) will be operated in the CW LK, as previously described.

In the assumed situation, where customer S02 of FIG. 11 is provided with call waiting service, the energized terminal in the bottom left corner of FIG. 22 (VF0, HG0, VG00) will cross-connect as shown to terminal LP02 to cause the operation of relay LP02(22) instead of relay NCW(22) as in the non-call waiting case previously described. The operation of relay LP02(22) instead of relay NCW(22) causes some changes in the marker and CW LK functions, as will now be described.

Figure 27:
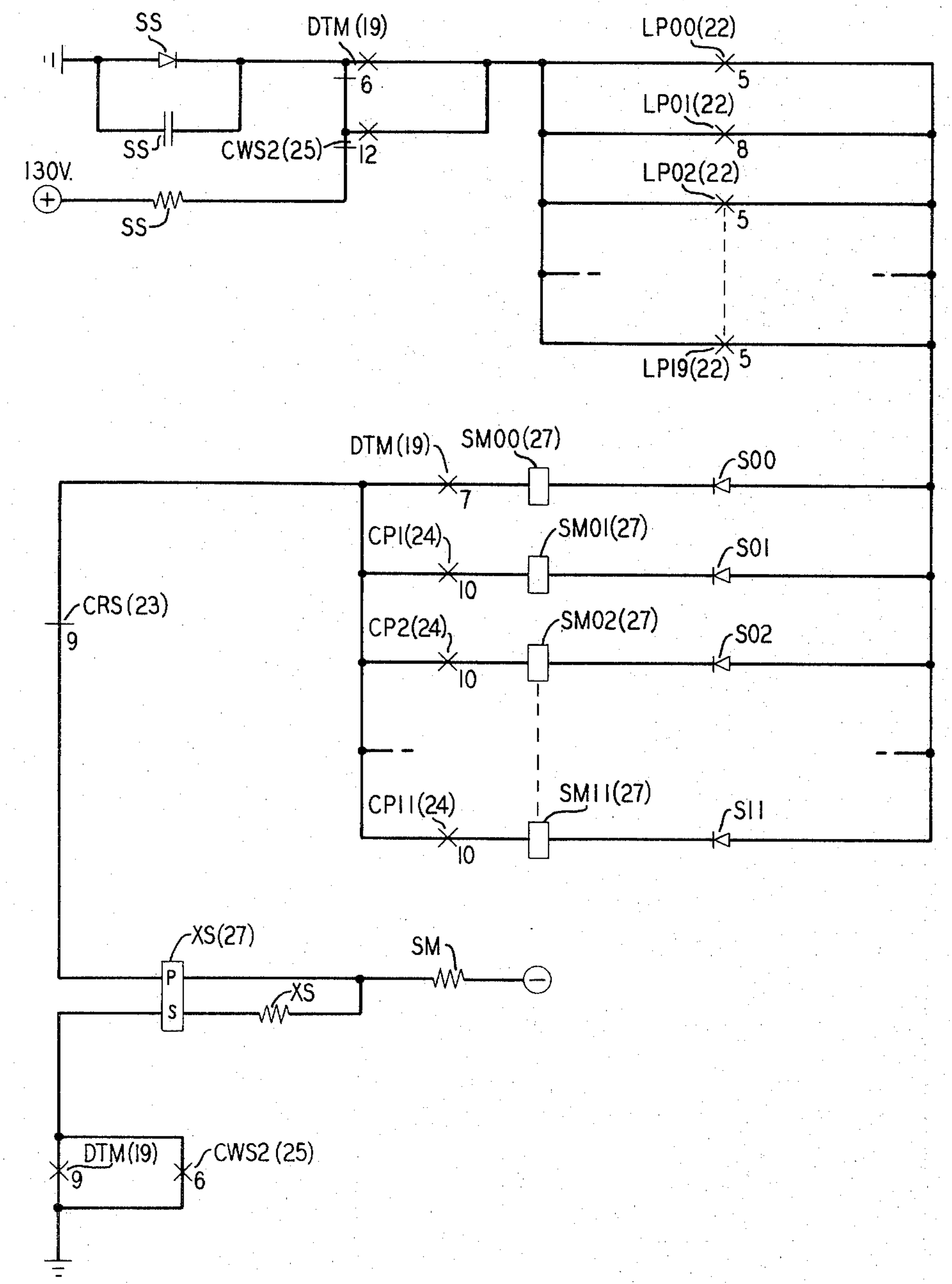

The CW LK select magnet SM00(27) for level zero will be operated preparatory to completing the dial tone over level zero. In FIG. 27, prior to the operation of relay DTM(19) capacitor SS was charged on its right terminal to approximately plus 130 volts in a circuit extending from ground, through capacitor SS, over break contacts 6 and 12 of relays DTM(19) and CWS2(25), to battery through resistor SS. Upon the operation of relay DTM(19), the right terminal of capacitor SS was disconnected from the battery source and connected over make contact 6 of relay DTM(19) to the parallel make contacts of relays LP00(22) to LP19(22). Upon the operation of relay LP02(22), a circuit is completed in FIG. 27 for operating select magnet SM00(27), the circuit extending over make contact 5 of relay LP02(22), through diode S00, through the winding of select magnet SM00(27), make contact 7 of relay DTM(19), over break contact 9 of relay CRS(23) and through the upper primary winding of relay XS(27) to battery through resistor SM. The plus 130 volt charge on capacitor SS will dissipate quickly in the above circuit to cause fast operation of select magnet SM00(27), which will then remain operated from ground through diode SS after capacitor SS has discharged sufficiently to remove the reverse bias from diode SS (i.e., diode SS becomes forward biased so as to pass easily the holding current). Relay XS(27) will not operate in the above circuit provided not more than one select magnet circuit is involved. If by mistake two or more select magnet circuits are in parallel, the current through the upper primary winding of relay XS(27) will be sufficient to cause relay XS(27) to operate as an indication that a crossed select magnet circuit exists; and, the latter, as will be discussed, will effect trouble condition circuit functions.

Figure 28:
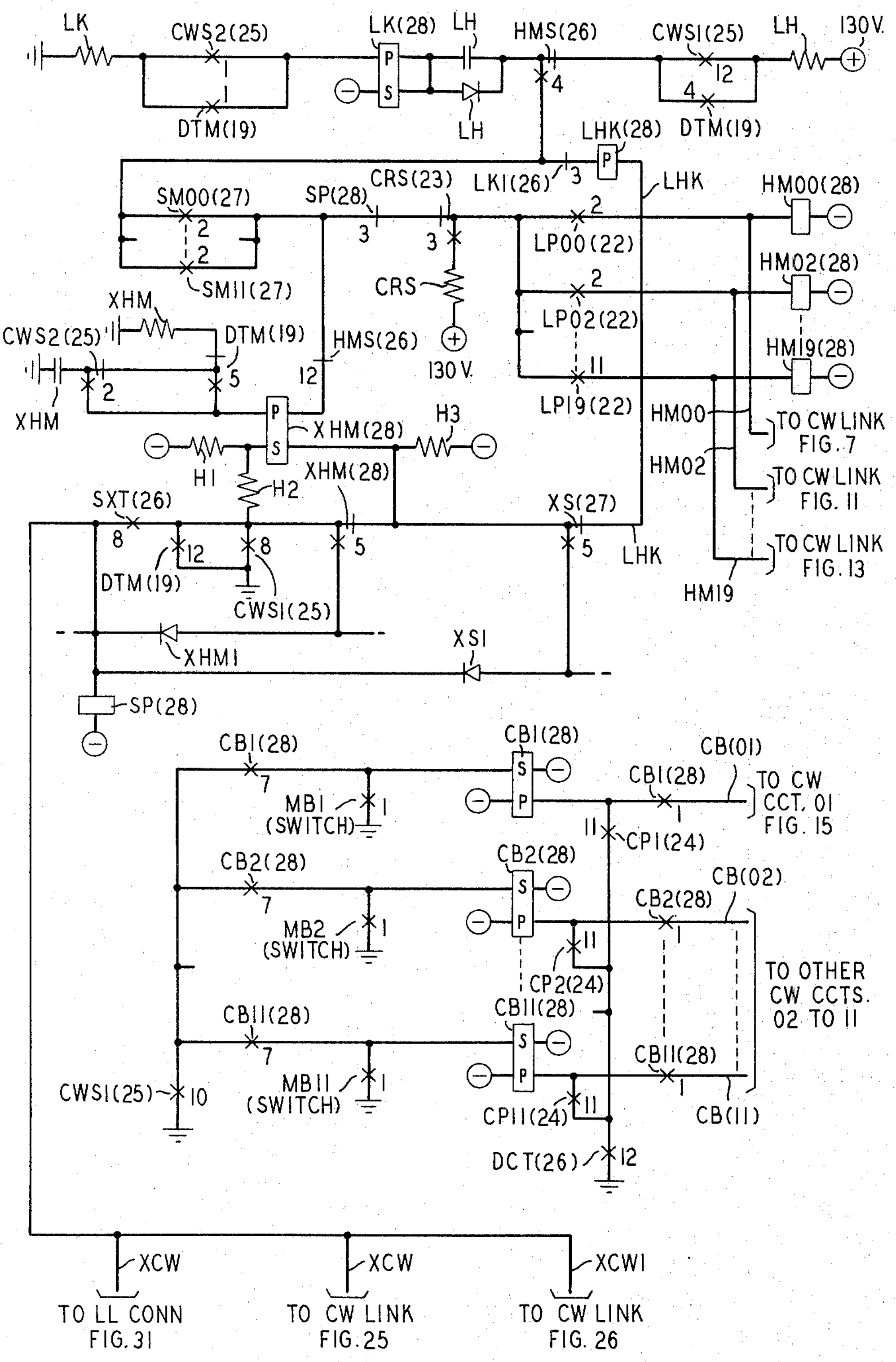

With select magnet SM00(27) operated, the CW LK switch structure is conditioned to close a crosspoint upon the operation of a hold magnet, such as HM02(28) corresponding to customer S02 in FIG. 11. In FIG. 28, prior to the operation of select magnet SM02(27) the upper primary windng of relay XHM(28) tests for crossed hold magnet leads upon the operation of relay LP02(22). This circuit extends from ground, through the discharged capacitor XHM (shorted through break contacts 2 and 5 of relays CWS2(25) and DTM(19) prior to the operation of the latter relay), over make contact 5 of relay DTM(19), through the upper primary winding of relay XHM(28), whose lower secondary winding is biased in the non-operate direction as previously described, thence over break contact 12 of relay HMS(26), break contact 3 of relay SP(28), break contact 3 of relay CRS(23), and over one or more make contacts of relays LP00(22)

and LP02(22) through LP19(22) to the hold magnets HM00(28) and HM02(28) through HM19(28). If more than one hold magnet is connected, the charging current for capacitor XHM will be sufficient to cause the operation of relay XHM(28) but not of any hold magnet. This trouble condition will be discussed later. It will be assumed that only one hold magnet HM02(28) is connected so that neither hold magnet HM02(28) nor relay XHM(28) operates at that time. Capacitor XHM is quickly charged to a potential on its right terminal about equal to negative battery which also appears on the lead to the left of break contact 3 of relay SP(28).

When select magnet SM00(27) operates, as above discussed, the winding of polar relay LHK(28) is placed in series with hold magnet HM02(28) in a circuit extending from battery, through the winding of hold magnet HM02(28), over make contact 2 of relay LP02(22), break contacts 3 of relays CRS(23) and SP(28), thence over make contact 2 of select magnet SM00(27), over break contact 3 of relay LK1(26), through the winding of relay LHK(28), lead LHK, to ground over break contacts 5 of relays XS(27) and XHM(28) and make contact 12 of relay DTM(19). Relay LHK(28) operates in this circuit but the current is not sufficient to operate hold magnet HM02(28). The operation of relay LHK(28) verifies that battery is connected thereto through a hold magnet. Relay LHK(28) operates with the right side of its winding (ground on lead LHK) more positive than its left side (negative battery through the hold magnet winding).

Figure 26:
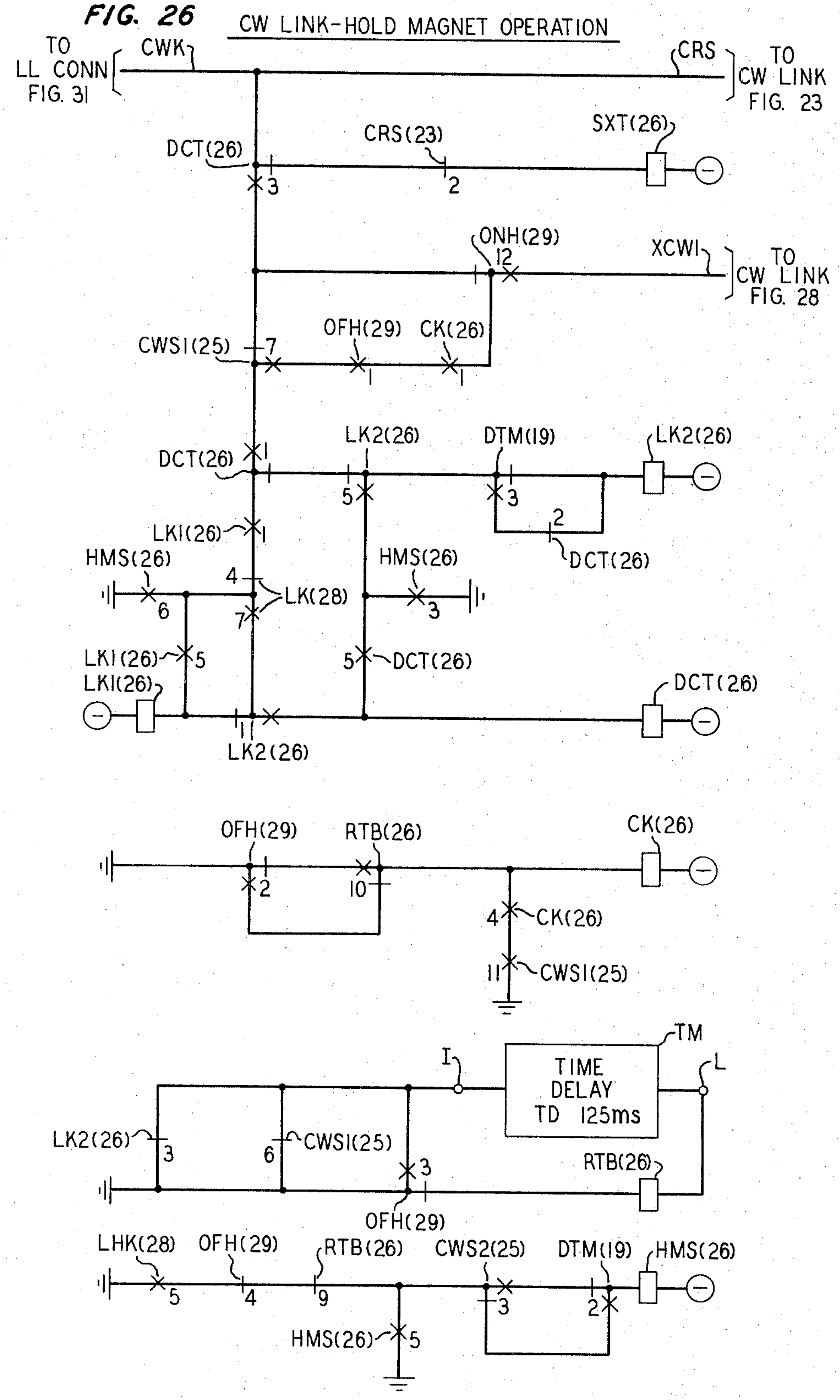

Upon the operation of relay LHK(28), relay HMS(26) is operated in a circuit extending from ground in FIG. 26, over make contact 5 of relay LHK(28), break contacts 4 and 9 of relays OFH(29) and RTB(26), break contact 3 of relay CWS2(25), make contact 2 of relay DTM(19), and to battery through the winding of relay HMS(26). In FIG. 28, the opening of break contact 12 of relay HMS(26) opens the circuit of the upper primary winding of relay XHM(28), thus insuring that relay XHM(28) remains released. With relay HMS(26) operated, relay LK(28) will operate to indicate a satisfactory operating path for hold magnet HM02(28). Upon the opening of break contact 4 of relay HMS(26) and the closing of make contact 14 of relay HMS(26), the plus 130 volt potential on the right terminal of charged capacitor LH is applied over make contact 4 of relay HMS(26) and to the previously traced operating path for hold magnet HM02(28). Relay LHK(28) releases due to the reversal of polarity across its winding; and, hold magnet HM02(28) operates quickly due to the relatively heavy flow of current as capacitor LH discharges through the upper primary winding of relay LK(28), which operates at this time. When relay LK(28) operates, relay LK1(26) is operated in a circuit extending from ground in FIG. 26, over make contact 6 of relay HMS(26), make contact 7 of relay LK(28), break contact 1 of relay LK2(26), to battery through the winding of relay LK1(26), which locks operated under control of make contact 5 of relay LK1(26) and make contact 6 of relay HMS(26). The operation of relay LK1(26) insures the release of relay LHK(28) by opening the circuit at the left side of relay LHK(28) over break contact 3 of relay LK1(26).

When hold magnet HM02(28) operates with select magnet SM00(27) previously operated (shown related to level zero in FIG. 13), the CW LK crosspoint (see FIG. 11) at level 00 (zero) of vertical 02 is closed. This crosspoint closure connects the tip lead T02 of customer line SO2 over vertical wire 0, over the closed crosspoint to horizontal wire 0 on level 00, over the horizontal wire 2 and the closed crosspoint to vertical wire 2, thence to the tip lead T02 to the line link terminal. Also, the ring lead R02 is connected over vertical and horizontal wires 1 and 3 of the closed crosspoint to ring lead R02 at the line link terminal. Break contacts 1 and 3 of hold magnet HM02(28) will have opened the previously existing direct connection in FIG. 11 of the customer line S02 to its line link terminal.

Figure 29:
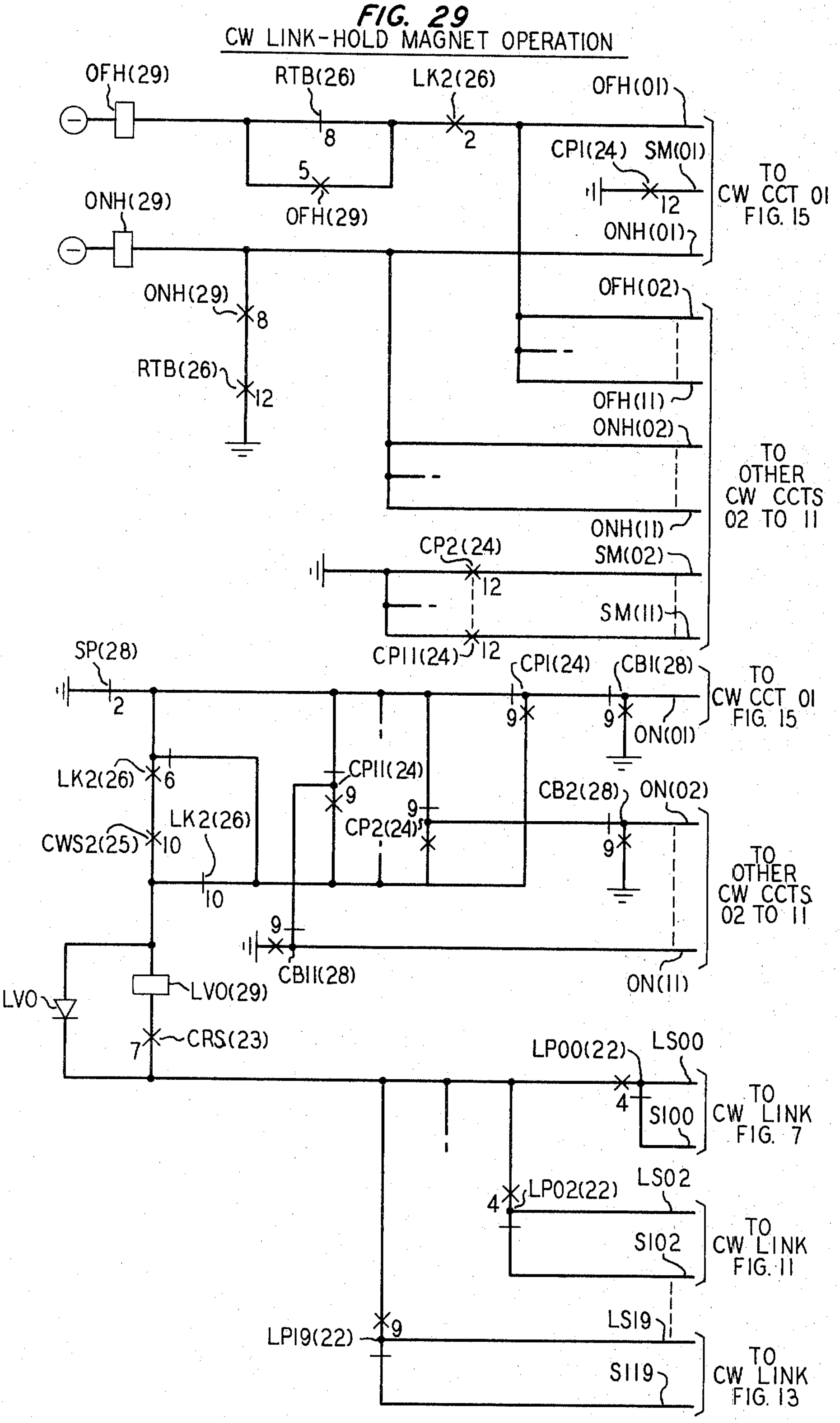

The closed crosspoint also provides a holding ground for hold magnet HM02(28) extending from ground in FIG. 29, over break contacts 2, 6 and 10 of relays SP(28), LK2(26) and LK2(26), through diode LV0, over make contact 4 of relay LP02(22), lead LS02 into FIG. 11, thence over the horizontal and vertical wires 5 of the closed crosspoint to lead HM02 into FIG. 28 to the left side of hold magnet HM02(28). This ground extends in FIG. 28 over previously traced circuitry to the right terminals of capacitor LH and diode LH, thus causing relay LK(28) to release as an indication of a closed crosspoint. At this point, relay LK2(26) is operated (to indicate that relay LK(28) has released) in a circuit extending in FIG. 26 from ground, over make contact 6 of relay HMS(26), break contact 4 of relay LK(28), make contact 1 of relay LK1(26), break contacts 1 and 5 of relays DCT(26) and LK2(26), make contact 3 of relay DTM(19), break contact 2 of relay DCT(26), to battery through the winding of relay LK2(26), which operates and locks over its own make contact 5 to ground over make contact 3 of relay HMS(26).

Upon the operation of relay LK2(26), the holding ground on lead HM02 from FIG. 11 into FIG. 28 is removed (due to removal of ground from lead LS02 between FIGS. 29 and 11) to place hold magnet HM02(28) in series with the upper primary winding of relay LK(28) through diode LH, resulting in the operation of relay LK(28) and the holding operated of hold magnet HM02(28). If a double crosspoint connection should happen to occur at this moment, relay LK(28) could not reoperate since ground would be present on the right terminals of capacitor LH and diode LH. The operation of relay LK(28) is an indication that no double connection exists. Relay DCT(26) now operates to signify a proper double connection test, the circuit extending from ground in FIG. 26, over make contact 6 of relay HMS(26), make contacts 7 and 1 of relays LK(28) and LK2(26), to battery through the winding of relay DCT(26), which operates and locks over its own make contact 5 to ground over make contact 3 of relay HMS(26). The operation of relay DCT(26) releases relay LK2(26), the release of which, as shown in FIG. 29, reapplies ground to lead LS02 from FIG. 29 into FIG. 11 and thence over the closed crosspoint on lead HM02 into FIG. 28 to hold operated the hold magnet HM02(28) and to again release relay LK(28) to signify the reapplication of the hold magnet holding ground.

At this point a signal is sent to the marker that the CW LK has completed its function of establishing a zero level crosspoint connection for customer SO2 in FIG. 11. This signal is the operation of marker relay CWK(37) in a circuit extending from ground in FIG.

26, over make contact 6 of relay HMS(26), break contact 4 of relay LK(28), make contact 1 of relay LK1(26), make contact 1 of relay DCT(26), break contact 7 of relay CWS1(25), make contact 3 of relay DCT(26), lead CWK into FIG. 31, make contact 4 of connector relay MCW(31), lead CWK into FIG. 37, over break contact 9 of relay CWS(38), to battery through the winding of relay CWK(37).

Upon the operation of relay CWK(37), the marker functions the same as it did in the previously described non-call waiting dial tone job. In this regard, the circuit in FIG. 38 for completing the connection in FIGS. 38 and 33 between leads SL1 and SL2, for operating relays GT1(107)(33) and GT2(90)(33), is extended over break contact 11 of relay NCW(37) and make contact 8 of relay CWK(37) instead of over make contact 11 of relay NCW(37) and break contact 6 of relay CWK(37). The marker eventually releases from the connection leaving all relays of the marker and the CW LK released, including relays LP02(22), DTM(19), HMS(26) and LK1(26) and select magnet SM00(27). However, in the CW LK, hold magnet HM02(28) remains locked operated in a circuit extending from battery in FIG. 28, through the winding of hold magnet HM02(28), lead HM02 into FIG. 11, over the number 5 wires of the closed level zero crosspoint to lead LS02 into FIG. 29, thence over break contact 4 of released relay LP02(22), lead S102 into FIG. 11, and to the sleeve lead S02, which is connected as in Busch to a holding ground in the connected originating register, which sleeve ground also is holding operated the line link hold magnet LH00(5)(11).

The customer S02 in FIG. 11 thus is connected over the level zero crosspoint of vertical 02 of the CW LK in FIG. 11 to an idle originating register. The register will supply dial tone to customer S02, who presumably thereupon dials the desired called number.

TROUBLE CONDITIONS — CW LK — DIAL TONE JOB

The CW LK circuitry performs a number of tests, as previously indicated, including a standing cross test, a hold magnet cross test and a select magnet cross test, along with other procedural checks. Detection of a trouble in any of these tests or checks causes the CW LK to stop progress and to signal the marker to request the making of a trouble record.

A standing cross test is made on lead CWK extending from FIG. 26 into FIG. 31 and thence to the circuit in FIG. 37 of the marker relay CWK(37). This test is for detecting the presence of a false ground on the CWK lead. In FIG. 26, prior to the operation of relay DCT(26), a circuit extends from battery in FIG. 26, through the winding of relay SXT(26), and over break contacts 2 and 3 of relays CRS(23) and DCT(26) to lead CWK into FIG. 31. If a false ground should appear on lead CWK in FIG. 26 prior to the operation of relay DCT(26) and the release of relay LK(28), when the CW LK is prepared to apply ground to lead CWK, relay SXT(26) will be operated. The operation of relay SXT(26) under these circumstances causes the operation in FIG. 28 of the CW LK stop progress relay SP(28) and the operation in FIG. 36 of the marker relay XAVGB(196)(36). Relay SP(28) is operated from ground in FIG. 28, over make contact 12 of relay DTM(19), make contact 8 of relay SXT(26), to battery through the winding of relay SP(28). Relay XAVGB(196)(36) operates in a circuit from ground on lead XCW from FIG. 28 to FIG. 31, over make contact 2 of connector relay MCW(31), lead XCW into FIG. 38, over make contact 6 of relay DT6(32), break contact 1 of relay CWF(38), break contact 1 of relay TBL(38), lead XCW into FIG. 36, and to battery through the winding of relay XAVGB(196)(36). The operation of relay SP(28) opens the ground circuit in FIG. 29 at its break contact 2, removing ground from extending from FIG. 29 over lead LS02 into FIG. 11 and thence over wires 5 of the crosspoint and lead HM02 into FIG. 28 to hold magnet HM02(28). This will prevent continued operation of hold magnet HM02(28), thus preventing the continued closure of the CW LK crosspoint. The operation in the marker of relay XAVGB(196)(36) will perform its usual function, as in Busch, of causing a trouble record to be made.

The crossed hold magnet test, previously mentioned, is made through the upper primary winding of relay XHM(28). It will be recalled that the capacitor XHM in FIG. 28 is allowed to charge through the upper primary winding of relay XHM(28) in series with at least one hold magnet, such as HM02(28), to negative battery. If only one hold magnet is in the charging circuit, the current for charging capacitor XHM will be insufficient to cause the operation of relay XHM(28). On the other hand, if two or more hold magnets are in parallel (erroneous crossed condition) in the charging circuit, relay XHM(28) will operate due to the larger surge of charging current for capacitor XHM. Relay XHM(28), in operating, removes at its break contact 5 the shunt across its lower secondary winding and allows a holding circuit for relay XHM(28) from ground, over make contact 12 of relay DTM(19), through resistor H2, through the lower secondary winding of relay XHM(28), and to battery through resistor H3. The operation of relay XHM(28) extends ground in FIG. 28 over its make contact 5 and through diode XHM1 to relay SP(28) and to lead XCW into FIG. 31, with the abovedescribed results incident to the operation of relays SP(28) and XAVGB(196)(36).

The crossed select magnet test, as previously discussed, is made through the upper primary winding of relay XS(27). It will be recalled that relay XS(27) is biased in its non-operate direction by current through its lower secondary winding under the control of make contact 9 of relay DTM(19). Current flows through the upper primary winding of relay XS(27) in series with at least one select magnet, such as SM00(27). If only one select magnet is in the circuit insufficient current flows to operate relay XS(27). On the other hand, if two or more select magnets happen to be in parallel operating circuits in FIG. 27 (crossed select magnet condition), then sufficient current will flow through the upper primary winding of relay XS(27) to cause its operation. It will be noted in FIG. 28 that the operation of relay XS(27) causes the operation of relay SP(28) and the grounding of lead XCW into FIG. 31 in a circuit extending from ground, over make contact 12 of relay DTM(19), break contact 5 of relay XHM(28), make contact 5 of relay XS(27) and through diode XS1 to the winding of relay SP(28) and to lead XCW extending into FIG. 31. Relays SP(28) of the CW LK and XAVGB(196)(36) of the marker are thus operated as described above.

ESTABLISHING ORIGINATING CONNECTION — INTRAOFFICE CALL

With the call waiting customer S02 of FIG. 11 connected with an originating register in a dial tone connection over level zero of the CW LK, CW LK hold magnet HM02(28) is operated and the level zero crosspoint in FIG. 11 is closed. The off-hook customer S02 may cause one of a number of situations to occur depending on whether the customer does no dialing at all (permanent signal situation), does not complete proper dialing (partial dial situation), dials a local office called number (intraoffice call), dials an outgoing call (subscriber outgoing call), dials a zero (operator call), and so forth. These situations are handled by the marker essentially as in Busch, the variations, if any, involved due to the presence of the CW LK being discussed hereinafter.

The present section will discuss an intraoffice call. Later sections will consider the outgoing call and the permanent signal situation.

Assuming that the customer S02 in FIG. 11 dials a local (local physical office A) number such as 636–7890, into the originating register, then as is well known, the register will call upon a marker (acting as a completing marker) to complete the desired connection if the called line is idle or to a busy tone trunk if the called line is busy. The register connects to an idle marker through connector circuits, as in Busch, and the marker is prepared circuitwise by a number of relay operations including the operation of relays CKG1(113)(-), CKG2(97)(-), CKG(97)(-), CKG4(93)(-) and CKG5(68)(-), along with relays ONW(111)(35), LLC2(96)(35), LLC1(96)(35), HMC(019)(-), HMT1(109)(-) and LXP1(109)(-). The calling line location information, transmitted to the register as a result of the dial tone connection, is transmitted back to the marker so that the marker may complete the call-back connection in due course.

The called office code 636 is transmitted from the register to the marker wherein relay TC7(153)(-) is operated to indicate that the called number is a seven-digit number. The marker translates the office code to operate relay LPA(132)(-) as an indication that the called number is in the local physical office A.

The called numericals 7890 are transmitted to and registered in the marker under the control of the operation of relays N4(125)(33) and N4A(125)(33). Relay N4(125)(33) operates in a circuit extending from ground in FIG. 33, over make contact 11 of relay CKG1(113)(-), break contact 1 of relay NR(132)(-), lead 13202, break contact 9 of relay CWC2(39), lead 13202, make contact 2 of relay LPA(132)(-), lead 15302, make contact 11 of relay TC7(153)(-), lead 13201, terminal NS7 cross-connected to terminal N4, lead 12500, cable 124-132A, lead 12500, and to battery through the winding of relay N4(125)(33). The significance of break contact 9 of the new relay CWC2(39) will appear later. Relay N4(125)(33), in operating, causes the operation of relay N4A(125)(33) in an obvious circuit in FIG. 33 over make contact 6 of relay N4(125)(33). The thousands digit of 7 will cause the operation of register relays TH0(124)(-) and TH7(124)(-), the hundreds digit of 8 will cause the operation of register relays HN1(145)(39) and HN7(145)(39), the tens digit of 9 will cause the operation of register relays T2(145)(39) and T7(145)(39) and the untis digit of 0 will cause the operation of register relays U4(146(39) and U7(146)(39), all in the well-known two-out-of-five code. The registration of the called number is held in the marker under control of the operated relays N4(125)(33) and N4A(125)(33). The registration of the called line numericals 7890 will be used to seize a number group circuit for translation of the hundreds, tens and untis digits into the line link frame location, the type of ringing required, the type of called line, et cetera; but, seizure of the number group circuit is delayed until the marker has found and selected an idle intraoffice trunk.

The marker, by examining the called number with reference to the calling subscriber, will operate various relays, including relay ITR2(93)(-), to control the establishment of an intraoffice call not needing the services of a sender. The seizure of a proper trunk link frame and an idle intraoffice trunk proceeds essentially as in the dial tone job for seizing an idle originating register. Incident to having seized an idle trunk, the marker will have operated its relay LCK(76)(-), along with others.

Having seized an idle intraoffice trunk, the marker is then in the proper condition to seize a number group circuit to find the location of the called line on the line link frame. Relays FLG(115)(32) and FLG1(32) are operated when the marker is ready to initiate action to establish the first link (terminating link to called line) of the intraoffice connection. The circuit for operating relay FLG(115)(32) extends from ground in FIG. 32, over make contact 1 of relay CKG3(97)(-), lead 9312, make contact 4 of relay ITR2(93)(-), lead 9218, break contact 1 of relay LK1(92)(-), lead 11501, to battery through the winding of relay FLG(115)(32). The new relay FLG1(32) operates in a circuit extending from ground on lead 11501, over break contact 2 of relay RCY3(42), to battery through the winding of relay FLG1(32).

As in Busch, a number of relay operations take place leading up to seizure of the appropriate number group circuit which is determined by the thousands digit 7 of the called numericals 7890. Relays SNG1(198)(41) and SNG2(198)(41) are operated in a circuit extending from ground in FIG. 41, over make contact 5 of relay FLG(115)(32), lead 17908, cable 116–179, lead 17908, and break contact 5 of relay RNG(179)(-), to lead 20000. Grounded lead 20000 extends over break contact 1 of PUL(200)(-), break contact 4 of new relay RCY2(35), break contact 7 of relay CKO(179)(-), lead 17205, cable 171–178, lead 17205, break contact 4 of relay MRL1(172)(-), lead 19900, cable 171–178, lead 19900, and to battery through the windings in series of relays SNG1(198)(41) and SNG2(198)(41), which thereupon operate. Also, relay LLI(178)(42) operates in a circuit extending from ground in FIG. 42, over make contact 2 of new relay FLG1(32), lead 11502, cable 116–179, lead 11502, break contact 7 of relay PUL(200)(-), lead 20002, break contact 1 of relay CKO(179)(-), to battery through the winding of relay LLI(178)(42). In FIG. 42, the significance of the replacement of make contact 6 of relay FLG(115)(32) by make contact 2 of the new relay FLG1(32) will be explained below. Relay VFL1(31)(32) is operated in an obvious circuit in FIG. 32 under control of make contact 3 of relay FLG(115)(32). Another relay OAN(124)(-) is also operated, whereupon the number group start lead 12400 in FIG. 34 is energized to cause seizure of the number group circuit, the energizing circuit extending from battery in FIG. 34, through resistor NGS(176)(34), over a circuit not of present interest, thence over make contact 11 of relay SNG2(198)(41), lead 19801, cable 146–177, lead 19801, break contact 10 of new relay CWC2(39), lead 19801, make contact 5 of relay TH0(124)(-), break contacts 8 of relays TH1(124)(-) and TH2(124)(-) and TH4(124)(-), make contact 6 of relay TH7(124)(-), make contact 1 of relay TH0(124)(-), make contact 1 of relay TH7(124)(-), and make contact 3 of relay OAN(124)(-) to the number group start lead 12400, which causes seizure of the proper number group circuit for translating the hundreds, tens and units digits for one thousand numbers having the thousands digit of 7, as in the called number 7890. In FIG. 34, relay PTK(117)(34) will have been operated from lead 15102 as a check of the physical versus theoretical office within which the called number exists.

From the seized number group, into which the last three digits 890 of the called number are registered, the marker receives the line link frame location information along with the proper ringing combination for the called line. The marker receives the tens and units digits of the called line link frame number, the horizontal and vertical group locations on that frame, and the vertical file location and ringing combination code. In FIG. 35 one of the ringing combination relays RCT1(188)(35) to RCT10(167)(35) will be operated as a result of the operation from the number group of one of the ringing combination number relays RCN1(167)(-) to RCN10(167)(-). For instance, relay RCT1(188)(35) would be operated in a circuit extending from ground in FIG. 35, over make contact 1 of relay RCN1(166)(-), lead 16623, through the winding of relay RCT1(188)(35), lead 18801, cable 166–197, lead 18801, and to battery through the upper winding of relay XRCT(175)(35). As another example, the circuit for operating relay RCT10(167)(35) extends from ground in FIG. 35, over make contact 1 of relay RCN10(166)(-), lead 16624, over break contact 8 of the new relay CWC2(39), lead 16624, cable 187–194, lead 16624, break contact 8 of relay MT1(193)(-), lead 19313, and through the winding of relay RCT10(167)(35) to lead 18801, et cetera. Actually, as in Busch, there are 15 relays RCN1(166)(-) through RCN15(166)(-) controlling 15 relays RCT1(188)(35) through RCT8(188)(-), RCT9(167)(-) and RCT10(167)(35) through RCT15(167)(-); but, the circuit for relay RCT10(167)(35) is the only one affected by the new circuitry, as will be explained later as to the significance in FIG. 35 of break contact 8 of new relay CWC2(39).

The marker attempts to complete the connection between the called line and the intraoffice trunk; and, since the called line location information, et cetera, is registered in the marker, the latter proceeds to release the number group circuit. Relays RNG(179)(-) and NR(132)(-) are operated and relay OAN(124)(-) is released incident to the release of the number group circuit. Relays N4(125)(33) and N4A(125)(33) release upon the operation of relay NR(132)(-); and, the release of relays N4(125)(33) and N4A(125)(33) releases the called number (7890) registration in the marker including the operated thousands digit relays THO(124)(-) and TH7(124)(-), the operated hundreds digit relays HN1(145)(39) and HN7(145)(39), the operated tens digit relays T2(145)(39) and T7(145)(39) and the operated units digit relays U4(146)(39) and U7(146)(39). Upon the operation of relay RNG(179)(-), relays SNG1(198)(41) and SNG2(198)(41) are released; and, in FIG. 34, the start lead 12400 to the number group circuit is deenergized. The number group circuit is thus released and is available for another use by a completing marker.

The marker will seize the line link frame whereon the called line is located and will test the called line as to its busy-idle condition. If the called line is busy, relay LBT(90)(-) will be operated as usual, resulting in the operation in FIG. 38 of new relay LBTA(38) in a circuit extending from ground in FIG. 32, over make contact 1 of relay LLC1(96)(35), make contact 1 of relay LBT(90)(-), lead LBT into FIG. 35, thence over new lead LBA into FIG. 38 and to battery through the winding of relay LBTA(38). Assuming that the line link frame is not associated with a CW LK, relays XVGB(196)(34) and CWL(37) will be released, along with relay DT6(32) since the marker is not involved in a dial tone connection function, thus completing a circuit for operating the line busy relay LB(90)(35) from ground in FIG. 38, over make contact 5 of relay LBTA(38), break contact 2 of relay XVGB(196)(34), break contact 2 of relay CWL(37), break contact 4 of relay DT6(32), lead LB into FIG. 35, thence over cable 108–191, lead LB, break contact 7 of relay SPL1(191)(-), lead 17410, cable 108–191, lead 17410, and to battery through the winding of relay LB(90)(35), which operates and locks over its make contact 10 to ground over make contact 2 of relay CKG2(97)(-). The marker will thereupon, as usual, release from the line link frame, release the intraoffice trunk, seize an idle-busy tone trunk, and connect the calling customer S02 of FIG. 11 to busy tone. If the called line is idle, relays LBT(90)(-), LBTA(38) and LB(90)(35) will not operate; and, the marker will proceed to complete the terminating connection to the idle called line in a manner essentially as in a dial tone connection.

Assuming that the called line has been found idle and that the marker has connected that line to the idle seized intraoffice trunk, the marker will proceed to test the terminating connection. In the meantime, the marker will have set the ringing code switch, will have operated the ringing control relay in the intraoffice trunk, and will have operated relay HMS1(92)(32) in a circuit extending from ground in FIG. 32, over make contact 1 of relay LLC1(96)(33), break contact 2 of relay LBT(90)(-), lead 17404, cable 108–174, lead 17404, break contact 3 of relay NCA(174)(-), lead 9005, cable 108–174, lead 9005, break contact 9 of relay LB(90)(35), break contact 11 of relay DT2(109)(32), break contact 3 of new relay LBTA(38), make contact 3 of relay HMC(109)(-), break contact 8 of relay HMT1(109)(-), make contact 2 of relay HMS(109)(-), lead 17604, break contact 2 of relay SP(176) (-), lead 9209, and to battery through the winding of relay HMS1(92)(32). As will be seen later, break contact 3 of relay LBTA(38) prevents the operation of relay HMS1(92)(32) on a marker CW recycle.

A successful test of the called line connection by the marker results, as usual, in the operation of relay LK1(92)(-), which will initiate the release of the marker from the called line link frame. The operation of relay LK1(92)(-) releases relays ONW(111)(35), LLC2(96)(35) and LLC1(96)(35), which releases relays CON1(107)(33) and CON2(107)(33). The operation of relay LK1(92)(-) also releases relays FLG(115)(32) and FLG1(32), followed by the release of relays VFL1(31) (32) and LLI(178)(42). All relays in the marker are thereupon released regarding the called line identification information, with the marker released from the called line link frame, with the marker still connected to the trunk link frame terminating the intraoffice trunk, and with the called line being held by way of the connected intraoffice trunk.

At this point the marker initiates its call back operation to complete the originating part of the intraoffice connection. As in Busch, relay SCB(92)(41) operates in a circuit extending from ground in FIG. 41, over back contacts 2 of relays JCKO(82)(-) and JCK1(82)(-), lead 7605, break contact 1 of relay LCK(76)(-), break contact 3 of relay HGK(76)(-), break contact 1 of relay TCHK(76)(-), break contact 1 of relay LK(76)(-), break contact 1 of relay RK(76)(-), lead 9221, break contact 11 of relay TK(92)(-), make contact 4 of relay LK1(92)(-), lead 9314, make contact 1 of relay ITR2(93)(-), lead 9220, and to battery through the winding of relay SCB(92)(41), which locks through its make contact 5 to ground on lead 9222 over make contact 4 of relay CKG4(93(-). Relay SCB1(117)(41) thereafter operates as an indication of the release of the marker relays which were used to register the called line location information from the number group and which were used in testing the integrity of the terminating connnection between the called line and the intraoffice trunk. The operate path for relay SCB1(117)(41) extends from battery in FIG. 41, through the winding of relay SCB1(117)(41), over lead 11702, cable 116–179, lead 11702, break contact 2 of relay PUL(200)(-), thence over break contact 7 of new relay RCY3(42) to lead 20003 instead of directly to lead 20003 as in Busch, over cable 108–179, lead 20003, break contact 3 of relay CON1(107)(33), lead 10724, break contacts 8 and 9 of relays GT2(90)(33) and GLH1(90)(-), lead 9020 into FIG. 42, break contact 1 of relay SL(109)(-), make contact 7 of relay HMT1(109)(-), make contact 3 of relay SCB(92)(41), lead 9223, cable 110–179, lead 9223, break contact 2 of relay CKO(179) (-), and to lead 17906, et cetera, through circuitry of the prior art to ground. Also, relays ONW(111)(35), LLC2(96)(35) and LLC1(96)(35) are operated in a circuit previously traced in FIG. 35 except that at this time leads 9300 and 18800 are connected through make contact 2 of relay SCB1(117)(41).

The marker, having still registered therein the line link frame location information regarding the calling customer SO2 in FIG. 11, proceeds to connect with that line link frame through the line link connector, part of which is shown in FIG. 31. This function is essentially the same as described for the dial tone connection. In FIG. 31, the connector relays MCA11(6)(31), MCB1(2)(31) and MCA21(6)(31) are operated as before. The operation of connector relay MCB1(2)(31) causes the operation of the new connector relay MCW(31) as before; and, as before, relay CWL(37) is operated to inform the marker that it has connected to a line link frame with which is associated a CW LK. Relays VGTO(26)(-), HGTO(29)(-) and VFTO(31)(-) are operated according to the vertical group 0, horizontal group 0 and vertical file 0 information pertaining to the calling customer SO2 in FIG. 11. Also, as before, relay XVGB(196)(34) is operated in series with the parallel relays VGB0(2)(31) and VGA00(18); and, relays HGO(5)(31) and HG0(18) are operated in parallel as before.

The marker proceeds to release the dial tone connection (including release of the attached originating register) and to connect the calling line S02 of FIG. 11 to the intraoffice trunk. Release of the dial tone connection includes removal of the holding ground in FIG. 11 on the sleeve lead S02, which ground has been holding operated the hold magnet LH00(5)(11) on the line link frame and the hold magnet HM02(28) on the CW LK. When the dial tone connection has been released, including hold magnets LH00(5)(11) and HM02(28), the line relay L00(5)(11) will reoperate from the off-hook line S02 over break contacts 1 and 3 of hold magnet HM02(28) and break contacts 1 and 2 of hold magnet LHOO(5)(11); but, as in Busch, circuitry exists for preventing the reoperation of line relay L00(5)(11) from starting a false dial tone marker seizure operation.

When the dial tone linkage has released, including the opening of the level zero crosspoint of the CW LK in FIG. 11 due to the released hold magnet HMO 2(28), the marker proceeds in its usual fashion to operate select and hold magents on the line link and trunk link frames to interconnect the calling customer SO2 of FIG. 11 to one end of the interoffice trunk, to the other end of which is connected to called line. This marker function includes the reoperation of the line link line hold magnet LH00(5)(11) for the calling customer SO2. Thus, when the dial tone connection is released and the call back linkage is established, the CW LK level zero crosspoint connection of customer S02 to its usual line link terminal has been changed to a direct connection of customer S02 to its usual line link terminal over back contacts 1 and 3 of the CW LK released hold magnet HM02(28).

Figure 36:
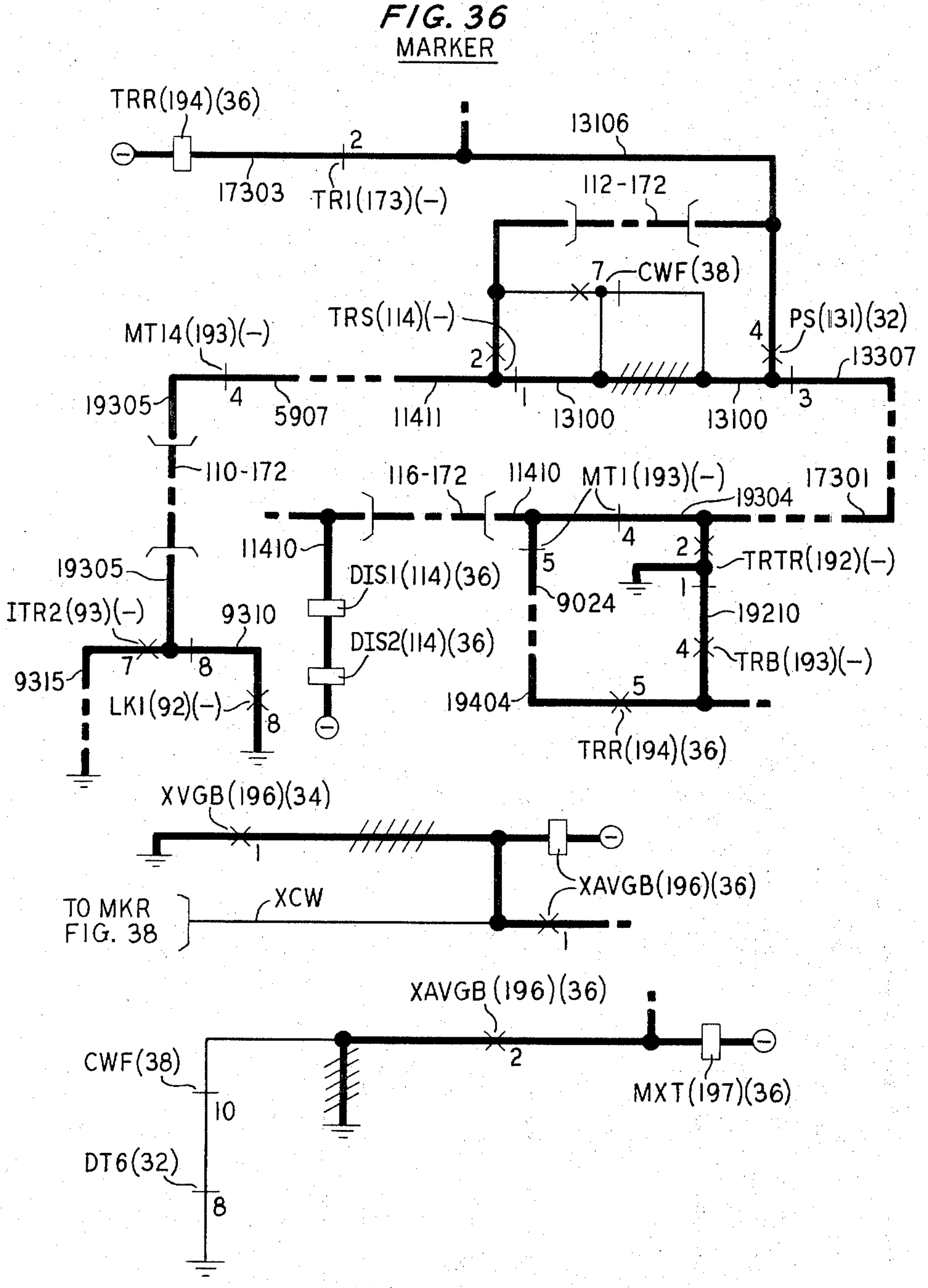

The marker thereupon (1) tests for false ground, continuity and double connection as in the dial tone connection, (2) passes supervision of the connection to the intraoffice trunk and (3) initiates its release by the operation in FIG. 36, as in Busch, of relays DIS1(114)(36) and DIS2(114)(36).

Eventually, all marker relays will have been released, as will the connector relays of FIG. 31, along with the CW LK relays which were operated incident to the marker seizure of the line link frame during the call back sequence of functions.

The call waiting customer S02 in FIG. 11 is connected over break contacts 1 and 3 of its CW LK released hold magnet HM02(28) to its usual network line link terminal at the bottom right in FIG. 11, thence, due in part to its operated line link line hold magent LH00(5)(11), over the line link to trunk link networks to the intraoffice trunk which is also connected over a similar linkage to the called line. The trunk maintains supervision over the connection including maintaining a holding ground on the sleeve of the connection for holding operated the hold magnets involved in the connection. Upon termination of the call, when the calling and called customers disconnect to their on-hook conditions, the trunk releases the entire linkage and itself to normal, including the release of hold magent LH00(5)(11).

ESTABLISHING ORIGINATING CONNECTION - OUTGOING CALL

A call placed by call waiting customer S02 in FIG. 11 might, as in Busch, be a call outgoing from the local office. The marker functions are quite similar to the previously described situation involving an intraoffice call. The basic differences amount to the marker seizing an outgoing trunk, connecting the calling line to the trunk, and attaching a sender to the trunk for outpulsing when required. The dial tone connection would be exactly as previously described.

When the connection is completed, the calling customer SO2 in FIG. 11 would be connected to the outgoing trunk as in the case of the intraoffice call except that the other part of the outgoing trunk extends beyond the local office to a called customer. Customer SO2 in FIG. 11 would be connected to its usual line link terminal over back contacts 1 and 3 of its CW LK hold magnet HM02(28) since, as in the intraoffice connection, the level zero crosspoint connection on the CW LK used for dialing protection would have been released when the outgoing connection was completed.

ESTABLISHING PERMANENT SIGNAL CONNECTION

When the call waiting customer is connected to an originating register in a dial tone connection it is presumed that the off-hook condition of the calling customer's line is a legitimate request for dial tone; so, the originating register awaits the dialing of digits for a prescribed time interval before deciding that a permanent signal condition exists on the calling line. If a possible permanent signal condition exists, the register will connect to a marker as in the intraoffice call except that no called digits will have been dialed into the register. Under these circumstances, the marker will effect a connection from the off-hook customer S02 in FIG. 11 to a tone trunk on the trunk link frame; and, the connection will be effected over level zero of the CW LK. This is accomplished by the marker holding closed the level zero CW LK crosspoint used on the dial tone connection.

When the originating register connects to an idle completing marker the permanent signal relay PS(131)(32) of the marker is operated in parallel with the new relay PSP(32). The marker thereupon proceeds to seize a permanent signal trunk on the trunk link frame and to interconnect the calling customer S02 to that tone trunk in much the same manner as in selecting and connecting an outgoing trunk to customer S02 for an outgoing call. In the process of effecting the permanent signal connection, the marker, as usual, will have released the dial tone connection, along with the originating register, and will have completed a new linkage from the usual line link frame terminal of the customer line S02 in FIG. 11 to trunk link frame terminal of the permanent signal trunk.

As soon as the marker enters the line link frame through the line link connector of FIG. 31, the marker initiates action to hold operated the hold magnet HM02(28) in order to retain the closed level zero crosspoint in FIG. 11 for use in the permanent signal connection. Part of the circuit extends from ground in FIG. 37, over make contact 8 of relay PSP(32), make contact 10 of relay CWL(37), make contact 6 of relay FTK1(47)(-), make contact 10 of relay VFTO(31)(-), lead VFO into FIG. 31, make contact 24 of connector relay MCW(31), lead VFO into FIG. 19, over make contacts 1 and 10 of relays HGO(18) and VGA00(18), lead VF0(HG0)(VG00) into FIG. 22 to the lower left terminal, thence over the cross-connection to battery through the winding of relay LP02(22), which thereupon operates. The operation of relay LP02(22) completes a circuit for holding operated the operated CW LK hold magnet HMO2(28), which is holding closed the level zero crosspoint in FIG. 11. This circuit extends from ground in FIG. 29, over break contact 2 of relay SP(28), break contacts 6 and 10 of relay LK2(26), through diode LVO, over make contact 4 of relay LPO2(22), lead LSO2 into FIG. 11, over the number 5 wires of the closed level zero crosspoint on vertical 02, lead HMO2 into FIG. 28, and to battery through the winding of hold magnet HMO2(28). This ground in FIG. 11 on lead LSO2 from FIG. 29 takes the place of the ground on sleeve lead S02 in FIG. 11 (from the lead 650 in FIG. 11 at the line link frame) previously extending over lead S102 from FIG. 11 into FIG. 29 and over break contact 4 of relay Lp02(22) to lead LS02 into FIG. 11. Thus, when the marker releases the dial tone connection, including the release in FIG. 11 of the line link line hold magnet LH00(5)(11), the CW LK hold magnet HM02(28) will not be released.

When the marker has completed the permanent signal connection to customer line S02 in FIG. 11, the line link line hold magnet LH00(5)(11) will be reoperated and ground will again be supplied from the trunk over the sleeve lead of the connection back into FIG. 11 so as to hold all of the hold magnets operated, including the CW LK hold magnet HM02(28) upon the subsequent release of relay LP02(22).

During the course of the marker functions regarding the permanent signal connection, relay TRR(194)(36) is operated to initiate the making of a trouble record prior to the operation of the marker disconnect relays DIS1(114)(36) and DIS2(114)(36). The circuit for operating relay TRR(194)(36) extends from ground in FIG. 36, over make contact 8 of relay LK1(92)(-) which will have been operated following completion of the permanent signal connection, lead 9310, break contact 8 of relay ITR2(93)(-), lead 19305, cable 110–172, lead 19305, break contact 4 of relay MT14(193)(-), lead 5907, a circuit not of interest here, lead 11411, break contact 1 of relay TRS(114)(-), lead 13100, break contact 7 of new relay CWF(38), lead 13100, make contact 4 of the permanent signal relay PS(131)(32), lead 13106, break contact 2 of relay TR1(173)(-), lead 17303, and to battery through the winding of relay TRR(194)(36). The operation of relay TRR(194)(36) causes the marker to be connected to the trouble recorder; and, when the recorder has completed making its trouble record, relay TRB(193)(-) is operated. The operation of relay TRB(193)(-), with relay TRR(194)(36) also operated, completes a circuit in FIG. 36 for operating the disconnect relays DIS1(114)(36) and DIS2(114)(36) from ground in FIG. 36, over break contact 1 of relay TRTR(192)(-), lead 19210, make contacts 4 and 5 of relay TRB(193)(-) and TRR(194)(36), lead 19404, a circuit not of interest here, break contact 5 of relay MT1(193)(-), lead 11410, cable 116–172, lead 11410, and to battery through the windings of relays DIS1(114)(36) and DIS2(114)(36), thus to bring about a normal release of the marker but only after completion of a trouble record. In FIG. 36, the transfer contacts 7 of new relay CWF(38) will cause the same relay TRR(194)(36) operation upon a failure in the CW LK circuit as will be discussed.

Eventually, the marker and CW LK circuits will be released, leaving the off-hook customer S02 of FIG. 11 connected to a permanent signal trunk over the closed level zero crosspoint of FIG. 11 under control of the operated CW LK hold magnet HM02(28). As soon as customer S02 goes back on-hook, the trunk circuit will detect that fact and will effect the release of the entire connection, including the release of the CW LK hold magnet HM02(28).

ATTEMPTING TERMINATING CONNECTION — GENERALLY

A connection intended to be terminated at the call waiting customer S02 of FIG. 11 could be, for instance, an intraoffice call or an incoming call, in either case the customer S02 being the called customer. In any case, the marker will be seized by an originating register (intraoffice call) or by an incoming register (incoming call). The marker will be informed by the register as to the called number and the nature of the call. In the case of an intraoffice call, as previously discussed, the marker will connect to the line link frame in an attempt to connect the called line to one part of the intraoffice trunk circuit; and, in the case of an incoming call, the marker will connect to the line link frame in an attempt to connect the called line to the incoming trunk circuit.

In the following discussions, it will be assumed that the numerical part of the directory number of customer S02 is 7800 and that customer S02 is part of single physical office A for the marker. When the marker is prepared for the terminating connection function, the following marker relays will have been operated: CKG1(113)(-), CKG2(97), CKG3(97)(-), CKG4(93)(-), CKG5(68)(-), ITR2(93)(-) for an intraoffice call, TER2(93)(-) for an incoming call. The called numericals 7800 will cause the operation (using the usual two-out-of-five code) in the marker of the following relays: TH0(124)(-) and TH7(124)(-) for the thousands digit of 7; HN1(145)(39) and HN7(145)(39) for the hundreds digit of 8; T4(145)(39) and T7(145)(39) for the tens digit of 0; and, U4(146)(39) and U7(146)(39) for the units digit of 0. Other relays will be operated or released as in the usual prior art context of Busch: in FIG. 32, relays FLG(115)(32) and FLG1(32) will be operated under the control of either make contact 4 of relay ITR2(93)(-) for an intraoffice call or make contact 9 of relay TER2(93)(-) for a terminating (incoming) call and relay VFL1(31)(32) will be operated as before; in FIG. 33, the appropriate pair of relays N1(125)(33) through N4A(125)(33) will be operated to steer the called numericals into the proper register relays in the marker as in Busch; in FIG. 35, relays ONW(111)(35), LLC2(96)(35) and LLC1(96)(35) will be operated as previously discussed; in FIG. 41, relays SNG2(198)(41) and SNG1(198)(41) will be operated as previously discussed; and, in FIG. 42, relay LLI(178)(42) will be operated.

The marker will connect to the proper number group circuit as usual in order to obtain the line link location information regarding the called line S02 in FIG. 11. Since the called line S02 is assumed to have a thousands digit numerical of 7, the number group start lead 12400 in FIG. 34 will be energized, as previously discussed, to cause the marker to connect with the appropriate number group circuit. The number group will cause the operation in the marker as previously discussed, of relays to register the line link frame number, the horizontal and vertical group, the vertical file, and the ringing combination, including relays HGT0(29)(-), VGT0(26)(-), VFT0(31)(-), HTK1(44)(-), VTK1(43)(-), FTK1(47)(-), one of the relays RCN1(166)(-) through RCN10(166)(-), one of relays RCT1(188)(35) through RCT10(167)(35) and relay PTK(117)(34).

The marker will eventually seize the identified line link frame through the line link connector circuitry, part of which is shown in FIG. 31, by causing the operation, as before, of the connector relays MCA11(6)(31), MCB1(2)(31), MCA21(6)(31) and MCW(31); and, relay CWL(37) will be operated in the marker as an indication that the line link frame has a CW LK associated therewith. And, as before, relay HGO(5)(31) will be operated in parallel with relay HGO(18), relay VGB0(2)(31) will be operated in parallel with relay VGA00(18) and relay XVGB(196)(34) will be operated. In the CW LK, the operation of relay VGA00(18) will cause the operation of relay VGB00(18); and, relay LP02(22) will be operated since the called customer S02 of FIG. 11 is a call waiting customer.

The marker functions next according to the circumstances such as whether the customer S02 is busy or idle at its usual line link terminal. If the customer S02 is idle at its line link terminal a connection will be made thereto. If the customer S02 is busy at its line link terminal, a connection thereto will not take place if the busy condition involves a level zero CW LK crosspoint. If the customer S02 is busy at its line link terminal in a connection not involving a level zero CW LK crosspoint, the marker will initiate action to involve one of the call waiting circuits.

In subsequent sections various of the above situations will be discussed.

ATTEMPTING TERMINATING CONNECTION — LEVEL ZERO CONNECTION EXISTING

If the called customer line S02 of FIG. 11 is busy at the moment in a connection involving a closed level zero crosspoint on the CW LK, the CW LK hold magnet HM02(28) will be operated, as will the line link line hold magnet LH00(5)(31), and customer S02 of FIG. 11 will be connected into the switching network over the level zero closed crosspoint for vertical 02 in FIG. 11. If the marker attempts to terminate a connection to such a busy line, the line will be found busy; and, since the line is busy in a level zero CW LK connection, no attempt will be made to attach a call waiting circuit (CW CCT) thereto.

Under the above assumed circumstances, the hold magnets LH00(5)(11) and HM02(28) are held operated in a circuit extending from ground on lead 650 in FIG. 11 (supplied by an originating register or a permanent signal trunk, et cetera) to the sleeve lead S02 of the connection, thence to battery through the winding of the line link hold magnet LH00(5)(11), and over lead S102 into FIG. 29, over break contact 4 of relay LP02(22), lead LS02 into FIG. 11, over the number 5 wires of the level zero closed crosspoint of vertical 02 on the CW LK, lead HM02 into FIG. 28, and to battery through the winding of hold magnet HMO2(28). The line relay L00(5)(11) will be released since its operating circuit is open at break contacts 1 and 2 of the line link line hold magnet LH00(5)(11).

When the marker connects with the line link frame through the line link connector of FIG. 31, connector relays MCA11(6)(31), MCB1(2)(31), MCA21(6)(31) and MCW(31) will be operated as previously discussed. Also, relays CWL(37), XVGB(196)(34), HG0(5)(31), HG0(18), VGB0(2)(31), VGA00(18) and VGB00(18) will be operated.

The marker will test the called line S02 for its busy-idle condition as usual and will operate relay LBTA(38), as previously discussed, as an indication that the called line is busy. Relay CWS(38) is then operated to prepare for a call waiting start function, if required, the circuit extending from ground in FIG. 38, over make contact 5 of relay LBTA(38), make contact 2 of relay XVGB(196)(34), make contact 1 of relay CWL(37), break contact 3 of relay DT6(32), break contacts 10 of relays NCW(37) and CWK(37), to battery through the winding of relay CWS(38), which operates and locks over its make contact 12 to the operating ground supplied from break contact 3 of relay DT6(32). Relay LBTA(38) thereupon locks operated in a circuit extending from its winding in FIG. 38, over its make contact 1, make contact 3 of relay CWS(38), lead L into FIG. 32, and to ground over make contact 1 of relay LLC1(96)(35). Upon the operation of relay CWS(38), relay LP02(22) is operated in a circuit extending from ground in FIG. 37, over make contact 10 of relay CWS(38), through the upper winding of relay XCW(37), over make contacts 10 and 6 of relays CWL(37) and FTK1(47)(-), over make contact 10 of relay VFT0(31)(-), lead VF0 into FIG. 31, over make contact 24 of connector relay MCW(31), lead VF0 into FIG. 19, over make contacts 1 and 10 of relays HG0(18) and VGA00(18), lead VF0(HG0)(VG00) into FIG. 22 to the lower left terminal, and over the cross-connection to battery through the winding of relay LP02(22).

In FIG. 19, as soon as battery and ground potentials are applied to the CW LK circuitry, relay EP4(19) was operated in a circuit extending from ground in FIG. 19, over break contact 4 of relay CWS1(25), break contact 4 of relay EP2(19), break contact 6 of relay EP1(19), to battery through the winding of relay EP4(19), which operates and locks over two parallel circuits, one under control of make contact 12 of relay EP4(19) and break contact 4 of relay CWS1(25) and the other under control of make contact 11 of relay EP4(19) and break contact 4 of relay EP1(19). As soon as relay EP4(19) operates, relay EP1(19) is operated in a circuit extending from ground in FIG. 19, over break contact 1 of relay CWS1(25), make contact 9 of relay EP4(19), break contact 10 of relay EP3(19), to battery through the winding of relay EP1(19), which operates and locks over two parallel circuits, one under control of make contact 12 of relay EP1(19) and break contact 1 of relay CWS1(25) and the other under control of make contact 11 of relay EP1(19) and break contact 10 of relay EP2(19).

Figure 25:
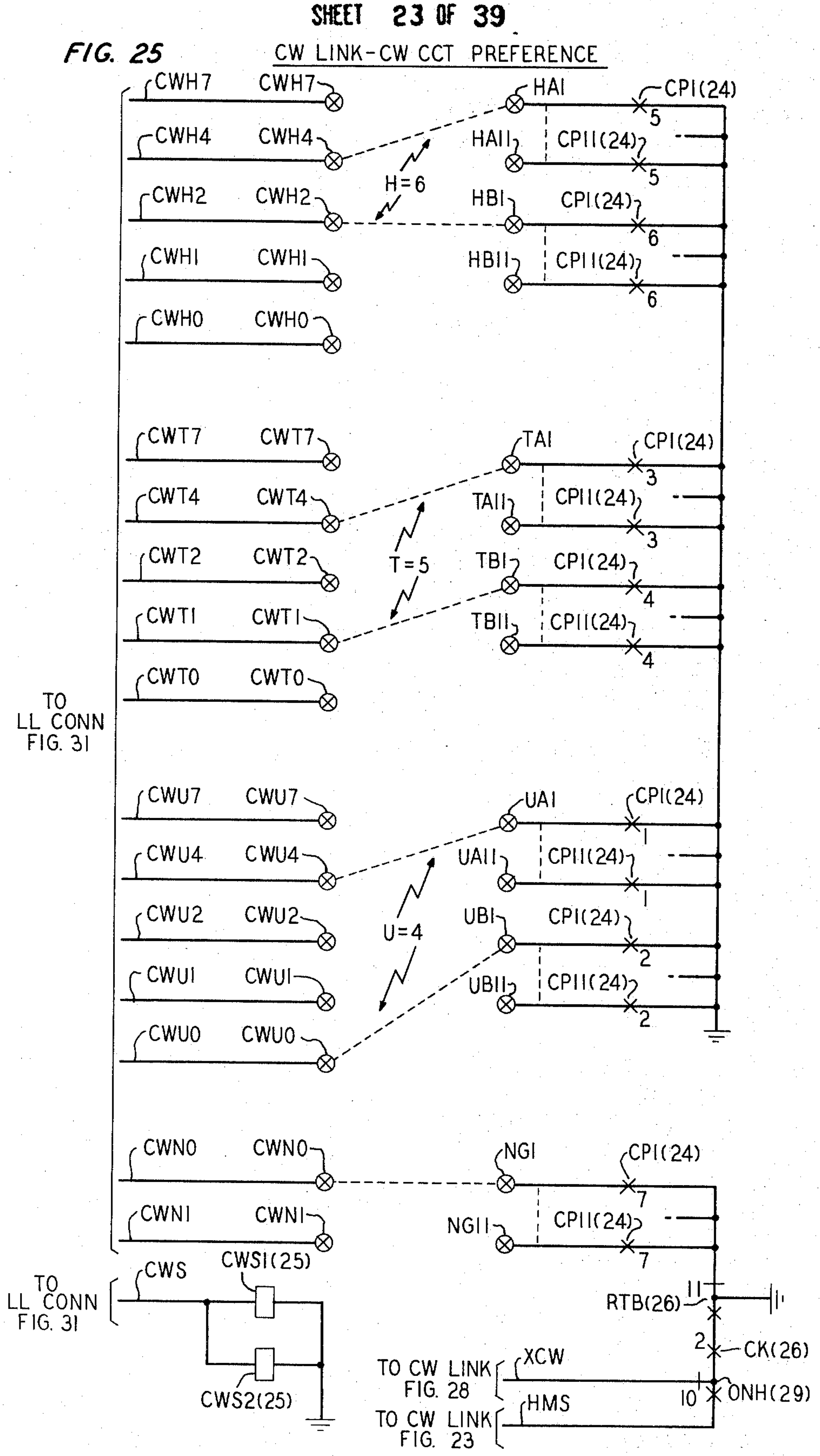

Upon the operation of relay CWS(38), as above described incident to finding the called line S02 busy, the call waiting start relays CWS1(25) and CWS2(25) are operated in a circuit extending from battery in FIG. 37, through resistor CWS, over make contact 1 of relay CWS(38), break contact 2 of relay CWR(37), lead CWS into FIG. 31, over make contact 12 of connector relay MCW(31), lead CWS into FIG. 25, to ground through the parallel windings of relays CWS1(25) and CWS2(25). In FIG. 19, upon the operation of relay CWS1(25), relay EP4(19) is released, leaving relay EP1(19) operated alone of the four relays EP1(19), EP2(19), EP3(19) and EP4(19). Relay CRS(23) is thereupon operated in a circuit extending from ground in FIG. 23, over break contact 11 of relay DTM(19), make contacts 5 of relays CWS2(25) and CWS1(25), break contacts 8 of relays EP4(19) and EP3(19) and EP2(19), make contact 8 of relay EP1(19), break contact 1 of relay HMS(26), make contact 1 of relay LP02(22), make contact 2 of the CW LK hold magnet HM02(28), to battery through the winding of relay CRS(23).

At this point a signal is sent to the marker that the busy called line S02 is not available for call waiting service, which signal is the operation of relay NCW(37) in the marker. When relay CRS(23) operates as above discussed, plus 130 volt battery is applied in FIG. 28, through resistor CRS, over make contact 3 of relay CRS(23), make contact 2 of relay LP02(22), to the left side of the winding of hold magnet HM02(28), thus holding operated that hold magnet, thence over lead HM02 into FIG. 11, over the number 5 wires of the closed level zero crosspoint, lead LS02 into FIG. 29, over make contact 4 of relay LP02(22), make contact 7 of relay CRS(23), through the winding of the level zero relay LV0(29), break contacts 10 and 6 of relay LK2(26), to ground over break contact 2 of relay SP(28). The diode LV0 in FIG. 29 is reverse biased by the plus 130 volts and relay LV0(29) operates. The line link line hold magnet LH00(5)(11) in FIG. 11 is held operated from the system sleeve lead S02 grounded over lead 650. The operation of relay LV0(29) causes the operation in the marker of the non-call waiting relay NCW(37) in a circuit extending from ground in FIG. 23, over make contact 8 of relay LV0(29), break contact 2 of relay HMS(26), lead NCW into FIG. 31, make contact 3 of connector relay MCW(31), lead NCW into FIG. 37, and to battery through the winding of relay NCW(37). As an aside, if the called line S02 were not provided with call waiting service, as previously discussed, relay LP02(22) would not have been operated, nor would relay CRS(23); however, relay NCW(22) would have been operated to in turn apply ground in FIG. 23 over its make contact 2 and break contact 2 of relay HMS(26) to lead NCW into FIG. 31 to cause the operation of the marker relay NCW(37).

The operation of marker relay NCW(37) is a signal to the marker that the busy called line is not available for call waiting service, either (1) because that line is provided with call waiting service but not presently available for such service because it is involved in a CW LK level zero crosspoint connection or (2) because that line is not provided with call waiting service in any case. In response to the operation of relay NCW(37), the marker will release from the line link frame and from the CW LK and will connect the calling party to a busy tone trunk in the usual manner. This busy tone function is initiated, as in Busch, by the operation in FIG. 35 of the line busy relay LB(90)(35) in a circuit extending from ground in FIG. 38, over break contact 6 of relay MXT(197)(36), break contact 5 of relay XCW(37), make contacts 8 of relays CWS(38) and NCW(37), break contacts 8 and 5 of relays CWN0(40) and CWN1(40), lead LB into FIG. 35, cable 108–191, lead LB, break contact 7 of relay SPL1(191)(-), lead 17410, cable 108–191, lead 17410, and to battery through the winding of relay LB(90)(35), which operates and locks over its make contact 10 to ground over make contact 2 of relay CKG2(97)(-).

When the marker releases from the line link frame and from the CW LK, the connector relays MCA11(6)(31), MCB1(2)(31), MCA21(6)(31) and MCW(31) are released, in turn releasing relays VGA00(18), HG0(18), VGB00(18), LP02(22), CRS(23), CWS1(25), CWS2(25) and LV0(29) of the CW LK, releasing relays HG0(5)(31) and VGB0(2)(31) of the line link connector, and releasing relays XVGB(196)(34), CWL(37), NCW(37) and CWS(38) of the marker.

Upon the release of relays CRS(23) and LP02(22), the holding ground for CW LK hold magnet HM02(28) is again established over break contact 4 of relay LP02(22) in FIG. 29 on leads LS02 and S102 extending into FIG. 11 to the system sleeve lead S02 grounded over lead 650 in FIG. 11.

In FIG. 19, upon the release of relay CWS1(25), with relay EP1(19) operated, relay EP2(19) operates in a circuit from ground in FIG. 19, over break contact 2 of relay CWS1(25), break contact 10 of relay EP4(19), make contact 9 of relay EP1(19), to battery through the winding of relay EP2(19). Relay EP1(19) remains operated under control of its make contact 12 and break contact 1 of relay CWS1(25). Relay EP2(19) locks operated in two parallel circuits, one under control of make contact 12 of relay EP2(19) and break contact 2 of CWS1(25), the other under control of make contact 11 of relay EP2(19) and break contacts 6 and 4 of relays EP3(19) and EP4(19). The next operation of relay CWS1(25) will thus release relay EP1(19) leaving relay EP2(19) operated. A subsequent release of relay CWS1(25) will operate relay EP3(19) and hold operated relay EP2(19). Another operation of relay CWS1(25) will release relay EP2(19) leaving relay EP3(19) operated. Another release of relay CWS1(25) will operate relay EP4(19) with relay EP3(19) remaining operated. Another operation of relay CWS1(25) will release relay EP3(19), leaving relay EP4(19) operated. And a subsequent release of relay CWS1(25) will allow relay EP1(19) to again operate with relay EP4(19) also operated. This cycle repeats for each cycle of operation and release of relay CWS1(25) so as to rotate the selecting point in FIG. 24 for selecting a call waiting circuit if needed, as will be discussed later.

It is thus seen from the above description that even if a customer is provided with call waiting service, such service is not available for that customer when involved in a CW LK level zero connection.

TERMINATING CONNECTION TO IDLE LINE

When the marker connects with the line link frame and the CW LK and finds the usual network terminal of the called line S02 not busy, the marker treats the call as the usual type of terminating call by establishing a connection from an intraoffice or an incoming trunk over the trunk link to line link network and to the called line S02 of FIG. 11. This connection will involve the operation in the usual manner of the line link line hold magnet LH00(5)(11), the customer S02 having its tip and ring leads T02 and R02 directly connected to its usual line link terminal over break contacts 1 and 3 of its unoperated CW LK hold magnet HM02(28). The usual ringing will be applied to the called line S02, following which the customer S02 will presumably go off-hook to answer the call.

ATTACHING CALL WAITING CIRCUIT TO LINE BUSY ON USUAL LINE LINK TERMINAL — NOT LEVEL ZERO OF CW LK

It will be assumed that call waiting customer S02 of FIG. 11 is busy in an existing connection with another party with the line link line hold magnet LH00(5)(11) operated from sleeve ground on lead 650 in FIG. 11 and with the CW LK hold magnet HM02(28) for vertical 02 in FIG. 11 released, thus leaving the customer's tip and ring leads T02 and R02 extended to the line link terminal over break contacts 1 and 3 of hold magnet HM02(28). It will further be assumed, as previously discussed, that in FIG. 19 of the CW LK, relays EP4(19) and EP1(19) are locked operated under the control of the released relay CWS1(25). Furthermore, it will be assumed that the call waiting circuit 01 of FIGS. 14 through 17 is idle.

When the marker enters the line link frame, connector relays MCA11(6)(31), MCB1(2)(31), MCA21(6)(31) and MCW(31) are operated as previously discussed, along with relays CWL(37) and XVGB(196)(34) in the marker, relays HG0(5)(31) and VGB0(2)(31) in the line link connector, and relays VGA00(18) and HG0(18) and VGB00(18) in the CW LK. Relay LBTA(38) will operate as a result of the marker finding that the usual line link terminal of the called line S02 is busy; relay CWS(38) will operate upon the operation of relay LBTA(38); and, relays CWS1(25) and CWS2(25) will operate upon the operation of relay CWS(38). When relay CWS1(25) operates, relay EP4(19) will release, leaving relay EP1(19) locked operated. Also, as previously discussed, the operation of relay CWS(38) will cause the operation of relay LP02(22) since customer S02 of FIG. 11 is provided with call waiting service. It will be recalled that if customer S02 were not provided with call waiting service, then relay NCW(22) would be operated to in turn allow the operation of the marker line busy relay LB(90)(35), which would result in the marker connecting the calling party to busy tone. In the presently assumed situation, the operation of relay LP02(22) will cause the CW LK to attempt to allow an idle call waiting circuit to be connected to the busy called customer S02.

Figure 24:
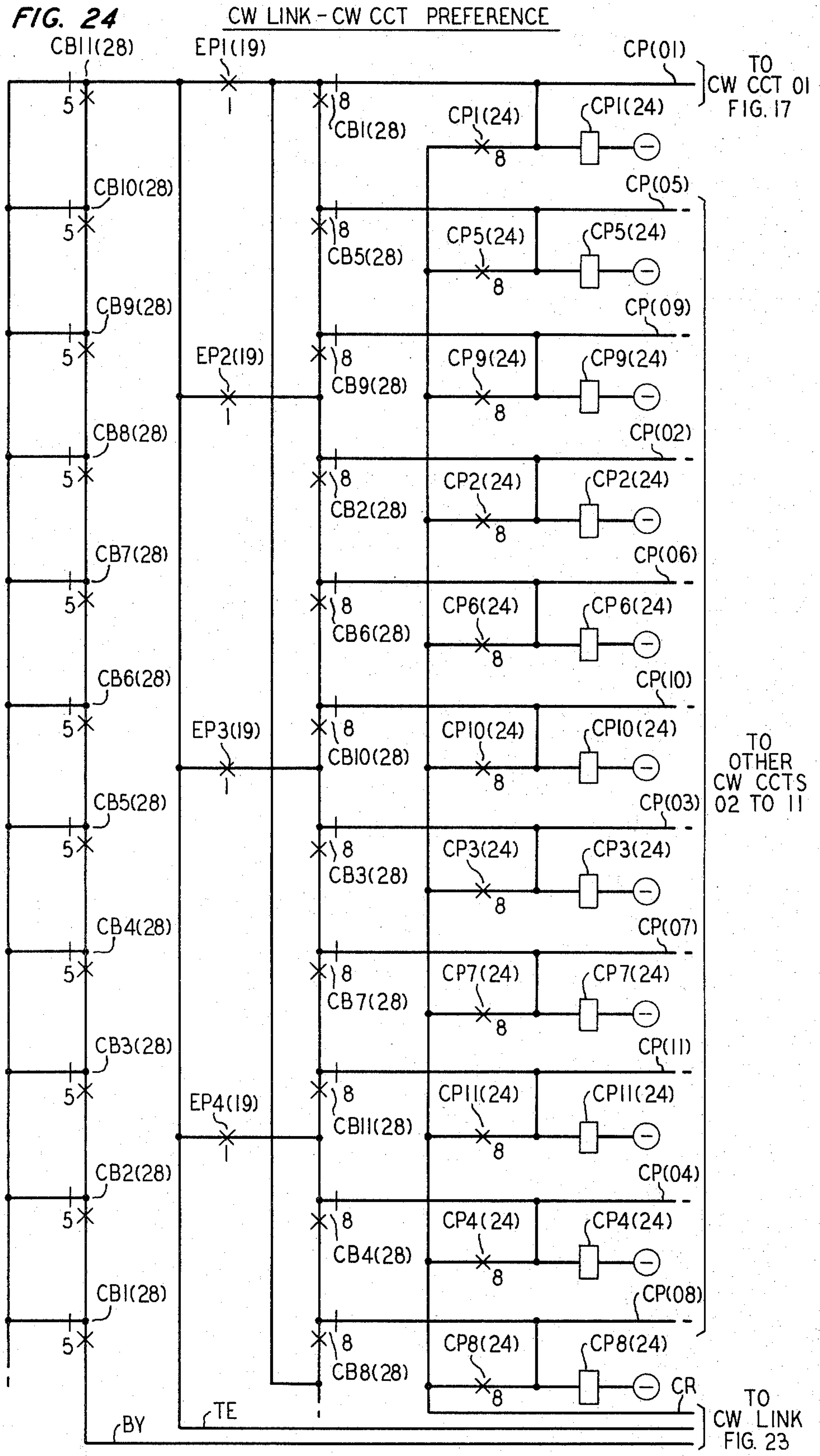

When relay LP02(22) operates, with relay EP1(19) operated and relay EP4(19) released and the CW LK hold magnet HM02(28) released, a circuit is completed for ascertaining if an idle call waiting circuit is available, the circuit extending from ground in FIG. 23, over break contact 11 of relay DTM(19), make contacts 5 of relays CWS1(25) and CWS2(25), break contacts 8 of relays EP4(19) and EP3(19) and EP2(19), make contact 8 of relay EP1(19), break contact 1 of relay HMS(26), make contact 1 of relay LP02(22), break contact 2 of hold magnet HM02(28), and over lead TE into FIG. 24.

In FIG. 28, as will be seen later, if any of the eleven call waiting circuits 01 to 11 is busy, the corresponding relay CB1(28) through CB11(28) will be operated. In FIG. 24, if all call waiting circuits are busy, with all relays CB1(28) through CB11(28) operated, the grounded lead TE from FIG. 23 into FIG. 24 would be extended over make contacts 5 of relays CB11(28) through CB1(28) to lead BY into FIG. 23, thence through diode BY, over break contact 2 of relay HMS(26), lead NCW into FIG. 31, over make contact 3 of connector relay MCW(31), lead NCW into FIG. 37, to battery through the winding of relay NCW(37), which would operate to cause the marker to connect the calling party to busy tone as previously discussed.

If at least one of the call waiting circuits is idle, its relay CB1(28) through CB11(28) will be released and lead BY from FIG. 24 into FIG. 23 will not be grounded. Assuming that the call waiting circuit 01 of FIGS. 14 through 17 is idle, relay CB1(28) will be released and the grounded lead TE from FIG. 23 into FIG. 24 will extend over make contact 1 of relay EP1(19) and break contact 8 of relay CB1(28) to battery through the winding of relay CP1(24), which thereupon operates and locks over its own make contact 8, lead CR into FIG. 23, over break contact 1 of relay CRS(23), over make contacts 5 of relays CWS1(25) and CWS2(25), and to ground over break contact 11 of relay DTM(19).

The operation of relay CP1(24) initiates circuit action for seizing the idle call waiting circuit 01 and for attaching it to the busy customer line S02 of FIG. 11. In FIG. 27, the CW LK select magnet SM01(27) corresponding to call waiting circuit 01 (terminated at level 01 of the CW LK in FIG. 13) is operated to prepare for interconnecting the busy called customer S02 of FIG. 11 to the call waiting circuit 01 of FIGS. 14 through 17. In the marker, relay CWN0(40) and two-out-of-five of each of the groups of relays CWH0(40) through CWH7(40) and CWT0(40) through CWT7(40) and CWU0(40) through CWU7(40) are operated to enable the marker to ascertain the line link frame location of the call waiting circuit 01. Also, relay ONH(29) of the CW LK is operated.

Upon the operation of relay CWS2(25), in FIG. 27 the lower secondary winding of relay XS(27) is biased over make contact 6 of relay CWS2(25), as was the case previously described of make contact 9 of relay DTM(19) for the dial tone connection. With relays CP1(24) and LP02(22) operated, a circuit is completed in FIG. 27 for operating the select magnet SM01(27) for level 01 on the CW LK (see FIG. 13) on which the call waiting circuit 01 is terminated. The circuit extends from the right terminals of capacitor SS and diode SS in FIG. 27 (capacitor SS having been charged to plus 130 volts over break contacts 12 and 6 of relays CWS2(25) and DTM(19) as previously discussed), over break contact 6 of relay DTM(19), make contact 12 of relay CWS2(25), make contact 5 of relay LP02(22), through diode S01 and the winding of select magnet SM01(27), over make contact 10 of relay CP1(24), break contact 9 of relay CRS(23), through the upper winding of relay XS(27), and to battery through resistor SM. The discharge current from capacitor SS will quickly operate select magnet SM01(27) but will be insufficient to operate relay XS(27), as previously discussed. The operation of select magnet SM01(27) initiates a series of control functions, which will be discussed later in this section.

In the meantime relay ONH(29) of the CW LK operates in a circuit extending from ground in FIG. 29, over make contact 12 of relay CP1(24), lead SM(01) into the call waiting circuit 01 in FIG. 15, thence over break contact 2 of relay SM(16), lead ONH(01) into FIG. 29, and to battery through the winding of relay ONH(29).

Figure 39:
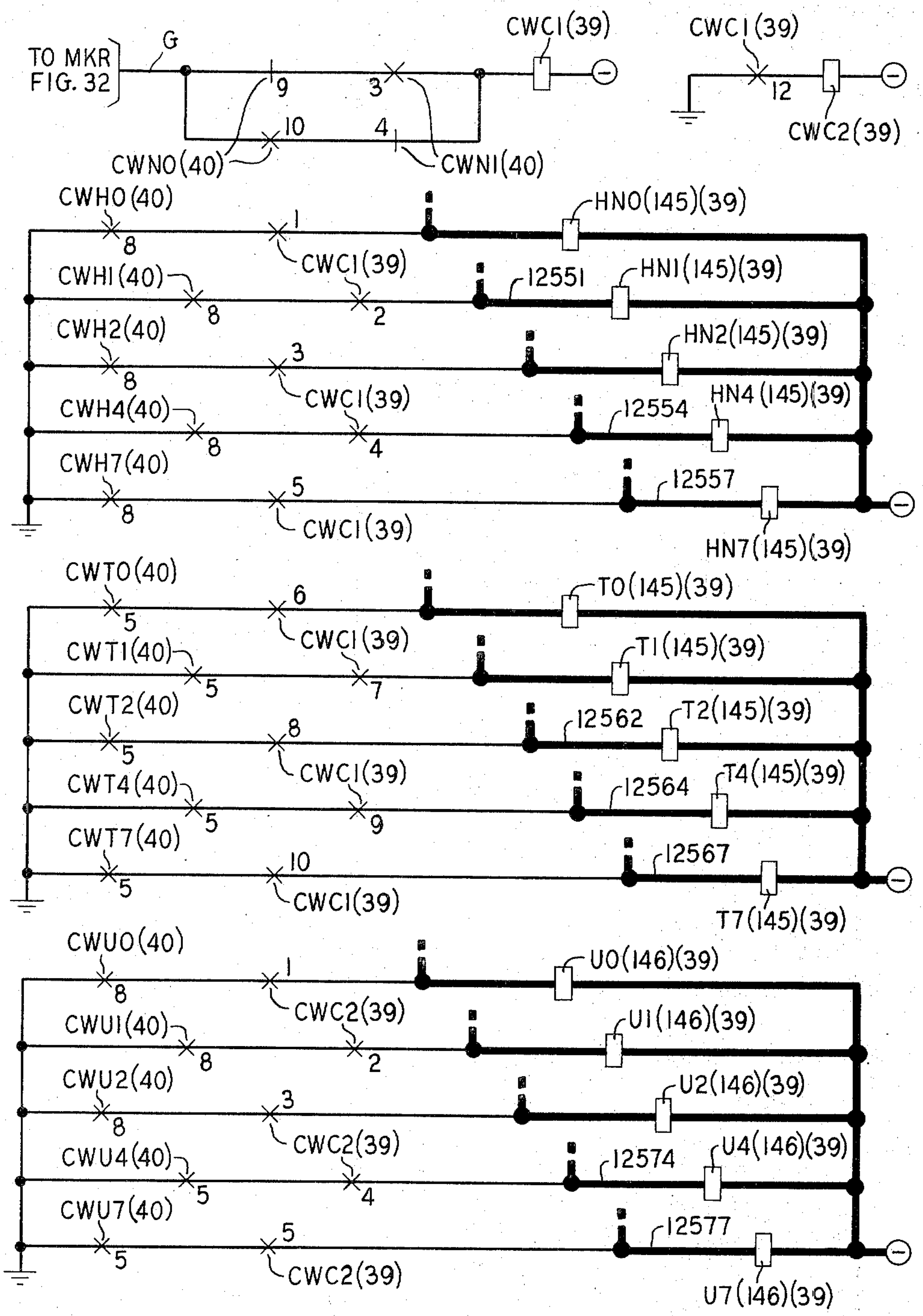
Figure 40:
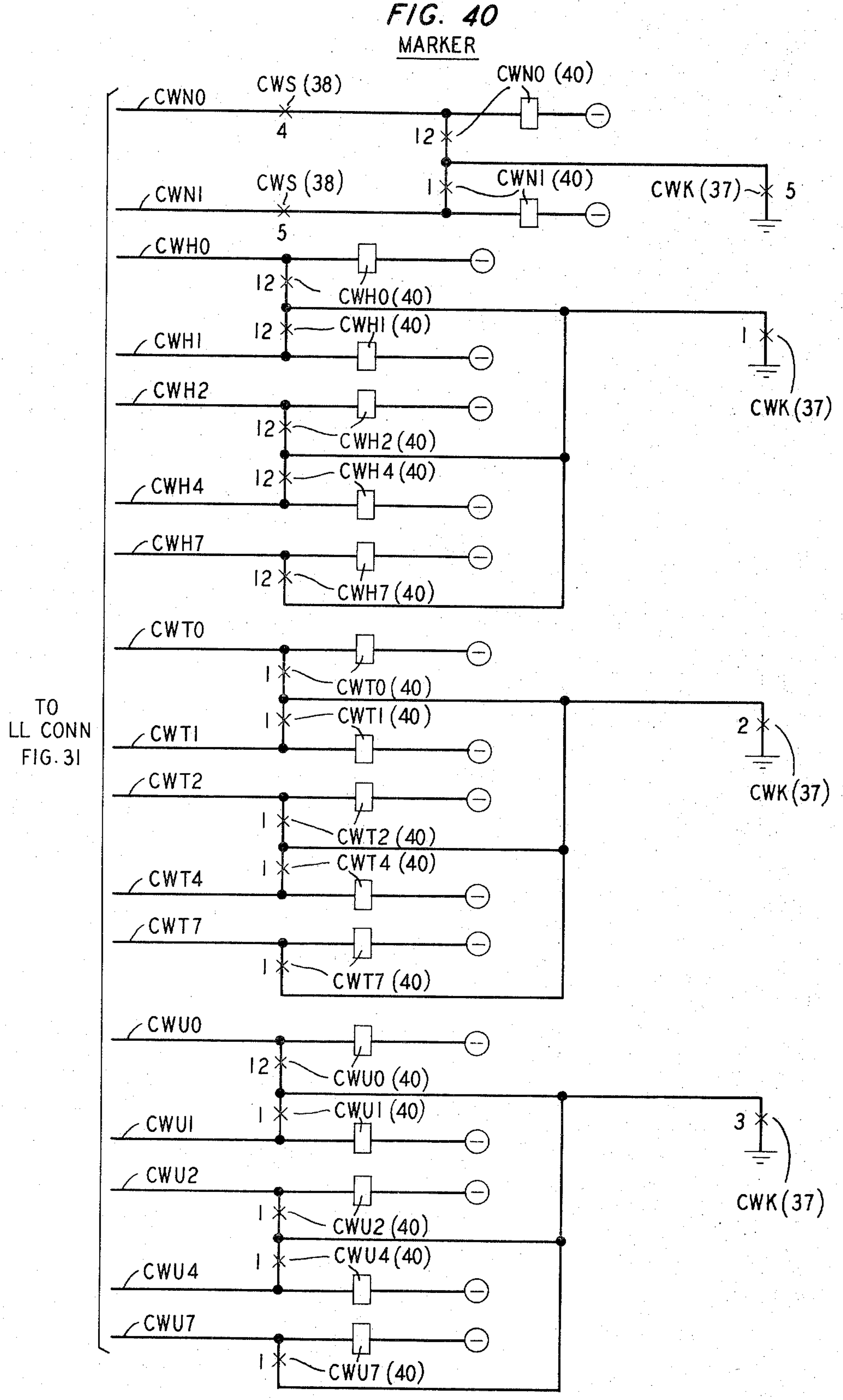

Also, in the meantime, relay CWN0(40) is operated in a circuit extending from ground in FIG. 25, over break contact 11 of relay RTB(26), make contact 7 of relay CP1(24), terminal NG1 cross-connected to terminal CWN0, lead CWN0 into FIG. 31, make contact 13 of connector relay MCW(31), lead CWN0 into FIG. 40, over make contact 4 of relay CWS(38), and to battery through the winding of relay cWN0(40). Upon the operation of relay CWN0(40), relay CWC1(39) is operated in a circuit extending from ground in FIG. 32, over make contact 3 of relay FLG(115)(32), lead G into FIG. 39, over make contact 10 of relay CWN0(40), break contact 4 of relay CWN1(40), to battery through the winding of relay CWC1(39). Relay CWC2(39) thereupon operates in an obvious circuit over make contact 12 of relay CWC1(39).

As will be seen in FIG. 33, upon the operation of relay CWC2(39), the ground supply for having operated the pair of number relays, such as N1(125)(33) and N1A(125)(33), et cetera, is opened at break contact 9 of relay CWC2(39), thus to release these number relays, the release of which will cause the release in FIG. 39 of the register relays which were operated according to the hundreds, tens and units digits of the called line numericals.

In the meantime, three groups of relays in FIG. 40 will have been operated to register in the marker the hundreds, tens and units digits of the call waiting circuit 01 of FIGS. 14 through 17. These digits are in effect a fictitious set of called numericals which the marker can use to consult a number group circuit for the line link location of the call waiting circuit. In FIG. 25, each call waiting circuit, such as call waiting circuit 01, has two hundreds terminals HA1 and HB1, two tens terminals TA1 and TB1, and two units terminals UA1 and UB1. It will be assumed that the hundreds, tens and units digits of the fictitious called number of call waiting circuit 01 are 654. Ground extends in FIG. 25 over make contacts 5 and 6 of relay CP1(24) to terminals HA1 and HB1, cross-connected to terminals CWH4 and CWH2, thence over leads CWH4 and CWH2 into FIG. 31. Ground also extends in FIG. 25 over make contacts 3 and 4 of relay CP1(24) to terminals TA1 and TB1, cross-connected to terminals CWT4 and CWT1, thence over leads CWT4 and CWT1 into FIG. 31. Also, ground in FIG. 25 extends over make contacts 1 and 2 of relay CP1(24) to terminals UA1 and UB1, cross-connected to terminals CWU4 and CWU0, thence over leads CWU4 and CWU0 into FIG. 31. These six leads extend in FIG. 31 over make contacts of connector relay MCW(31) into FIG. 40, thence (1) over leads CWH2 and CWH4 to operate relays CWH2(40) and CWH4(40) to indicate the hundreds digit of 6, (2) over leads CWT1 and CWT4 to operate relays CWT1(40) and CWT4(40) to indicate the tens digit of 5, and (3) over leads CWU0 and CWU4 to operate relays CWU0(40) and CWU4(40) to indicate the units digit of 4. In FIG. 39, the released sets of called number relays are now reoperated to register the "called digits" of the call waiting circuit 01. Relays HN2(145)(39) and HN4(145)(39) are operated under the control of make contacts 8 of relays CWH2(40) and CWH4(40) and make contacts 3 and 4 of relay CWC1(39). Relays T1(145)(39) and T4(145)(39) are operated under the control of make contacts 5 of relays CWT1(40) and CWT4(40) and make contacts 7 and 9 of relay CWC1(39). Relays U0(146)(39) and U4(146)(39) are operated under the control of make contacts 8 and 5 of relays CWU0(40) and CWU4(40) and make contacts 1 and 4 of relay CWC2(39).

In the event that the marker is required to connect with a number group circuit for ascertaining the line link location of the call waiting circuit 01 of FIGS. 14 through 17, such action must await a check signal from the CW LK before doing so, as will be explained.

In the meantime the CW LK proceeds to connect the call waiting circuit 01 with the busy called customer S02 of FIG. 11. As a straightforward situation, it is assumed that the called customer S02 is off-hook and busy in a connection over its usual line link frame terminal; and, it is assumed that when the time comes to do so, the marker will promptly connect the incoming calling connection to the line link frame terminal of call waiting circuit 01. Possible variations of these assumptions will be discussed later. When the select magnet SM01(27) operates, relay LHK(28) operates, as previously discussed, to check that negative battery is properly terminating the CW LK hold magnet HM02(28). The circuit for relay LHK(28) extends from ground in FIG. 28, over make contact 8 of relay CWS1(25), break contact 5 of relay XHM(28), break contact 5 of relay XS(27), lead LHK, through the winding of relay LHK(28), over break contact 3 of relay LK1(26), over make contact 2 (not shown) of select magnet SM01(27), break contact 3 of relay SP(28), break contact 3 of relay CRS(23), make contact 2 of relay LP02(22), and to battery through the winding of hold magnet HM02(28). In FIG. 28, capacitor XHM charges through the upper primary winding of relay XHM(28) under control of make contact 2 of relay CWS2(25) and break contact 12 of relay HMS(26); but, as previously discussed, relay XHM(28) does not operate unless at least two hold magnets are inadvertently in parallel (a trouble condition). Relay LHK(28) operates but hold magnet HM02(28) does not at this time. Relay HMS(26) thereupon operates as before but under the control in FIG. 26 of make contact 3 of relay CWS2(25) and break contact 2 of relay DTM(19), relay HMS(26) locking under control of its make contact 5 in FIG. 26.

In FIG. 28, upon the operation of relay HMS(26), the CW LK hold magnet HM02(28) is operated under the control of make contact 4 of relay HMS(26) and the high positive charge on capacitor LH placed there under control of make contacts 1 of relay CWS2(25) and 12 of relay CWS1(25). As before, relay LK(28) operates essentially at the same time as hold magnet HM02(28); and, relay LK1(26) operates as before, to signify the operation of relay LK(28). With relays LK(28), HMS(26) and LK1(26) operated, relay LHK(28) is released as before; and, hold magnet HM02(28) holds operated through diode LH in FIG. 28 and the upper primary winding of relay LK(28) to ground over make contact 1 of relay CWS2(25) and through resistor LK.

When CW LK hold magnet HM02(28) operates, the level 01 crosspoint in FIG. 11 is closed to connect the six level 01 wires 0 to 5 with the six vertical 02 wires, thus to connect the FIG. 13 CW LK terminal of call waiting circuit 01 with the FIG. 11 CW LK terminal of the called customer S02. The closed crosspoint operates the call waiting circuit off-normal relay ON(15) and the supervisory relay S(14) of the call waiting circuit. Relay S(14) is inserted in series with the tip and ring leads T02 and R02 of the called party S02 of FIG. 11 in a circuit extending from tip lead T02 in FIG. 11, vertical wire 0, break contact 1 of hold magnet HM02(28) being open, through the closed cross point for level 01 on vertical 02, horizontal wire 0 of level 01 into FIG. 13, lead T(01) into FIG. 14, over break contact 7 of relay SR1(15) in parallel with the series circuit of break contacts 4 and 2 of relays NT(17) and TN(17), through the upper winding of relay S(14) in parallel with resistor ST, over break contact 10 of relay TR(16), break contact 8 of relay RSA(15), break contact 2 of relay ASM(17), lead T1(01) into FIG. 13, horizontal wire 2 into FIG. 11, through the closed crosspoint, vertical wire 2, and to the tip lead T02 into its line link frame termination. The existing busy connection involving customer S02 continues and is terminated in known fashion in the switching network connected to the line link frame, the circuit returning on the ring lead R02 in FIG. 11. Ring lead R02 extends over vertical 3, break contact 3 of the CW LK hold magnet HM02(28) being open, through the closed crosspoint, horizontal wire 3 into FIG. 13, lead R1(01) into FIG. 14, over break contacts 4 and 9 of relays ASM(17) and RSA(15), break contact 8 of relay TR(16), through the lower winding of relay S(14) in parallel with resistor SR, thence over break contact 9 of relay SR1(15) in parallel with the series circuit of break contacts 4 and 10 of relays TN(17) and NT(17), lead R(01) into FIG. 13, horizontal wire 1 into FIG. 11, over the closed crosspoint, and vertical wire 1 to the ring lead R02 of customer S02. Relay S(14) operates in the above circuit assuming that customer S02 is off-hook so as to complete the loop.

In the meantime the off-normal relay ON(15) of the call waiting circuit operates in a circuit extending from battery in FIG. 15, through the winding of relay ON(15), lead OP(01) into FIG. 13, break contact 11 of relay CB1(28), horizontal wire 5 into FIG. 11, over the closed crosspoint to vertical wire 5, lead HM02 into FIG. 28 and to the left side of hold magnet HM02(28) which, as above described, extends to resistance ground at the right terminal of diode LH in FIG. 28. Relay ON(15) is thus operated in parallel with the operated CW LK hold magnet HM02(28). Relay ON(15) locks in a circuit extending from ground in FIG. 29, over break contact 2 of relay SP(28), break contact 6 of relay LK2(26), make contact 9 of relay CP1(24), break contact 9 of relay CB1(28), lead ON(01) into FIG. 15, over break contact 9 of relay CRL(17), and over make contact 5 of relay ON(15) to lead OP(01) at the left side of the winding of relay ON(15). This ground on lead OP(01) in FIG. 15 extends through diode ON in FIG. 15 to lead HM(01) into FIG. 13, where leads HM(01) and OP(01) from FIG. 15 are connected together and to horizontal wire 5 over break contact 11 of the call waiting circuit busy relay CB1(28). As above described, the grounded horizontal wire 5 in FIG. 13 is connected to lead HM02 in FIG. 28 at the left side of the winding of the CW LK hold magnet HM02(28), thus holding operated the hold magnet HM02(28) and causing the release of relay LK(28) by shunting it down.

If, as has been assumed, customer SO2 of FIG. 11 is busy on its usual line link terminal in FIG. 11, the sleeve lead SO2 will be grounded and this grounded lead S02 extends over the vertical wire 4, the closed crosspoint, horizontal wire 4 into FIG. 13, lead S1(01) into FIG. 14, through resistor RS and to battery through the winding of relay RS(14), which thereupon operates, to in turn operate relay RSA(15) under control of make contact 6 of relay RS(14). Relay RSA(15), in operating, continues to maintain continuity in FIG. 14 between the upper and lower windings of relay S(14) to leads T1(01) and R1(01) over make contacts 8 and 9 of relay RSA(15).

Also, the operation of relay ON(15) causes the operation of relays TRA(16) and SR1(15). Relay SR1(15) operates in an obvious circuit in FIG. 15 under the control of make contact 8 of relay ON(15) and of break contacts 7 and 11 of relays TN(17) and NT(17). Relay TRA(16) operates in a circuit extending from ground in FIG. 16, over make contact 1 of relay ON(15), break contact 12 of relay TR(16), break contact 5 of relay TRA(16), to battery through the winding of relay TRA(16), which locks under control of its make contact 5, and break contacts 5 and 3 of relays CWS(15) and SB(16). The operation of relay TRA(16) operates relay H1(15) in a circuit extending from ground in FIG. 15, over make contact 4 of relay ON(15), break contact 6 of relay TR(16), make contact 1 of relay TRA(16), break contact 4 of relay TO(16), make contact 8 of relay RS(14), and to battery through the winding of relay H1(15), which thereupon operates and locks under control of its make contact 5 independently of contacts of relays TR(16) and TRA(16).

Figure 17:
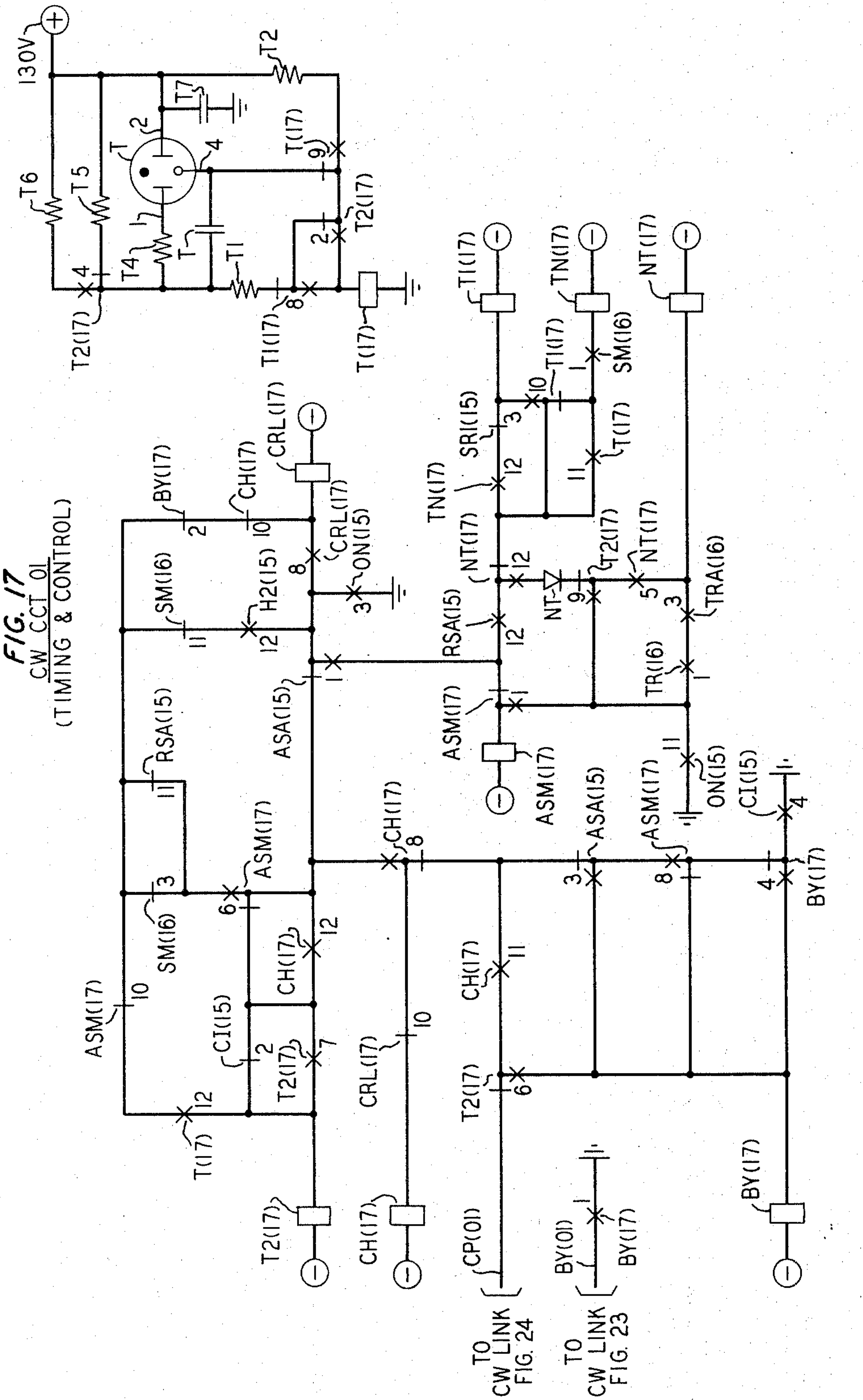

At the time of the operation of the off-normal relay ON(15) of the call waiting circuit, relay T2(17) is operated in a circuit extending from ground in FIG. 17, over make contact 3 of relay ON(15), break contacts 1 and 6 and 2 of relays ASA(15) and ASM(17) and CI(15), to battery through the winding of relay T2(17), which locks operated under control of its make contact 7 independently of relay CI(15). The operation of relay T2(17) causes the timer in the upper right of FIG. 17 to start timing for a four second interval during which the marker should connect the incoming call to the line link terminal of the call waiting circuit. The timer is controlled by three relays T(17), T1(17), and T2(17). With all three of these relays released, the gas tube T is not conducting, capacitor T is discharged, capacitor T7 is fully charged and terminals 1, 2 and 4 of tube T are all at about plus 130 volts potential. If relay T2(17) is operated, capacitor T is allowed to acquire a charge from plus 130 volts, through resistor T6, make contact 4 of relay T2(17), through capacitor T to terminal 4 of tube T, thence over break contact 9 of relay T(17), make contact 2 of relay T2(17), and to ground through the winding of relay T(17). The value of resistor T6 is such as to allow the terminal 4 of tube T to reduce its potential from about plus 130 volts toward ground (the initial surge being sufficiently reduced by resistor T6 to prevent the operation of relay T(17) at that time) such that tube T will fire across its two anode-to-cathode paths after about 4 seconds. If relay T1(17) is operated instead of relay T2(17), resistor T5 (instead of resistor T6) is effective in the charging circuit of capacitor T so that tube T will fire in about 10 seconds. If tube T fires, capacitor T is discharged across terminals 1 and 4 of tube T and relay T(17) is operated across terminals 2 and 4 of tube T. Relay T(17), when operated, locks in a circuit over make contact 2 of relay T2(17) or over make contact 8 of relay T1(17) and break contact 2 of relay T2(17), thence over make contact 9 of relay T(17) and to plus 130 volts through resistor T2. As above described, upon the operation of relay T2(17) at the time of the operation of relay ON(15), 4 seconds are allowed before the firing of tube T and the operation of relay T(17), during which time the marker should have connected the incoming call to the call waiting circuit. It will be assumed for present purposes that the latter occurs before the firing of tube T.

In the meantime, upon the operation of relay S(14), the timer TM2 of FIG. 16 is allowed to function to measure an interval of about 30 milliseconds (ms) as a delay in the operation of relay SM(16) after the operation of relay S(14) to prevent a false operation of relay S(14), such as from ringing current in its operate path, from operating relay SM(16). In FIG. 16, before the operation of relay S(14), ground is supplied to terminal I of timer TM2 over break contact 5 of relay S(14), through diode SM, and over break contact 12 of relay SM(16). The lower terminal of the timing capacitor C3 is charged to a negative potential a little less than the negative battery supply. The charging circuit is from ground at terminal I, through capacitor C3, diode CR1, resistor R3, and to negative battery. The circuit from ground, through resistor R6, diode CR1 and resistor R3 to negative battery maintains the potential on the bottom terminal of capacitor C3 at less than one volt below the battery potential due to the small voltage drop through diode CR1 and resistor R3. At that time, transistor Q1 will be fully turned on (saturated) with its base at about one volt more positive than its emitter and with its collector only a fraction of a volt more positive than its emitter. This condition forces transistor Q2 to be turned off and relay SM(16) released. When ground is removed from terminal I, the lower terminal of capacitor C3 jumps to about double the negative battery supply voltage and the upper terminal of capacitor C3 jumps to a little less than the battery supply voltage. This causes diode CR1 to be reverse-biased so as to represent a high impedance and capacitor C3 starts to discharge through resistors R6 and R2 through the conducting transistor Q1. The values of the components in the discharge path are selected so that after the prescribed time delay diode CR1 again becomes forward-biased so as to allow conduction therethrough, which reduces the base-emitter current in transistor Q1 so as to turn off transistor Q1. When transistor Q1 turns off, transistor Q2 conducts and quickly saturates to operate relay SM(16) in the collector-emitter circuit of transistor Q2. When ground is reapplied to terminal I, capacitor C3 is quickly recharged through diode CR1 and resistor R3, transistor Q1 is turned on, transistor Q2 is turned off, and relay SM(16) is released. Timers TM1 and TM3 of FIG. 16 are similarly arranged but with times of 1.2 seconds and 0.2 seconds as compared to 30 ms for timer TM2. The timer TM on FIG. 26 of the CW LK is similarly arranged but wth a time delay of 125 ms.

At the end of the 30 ms time delay of timer TM2 of FIG. 16, relay SM(16) will operate as above described, indicating that the customer S02 of FIG. 11 is still off-hook as indicated by the continued operation of relay S(14). At this time, the on-hook relay ONH(29) of the CW LK is released when the grounded lead SM(01) from FIG. 29 into FIG. 15 is switched from lead ONH(01) to lead OFH(01) by the opening of break contact 2 of relay SM(16) and by the closing of make contact 2 of relay SM(16). Relay ONH(29) releases when ground in FIG. 15 is removed from lead ONH(01) into FIG. 29.

In the meantime, circuit operations will have continued in the CW LK upon the operation of the off-normal relay ON(15) of the call waiting circuit. It will be recalled that relay LK(28) was shunted down by the application of ground to lead HM02 into FIG. 28 from FIG. 11 and that this ground held operated the CW LK hold magnet HMO2(28). Upon the release of relay LK(28), relay LK2(26) operates as previously described. With relays LK2(26) and CWS1(25) operated and with relay OFH(29) released, all grounds in FIG. 26 are removed from terminal I of the TM timer, which thereupon starts its 125 ms delay interval prior to operating relay RTB(26). However, upon the operation of relay LK2(26), relay OFH(29) is operated in a circuit extending from ground on lead SM(01) from FIG. 29 into FIG. 15, over make contact 2 of relay SM(16), lead OFH(01) into FIG. 29, over make contact 2 of relay LK2(26), break contact 8 of relay RTB(26), to battery through the winding of relay OFH(29), which locks over its make contact 5 independently of relay RTB(26). The operation of relay OFH(29) reapplies ground in FIG. 26 over its make contact 3 to terminal I of timer TM to recycle timer TM to its starting condition, which prevents a time-out so as to prevent the operation of relay RTB(26). Relay CK(26) is thereupon operated in FIG. 26 under control of make contact 2 of relay OFH(29) and break contact 10 of relay RTB(26), relay CK(26) locking under control of its make contact 4 and make contact 11 of relay CWS1(25).

In the meantime, as has been previously described, the operation of relay LK2(26) causes the reoperation of relay LK(28) in series with the CW LK hold magnet HM02(28) by removing ground in FIG. 29 from lead ON(01) into FIG. 15. Relay DCT(26) of the CW LK is now operated as previously described as an indication of a satisfactory double-connection test in the CW LK. The call waiting circuit busy relay CB1(28) is now operated in FIG. 28 in circuit from ground, over make contact 12 of relay DCT(26), make contact 11 of relay CP1(24), through the lower primary winding of relay CB1(28), which operates and locks through its upper secondary winding to ground under the control of its own make contact 7 and make contact 10 of relay CWS1(25). A locking circuit for relay CB1(28) also extends from its lower winding, over its own make contact 1, lead CB(01) into FIG. 15, and to ground over make contact 2 of relay ON(15). Also, the operated relay CB1(28) applies ground in FIG. 29 over its make contact 9 to lead ON(01) into FIG. 15 to hold operated relay ON(15) and to extend the ground through diode ON and over lead HM(01) into FIG. 13, et cetera, to hold operated the CW LK hold magnet HM02(28) and to again shunt down the LK(28) relay.

All circuit operations are now prepared to provide to the marker a check signal of satisfactory CW LK operations. This signal will result in the operation of the marker check relay CWK(37) in a circuit extending from ground in FIG. 26, over make contact 6 of relay HMS(26), break contact 4 of relay LK(28), make contacts 1 of relays LK1(26) and DCT(26), make contacts 7 and 1 and 1 of relays CWS1(25) and OFH(29) and CK(26), break contact 12 of relay ONH(29), make contact 3 of relay DCT(26), lead CWK into FIG. 31, over make contact 4 of connector relay MCW(31), lead CWK into FIG. 37, over make contact 9 of relay CWS(38), break contacts 11 of relays CWHO(40) and CWH1(40), make contacts 11 and 10 of relays CWH2(40) and CWH4(40), break contact 9 of relay CWH7(40), break contact 4 of relay CWI0(40), make contact 4 of relay CWT1(40), break contact 3 of relay CWT2(40), make contact 3 of relay CWT4(49), break contact 2 of relay CWT7(40), make contact 11 of relay CWU0(40), break contacts 10 of relays CWU1(40) and CWU2(40), make contact 3 of relay CWU4(40), break contact 2 of relay CWU7(40), make contact 7 of relay CWC2(39), through resistance CWK and the winding of relay CWK(37) to battery. Relay CWK(37) operates and locks operated in series with relay CWR(37) in an obvious circuit in FIG. 37 under the control of make contacts 7 and 6 of relays CWK(37) and CWC2(39), relay CWR(37) operating in that locking circuit.

The operation in the marker of relays CWK(37) and CWR(37) initiates a series of operations whereby the marker releases from the line link frame and from the associated CW LK. The operation of relay CWR(37) releases relays CWS1(25) and CWS2(25), the release of which in turn releases relays CP1(24) and HMS(26) and select magnet SMO1(27). The release of relay HMS(26) causes the release of relays DCT(26), LK1(26) and LK2(26). The release of relay CP1(24) causes the release of relay OFH(29), which in turn releases relay CK(26). In the CW LK circuitry, the call waiting busy relay CB1(28) is locked operated through its lower winding, over its make contact 1, lead CB(01) into FIG. 15, to ground over make contact 2 of relay ON(15). Ground extends from FIG. 29, over make contact 9 of relay CB1(28), lead ON(01) into FIG. 15, over break contact 9 of relay CRL(17) and make contact 5 of relay ON(15) to lead OP(01) and to the winding of relay ON(15) to lock that relay operated. The ground on lead OP(01) in FIG. 15 extends through diode ON and over lead HM(01) into FIG. 13, over the horizontal wire 5 into FIG. 11, over the closed crosspoint, vertical wire 5, lead HM02 into FIG. 28, and to the winding of hold magnet HM02(28), which in remaining operated retains the closed crosspoint in FIG. 11 between vertical 02 and level 01. The release of relay CWS1(25), with relay EP1(19) still operated, causes the operation in FIG. 19 of the next-preferred entry point relay EP2(19) as previously described, thus leaving both of relays EP1(19) and EP2(19) operated.

The operation of relays CWK(37) and CWR(37) of the marker also initiates a series of circuit operations whereby the marker releases from the line link frame (and from its associated CW LK) and recycles to consult a number group for the line link frame location of the call waiting circuit 01 of FIGS. 14 through 17 in order to complete the incoming call connection to that call waiting circuit. Upon the operation of relay CWK(37), the operated relays in FIG. 40 are locked operated: relay CWN0(40) locks over its make contact 12 to ground over make contact 5 of relay CWK(37); relays CWH2(40) and CWH4(40) lock over their make contacts 12 to ground over make contact 1 of relay CWK(37); relays CWT1(40) and CWT4(40) lock over their make contacts 1 to ground over make contact 2 of relay CWK(37); and, relays CWU0(40) and CWU4(40) lock over their make contacts 12 and 1 to ground over make contact 3 of relay CWK(37).

Relay RCY2(35) in the marker is operated to start the recycle function, the circuit extending from ground in FIG. 38, over break contacts 6 and 5 of relays MXT(197(36) and XCW(37), make contacts 8 and 5 of relays CWS(38) and CWR(37), lead RCY into FIG. 35, thence over break contact 9 of relay RCY4(42), make contact 3 of relay CHA(109)(-), and make contact 13 of relay FLG(115)(32) to battery through the winding of relay RCY2(35), which operates and locks to ground under control of make contacts 13 and 2 and 7 of relays FLG(115)(32) and RCY2(35) and CKG5(68)(-). The operation of relay RCY2(35) causes the release of relays ONW(111)(35), LLC2(96)(35) and LLC1(96)(35), the release of which causes the release of connector relays MCW(31), MCA11(6)(31), MCB1(2)(31) and MCA21(6)(31) of FIG. 31, et cetera, to sever all connections between the line link frame and the marker. The release of relay LLC1(96)(35) and of the connector relays of FIG. 31 causes the release in FIG. 18 of relays VGA00(18), HGO(18) and VGB00(18), the release in FIG. 22 of relay LPO2(22), the release in FIG. 31 of relays HGO(5)(31) and VGB0(2)(31), the release in FIG. 33 of relays CON1(107)(33) and CON2(107)(33) and GT1(107)(33) and GT2(90)(33), the release in FIG. 34 of relay XVGB(196)(34), the release in FIG. 37 of relay CWL(37), the release in FIG. 38 of relay LBTA(38) and relay CWS(38), and the release in FIG. 41 of relays SNG2(198)(41) and SNG1(198)(41).

The operation of relay RCY2(35) causes the operation in FIG. 42 of relay RCY3(42) in an obvious circuit under the control of make contact 7 of relay RCY2(35). In FIG. 32, the operation of relay RCY3(42) causes the release of relay FLG1(32) but not of the operated relay FLG(115)(32). In FIG. 42, the release of relay FLG1(32) causes the release of the line link information relay LLI(178)(42), the release of which causes the release in the marker of all of the relays used to record and check the line link location information previously received from the number group circuit. This includes such relays, as in Busch, as those controlling the number relays N1(125)(33) et cetera of FIG 33, the horizontal group relays HGTO(29)(-) through HGT9(45)(-) and HTK1(44)(-), the vertical group relays VGT0(27)(-) through VGT13(42)(-) and VTK1(43)(-), the ringing combination relays RCT1(188)(35) through RCT10(167)(35), the vertical file relays VFTO(31)(-) through VFT4(31)(-) and FTK1(47)(-), and such control relays as NR(132)(-), RK(76)(-), LK(76)(-), JCK0(82)(-), JCK1(82)(-), et cetera, as in Busch. Also, incident to the disconnection of the marker from the line link frame, a number of control relays are released as in Busch, such as relays CHA(109)(-), LBT(90)(-), LXP1(109)(-), SLCK1(199)(-), TCHK(76)(-). Relays CWC1(39) and CWC2(39) of FIG. 39 remain operated under control of ground on lead G from FIG. 32 at make contact 3 of relay FLG(115)(32).

Eventually, when all of the appropriate control relays of the marker are released incident to the operation of relays RCY2(35) and RCY3(42), relay RCY4(42) is operated to initiate seizure of a number group circuit. The circuit for operating relay RCY4(42) extends from ground in FIG. 41, over break contacts 2 of relays JCK0(82)(-) and JCK1(82)(-), lead 7605, make contact 4 of relay LCK(76)(-), make contact 3 of relay RCY3(42), break contacts 3 and 1 of relays HGK(76)(-) and TCHK(76)(-), break contacts 1 of relays LK(76)(-) and RK(76)(-), lead 9221, break contact 11 of relay TK(92)(-), cable 110–179, make contact 5 of relay RCY3(42), lead 20003, cable 108–179, lead 20003, break contact 3 of relay CON1(107)(33), lead 10724, break contacts 8 and 9 of relays GT2(90)(33) and GLH1(90)(-), lead 9020 into FIG. 42, break contact 1 of relay SL(109)(-), make contact 7 of relay HMT1(109(-), lead 10938, cable 110–179, lead 10938, break contacts 9 and 6 and 4 of relays CKR(179)(-) and SLCK1(199)(-) and NGK(199)(-), make contact 4 of relay RCY3(42), break contact 6 of relay RCY4(42), to battery through the parallel windings of relays RCY4(42), and RCY5(42), which both operate and lock to ground under the control of make contacts 3 and 6 of relays RCY4(42) and RCY3(42). Relay RCY5(42) has no particular significance with regard to the call waiting recycle function.

The operation of relay RCY4(42) initiates circuit actions for seizing a number group and for securing access to the line link frame whereon is located the call waiting circuit 01 of FIGS. 14 through 17. The operation of relay RCY4(42) reapplies ground to lead 9300 in FIG. 35, over make contact 2 of relay RCY4(42) and make contact 12 of relay CKG4(93)(-), to cause the reoperation of relays ONW(111)(35), LLC2(96)(35) and LLC1(96)(35) for preparing circuits for line link frame seizure, as previously described, by means of line link connector circuitry such as in FIG. 31. The operation of relay RCY4(42) also causes the reoperation in FIG. 32 of relay FLG1(32) over make contact 4 of relay RCY4(42) from the ground on the lead 11501, the operation of relay FLG1(32) preparing circuits for seizure of the number group circuit containing the line link location of the call waiting circuit.

Figure 41:
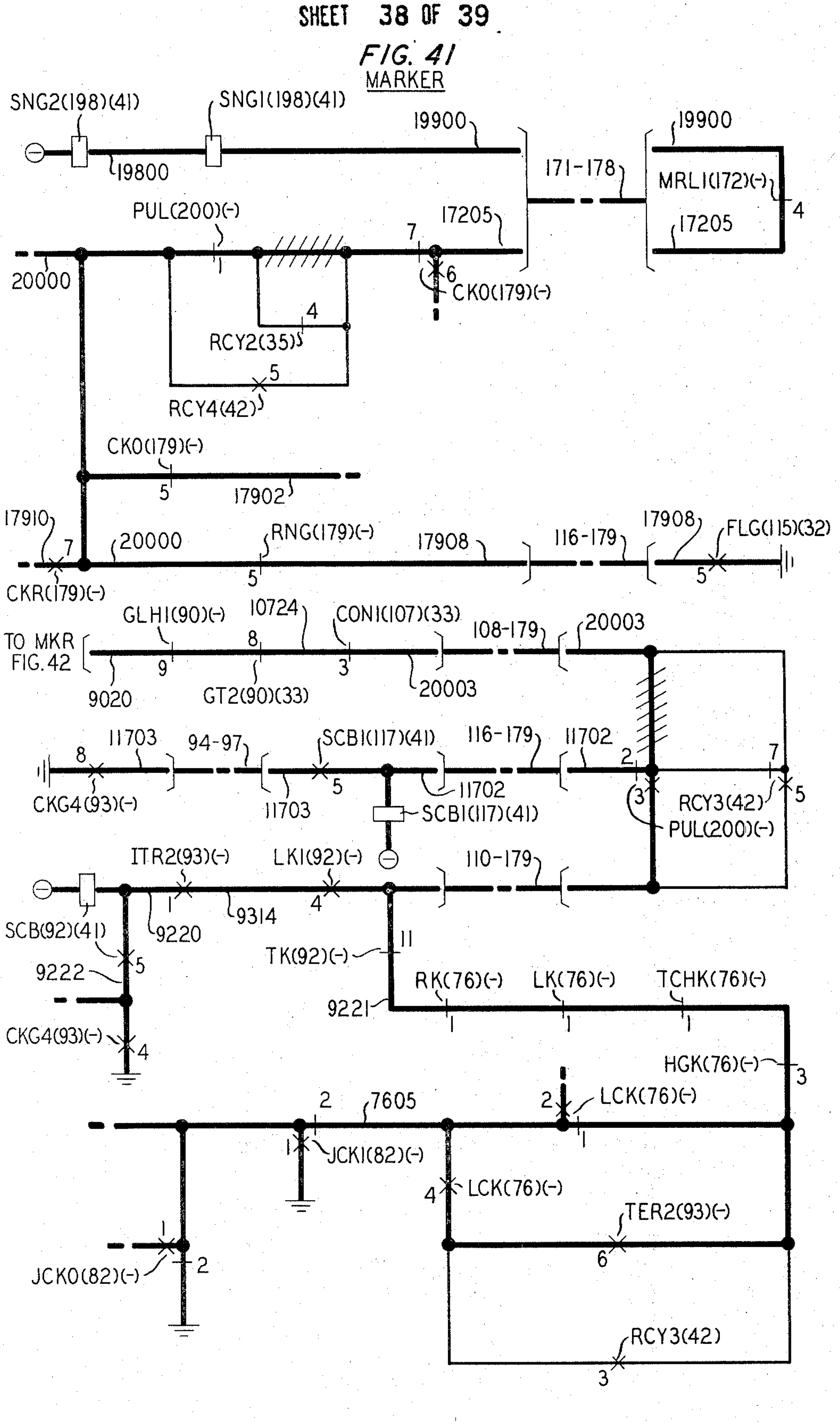
Figure 42:
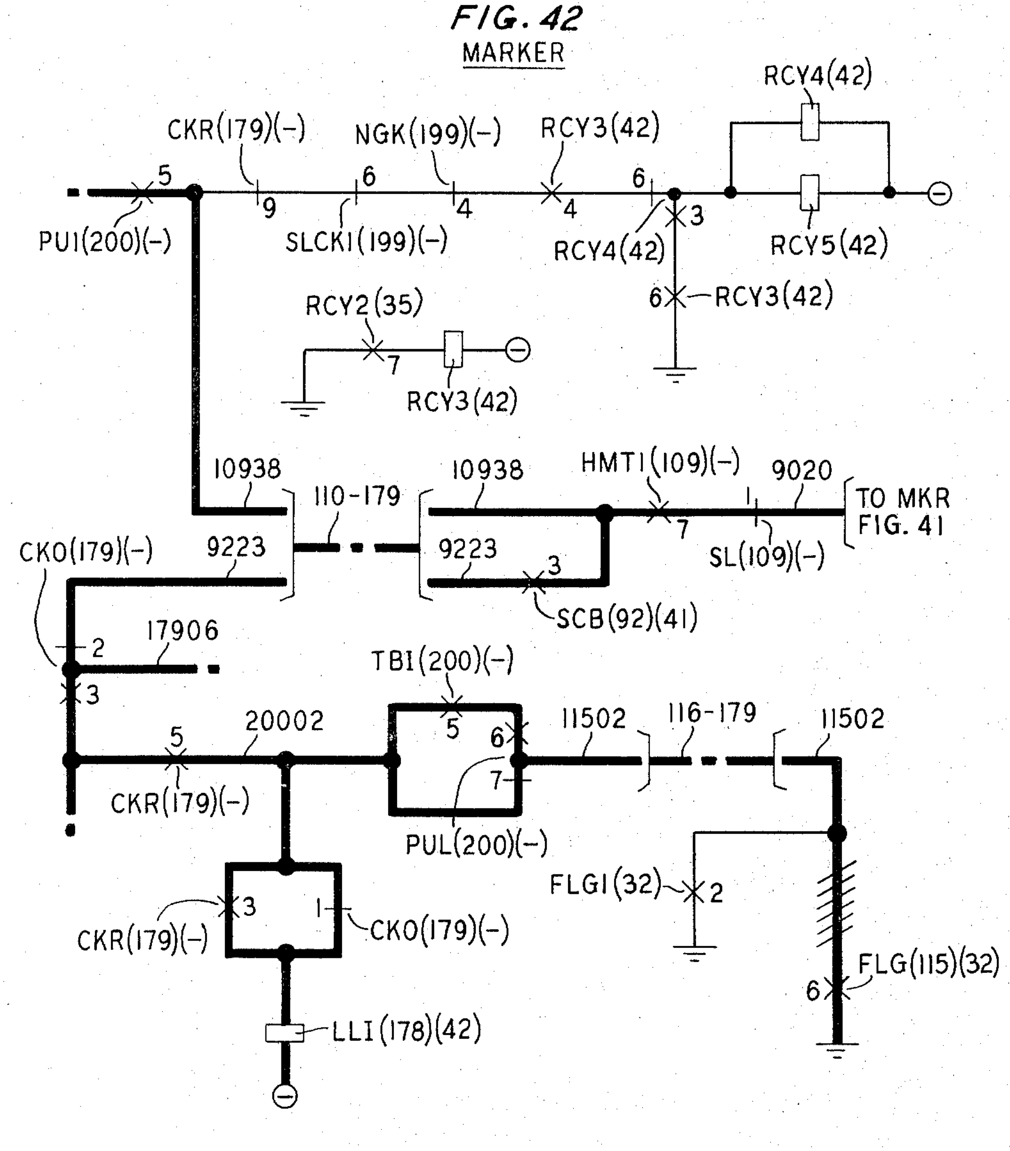

In FIG. 41, ground is reapplied from lead 20000 over make contact 5 of relay RCY4(42) and break contact 7 of relay CKO(179)(-) to lead 17205 into cable 171–178 to reoperate relays SNG1(198)(41) and SNG2(198)(41). Also, in FIG. 42, the reoperation of relay FLG1(32) reapplies ground over its make contact 2 to lead 11502 to reoperate the line link information relay LLI(178)(42). In FIG. 34, a circuit is completed for energizing the appropriate number group start lead, the circuit extending from battery in FIG. 34, through resistance NGS(176)(34), over a circuit not of interest here, over make contact 11 of relay SNG2(198)(41), lead 19801, cable 146–177, lead 19801, make contact 10 of relay CWC2(39), make contact 3 of relay CWR(37), make contact 11 of relay CWNO(40), terminal CWSO cross-connected to terminal NGS7 and to lead 12400 to the number group connector circuitry. The cross-connection could be any desired one in order to energize the appropriate number group start lead, lead 12400 used previously being shown here by example on the assumption that the same number group previously used also contains the line link location information for call waiting circuit 01. The marker thus connects to the appropriate number group circuit, as in Busch, and transmits thereto for translation the dummy directory number registered in the relays HN0(145)(39) through U7(146)(39) of FIG. 39. The number group, as usual, returns to the marker the line link frame number, the vertical and horizontal group information, and the vertical file information, thus causing the operation in the marker of one of the relays HGTO(29)(-) through HGT9(45)(-), one of the relays VGT0(26)(-) through VGT13(42)(-), and one of the relays VFTO(31)(-) through VFT4(31)(-). Also, certain check relays are operated in the marker such as relays HTK1(44)(-), VTK1(43)(-) and FTK1(47)(-). The check relay PTK(117)(34) was operated previously over make contact 11 of relay CWC1(39). In FIG. 35, the ringing combination relay RCT1(188)(35) is operated over make contact 11 of relay CWC2(39) ground over make contact 1 of an operated relay such as the trunk number relay TN(20)(-) in the number group via make contact 24 of an operated number group connector such as connector MCC(19)(-). Call waiting circuits are given trunk numbers in the number group circuit so that they cannot be accessed by someone using a directory number. Relay RCT1(188)(35) is operated on a call waiting recycle in order to satisfy the marker check circuits. Also, in FIG. 35, break contact 8 of relay CWC2(39) is used to prevent the unwanted operation of relay RCT10(167)(35) in case of the operation of relay RCN10(166)(-) from the number group. The line link location information regarding call waiting circuit 01 is thus registered in the marker and held under control primarily of the operated relay LLI(178)(42).

The marker releases from the number group circuit and proceeds to secure access to the line link frame containing the terminal, shown in FIG. 14, of call waiting circuit 01. The circuit operations involved in this marker function are as in Busch, the net result being that the incoming call is connected to the terminal (FIG. 14) of the call waiting circuit 01 assigned, as above described, by the CW LK for use. When the connection is made, ground on the sleeve lead S(01) in FIG. 14 causes the operation of relay AS(14), which in turn operates relay ASA(15) under control of make contact 6 of relay AS(14). The operation of relay ASA(15) releases relay T2(17) by opening break contact 1 of relay ASA(15) in FIG. 17. The release of relay T2(17) recycles the timer in the upper right of FIG. 17, since, as is the assumed situation, the marker will have effected the incoming connection to the line link terminal of call waiting circuit 01 before the four-second time-out interval of the timer. The operation of relay ASA(15) causes the operation in FIG. 17 of the auxiliary sleeve memory relay ASM(17) in a circuit extending from ground in FIG. 17, over make contact 3 of relay ON(15), make contact 1 of relay ASA(15), break contact 1 of relay ASM(17), to battery through the winding of relay ASM(17), which locks to ground under the control of its own make contact 1 and make contact 11 of relay ON(15).

At this time, customer S02 of FIG. 11 is presumably still busy in the previous connection over its usual line link frame terminal in FIG. 11 with a second call having been connected to the line link frame terminal in FIG. 14 of call waiting circuit 01; and, the marker will have released, leaving the call waiting circuit 01 in supervisory control of the two connections. The status of the circuits at this time will now be reviewed. In FIG. 11, hold magnets LHOO(5)(11) and HM02(28) are operated holding closed the CW LK crosspoint in FIG. 11 for vertical 02 and level 01 and the usual line link frame crosspoint involved in the original connection to customer S02. Relay RS(14) of FIG. 14 is held operated from ground on lead S1(01) supplied over horizontal and vertical wires 4 of the closed CW LK crosspoint in FIG. 11 from ground on the network sleeve lead S02, which is holding operated the line link hold magnet LHOO(5)(11). Relay RS(14) holds operated relay RSA(15) of FIG. 15. The CW LK hold magnet HM02(18) is being held operated by ground on lead HM02 in FIG. 28 from FIG. 11 back over the vertical and horizontal wires 5 on lead HM(01) from FIG. 13 into FIG. 15, thence through diode ON, over make contact 5 of relay ON(15) and break contact 9 of relay CRL(17) over lead ON(01) into FIG. 29 to ground over make contact 9 of relay CB1(28). Relay ON(15) of FIG. 15 is held operated on that ground at the lower terminal of diode ON in FIG. 15. The call waiting busy relay CB1(28) of FIG. 28 is held operated through its own make contact 1, lead CB(01) into FIG. 15, and to ground over make contacts 2 and 4 in parallel of relays ON(15) and ASA(15). The supervisory relay S(14) is held operated over the tip and ring loop from customer S02 in FIG. 11 and over the vertical and horizontal wires 0 and 1 of the CW LK into FIG. 14 on the tip and ring leads T(01) and R(01) from FIG. 13, the circuit being completed in FIG. 14 from lead T(01), over break contacts 4 and 2 of relays NT(17) and TN(17), through the upper winding of relay S(14), thence over break contact 10 of relay TR(16) and make contact 8 of relay RSA(15) to the tip lead T1(01) into FIG. 13, and from lead R(01) in FIG. 14, over break contacts 10 and 4 of relays NT(17) and TN(17), through the lower winding of relay S(14), thence over break contact 8 of relay TR(16) and make contact 9 of relay RSA(15) to ring lead R1(01) into FIG. 13, the tip and ring leads T1(01) and R1(01) from FIG. 14 into FIG. 13 extending over horizontal and vertical wires 2 and 3 of the CW LK into FIG. 11 and to the tip and ring leads T02 and R02 at the line link frame where the loop continues and is completed via the original busy connetion of customer S02. Relay SM(16) in FIG. 16 is held operated from the timer TM2, the input terminal I of which is ungrounded due to the opening of break contact 7 in FIG. 16 of relay ON(15). Relay TRA(16) in FIG. 16 is held operated as previously described under the control of make contact 1 of relay ON(15). Relay AS(14) in FIG. 14 is held operated from ground on the sleeve lead S(01) from the line link frame to which the new incoming call connection has been made. Relay AS(14) holds operated relay ASA(15). Relay SR1(15) is held operated by make contact 8 of relay ON(15). Relay H1(15) is held operated under the control of make contact 8 of relay RS(14), its own make contact 5, and make contact 4 of relay ON(14). In FIG. 17, relay ASM(17) is held operated under the control of make contact 11 of relay ON(15). All other relays of the call waiting circuit 01 are at the moment released.

In the CW LK circuitry of FIGS. 6 through 13 and 18 through 29, all relays are released except EP1(19), and EP2(19), CB1(28) and hold magnet HM02(28).

The line link marker connector of FIG. 30 and the line link connector of FIG. 31 are released, as are all of the relays of the marker in FIGS. 32 through 42. The marker release is controlled basically by the operation in FIG. 36 of relays DIS1(114)(36) and DIS2(114)(36) and the release in FIG. 32 of relay FLG(115)(32), all as in Busch, thus releasing relay FLG(32) and relays CWC1(39), CWC2(39), RCY2(35), RCY3(42), RCY4(42), RCY5(42) and LLI(178)(42).

IRREGULARITIES DURING CALL WAITING LINK ATTACHMENT

When the marker connected with the line link frame via the line link connector of FIG. 31, one of relays LPO2(22) and NCW(22) was operated depending upon whether the called customer was or was not provided with call waiting service. If call waiting service is not provided, then relay NCW(22) would be operated to in turn cause the operation in FIG. 37 of the marker relay NCW(37), thus completing the circuit from FIG. 38 into FIG. 35 for causing the operation of the line busy relay LB(90)(35) so as to set the second incoming call to busy tone. If, as is the case with customer S02 of FIG. 11, the called line is provided with call waiting service, relay LP02(22) will be operated. However, if all call waiting circuits should be busy, as indicated by the operation of each of the busy relays CB1(28) through CB11(28), then grounded lead TE in FIG. 24 from FIG. 23 would extend over make contacts 5 of all of the relays CB11(28) through CB1(28) to lead BY back into FIG. 23, et cetera to cause the operation of the marker relay NCW(37) with the same busy tone connection as above.

It will be recalled, in connection with timer TM of FIG. 26, that with relay CWS1(25) operated and relay OFH(29) released, the operation of relay LK2(26) removed the last ground from terminal I of the timer TM to permit the measurement of an interval of about 125 ms, at the end of which time the return busy tone relay RTB(26) would be operated. During the normal course of events relay OFH(29), as previously described, would operate to signify that the customer S02 was still off-hook; and, such operation of relay OFH(29) would reground terminal I of timer TM in FIG. 26 to prevent the operation of relay RTB(26). If, on the other hand, an off-hook condition of customer S02 does not exist, so as to operate relay OFH(29), before the end of the 125 ms interval of timer TM in FIG. 26, then relay RTB(26) will operate under the control of timer TM and break contact 3 of relay OFH(29). The operated relay RTB(26) locks operated relay ONH(29) under the control of make contacts 8 and 12 of relays ONH(29) and RTB(26); and, relay RTB(26) opens at its break contact 8 in FIG. 29 the potential operating path for relay OFH(29) to prevent a subsequent off-hook condition from becoming effective. The check relay CK(26) is operated under the control of break contact 2 of relay OFH(29) and make contact 10 of relay RTB(26). With relays RTB(26), CK(26) and ONH(29) operated, the ground in FIG. 25 is prevented from extending to the number group terminal NG1 through NG11 in FIG. 25 and instead is extended over make contacts 11 and 2 and 10 of relays RTB(26) and CK(26) and ONH(29) to lead HMS into FIG. 23, thence over make contact 2 of relay HMS(26) to lead NCW, which extends to the marker to cause the operation of relay NCW(37) with the same busy tone connection as above.

If, while performing its integrity checks, the CW LK finds the combination of relays OFH(29), CK(26) and ONH(29) operated or the combination of relays RTB(26) and CK(26) operated with relay OHN(29) released, the lead XCW is grounded from FIG. 28 into the line link connector of FIG. 31 to cause the operation of FIG. 28 of the stop progress relay SP(28) and to ground lead XCW into FIG. 38 of the marker. The first circuit extends from ground in FIG. 26, over make contact 6 of relay HMS(26), break contact 4 of relay LK(28), make contact 1 of relay LK1(26), make contact 1 of relay DCT(26), make contact 7 of relay CWS1(25), make contacts 1 and 1 and 12 of relays OFH(29) and CK(26) and ONH(29), lead XCW1 into FIG. 28 to battery through the winding of relay SP(28) and to lead XCW into FIG. 31. The second circuit extends from ground in FIG. 25, over make contacts 11 and 2 of relays RTB(26) and CK(26), break contact 10 of relay OHN(29) to lead XCW into FIG. 28 to the winding of relay SP(28) and into the connector circuit of FIG. 31. The operation of relay SP(28) prevents the CW LK from further processing the call and causes the CW LK to await a release signal from the marker. Break contact 3 of relay SP(28) in FIG. 28 and break contact 2 of relay SP(28) in FIG. 29 open circuits to prevent further progress of the CW LK circuitry; and, break contact 12 of relay OHN(29) prevents lead CWK from FIG. 26 toward the marker from being grounded as a CW LK check signal. Lead XCW from FIG. 28 into FIG. 31, if grounded extends over make contact 2 of connector relay MCW(31), lead XCW into FIG. 38 of the marker, thence over make contact 6 of relay CWS(38) or make contact 6 and break contact 1 of relays DT6(32) and CWF(38), break contact 1 of relay TBL(38), lead XCW into FIG. 36, to battery through the winding of relay XAVGB(196)(36), which operates to cause the marker to make a trouble record and then release from the attached circuits. In FIG. 36, the operation of relay MXT(197)(36) is prevented upon the operation of relay XAVGB(196)(36), (1) during a dial tone connection marker function by means of the opened break contact 8 of relay DT6(32) and (2) by the opened break contact 10 of relay CWF(38) upon a call waiting link failure indicated by the operation of relay CWF(38).

If, as previously mentioned, relay CWF(38) is operated to indicate some sort of CW LK failure condition, relay TRR(194)(36) in FIG. 36 is operated to cause the taking of a trouble record prior to the operation of the disconnect relays DIS1(114)(36) and DIS2(114)(36) to initiate marker release. Relay CWF(38) can be operated under a number of circumstances. For instance, the marker must receive a signal from the CW LK to operate relay CWK(37) before the marker can complete a connection. If on a dial tone connection, a continuity failure is encountered with relay CWK(37) operated, relay RLH(38) operates in a circuit from ground in FIG. 38, over make contacts 11 and 5 of relays DT6(32) and RCT(107)(-), break contact 2 of relay RCTA(107)(-), make contact 9 of relay CWK(37), break contact 9 of relay CWF(38), and to battery through the winding of relay RLH(38), which locks over its make contact 12 to ground at make contact 11 of relay DT6(32). Relay CWF(38) operates under control of make contact 8 of relay RLH(38) and locks under control of make contacts 8 and 9 of relays CWF(38) and DT6(32). A circuit is then completed from ground in FIG. 38, through the winding of relay RLK(38), over make contacts 11 and 1 and 6 of relays RLH(38) and CWF(38) and DT6(32) to lead XCW into FIG. 31, over make contact 2 of connector relay MCW(31), lead XCW into FIG. 28 and to battery through the winding of the stop progress relay SP(28) of the CW LK. Relays SP(28) and RLK(38) operate in series, relay SP(28) stopping further CW LK circuit progress, and relay RLK(38) forcing the operation in FIG. 33 of relays CON1(107)(33) and CON2(107)(33) over make contact 2 of relay RLK(38) so the marker can proceed to complete the call and to make a trouble record, as above discussed, due to the operation of relay CWF(38)—see FIG. 36—, prior to release. Also, if on a dial tone connection relays NCW(37) and CWK(37) of the marker are both operated or both released when the marker relay SL(109)(-) operates to initiate the ground and continuity testing, the grounded lead SL1 into FIG. 38 from FIG. 33 will extend over make contacts 1 and 2 and 1 and 3 of relays DT6(32) and XVGB(196)(34) and CWL(37) and DT6(32) as before except that instead of continuing over entire make contact 11 of relay NCW(37) and break contact 6 of relay CWK(37) or over break contact 11 of relay NCW(37) and make contact 8 of relay CWK(37) to lead SL2 back into FIG. 33, the circuit will extend over either break contacts 11 and 8 of relays NCW(37) and CWK(37) or make contacts 11 and 6 of relays NCW(37) and CWK(37) to the winding of relay CWF(38), which will thereupon operate and lock. Under the latter circumstances, ground in FIG. 38 will extend over break contact 1 of relay RLH(38), make contact 1 of relay CWF(38) and make contact 6 of relay DT6(32) into FIG. 31 over lead XCW to cause the operation of the stop progress relay SP(28) of the CW LK, et cetera, make contact 12 of relay CWF(38) in FIG. 38 thereupon also completing the loop of leads SL1 and SL2 between FIGS. 38 and 33 to enable the marker to continue its functions. Many other situations might cause the operation of the CW LK failure relay CWF(38) of the marker and/or the stop progress relay SP(28) of the CW LK. It is not considered necessary to go into all of these situations in detail since the relay contact configuration in FIG. 38 particularly will render such situations apparent to those skilled in the art.

It was assumed previously that the marker established the second connection to the line link frame terminal in FIG. 14 of the call waiting circuit 01 within four seconds before the timer in the upper-right of FIG. 17 could time-out. If that situation had not occurred, then tube T in FIG. 17 would have fired to operate relay T(17), which would have locked operated over make contact 2 of the still operated relay T2(17), make contact 9 of relay T(17), to plus 130 volts through resistor T2. Furthermore, none of the relays AS(14), ASA(15), and ASM(17) would have operated. The operation of relay T(17) causes the operation of the release relay CRL(17) from the locking ground at the right terminal of relay T2(17), over make contact 12 of relay T(17), break contact 10 of relay ASM(17), break contacts 2 and 10 of relays BY(17) and CH(17), to battery through the winding of relay CRL(17), which locks over its own make contact 8 to ground at make contact 3 of relay ON(15). The opening of break contact 9 of relay CRL(17) in FIG. 15 removes ground from the winding of relay ON(15) and from lead HM(01) into FIG. 13, thus to allow the release of call waiting circuit off-normal relay ON(15) and of the CW LK hold magnet HM02(28). The release of hold magnet HM02(28) releases the crosspoint in FIG. 11 to allow the tip and ring leads T02 and R02 of customer S02 in FIG. 11 to again be connected over break contacts 1 and 3 of hold magnet HM02(28) directly to the line link frame terminal as though the CW LK had never entered into the connection. The opening of the crosspoint also causes the release of relays RS(14), RSA(15), and S(14) of the call waiting circuit. The release of relays ON(15) and S(14), et cetera, releases relays TRA(16), SM(16), H1(15), and T2(17) of the call waiting circuit and allows the release of relay SR1(15) at the end of its slow release time (about 300 ms). These circuit functions would return the CW LK and the call waiting circuit to normal.

TRANSFERS BETWEEN CALL WAITING PARTIES

With call waiting customer S02 of FIG. 11 connected to call waiting circuit 01 of FIGS. 14 through 17 via the CW LK, with customer S02 connected through the call waiting circuit to the first party with whom customer S02 is presently busy, and with the second party connected to the line link terminal of the call waiting circuit, customer S02 is alerted to the second call and may transfer from one to the other.

It will be recalled, as a result of the connection of the second party to the call waiting circuit line link terminal in FIG. 14, that relays RS(14), S(14), ON(15), AS(14), RSA(15), ASA(15), SR1(15), H1(15), TRA(16), SM(16) and ASM(17) were left operated, assuming that the marker completed the second party connection before (within 4 seconds) the timer in the upper-right of FIG. 17 could time-out.

Upon the operation of relay ASA(15), circuit operations are initiated to supply to the busy call waiting customer S02 of FIG. 11 a signal to the effect that a second call is waiting for an answer. The signal consists of a tone on the ring lead and ground on the tip lead toward the line of customer S02 for about 300 ms. Relay TN(17) is operated in a circuit extending from ground in FIG. 17, over make contacts 3 and 1 of relays ON(15) and ASA(15), make contact 12 of relay RSA(15), break contacts 12 and 10 of relays NT(17) and T1(17), make contact 1 of relay SM(16), to battery through the winding of relay TN(17). The operation of relay TN(17) opens the operating circuit in FIG. 15 of relay SR1(15) which thereupon is allowed to release in about 300 ms if its operating circuit is allowed to remain open that long. During the time that relay SR1(15) remains operated with relay TN(17) operated, the tone is supplied to customer S02 and a bridge is maintained across the windings of relay S(14) in FIG. 14 to hold relay S(14) operated. The bridge across relay S(14) in FIG. 14 is through resistor H3, make contacts 9 and 1 of relay TN(17) and SR1(15) and break contact 7 of relay NT(17). Tone from the call waiting tone supply in FIG. 14 is applied through capacitor HT, make contacts 6 and 4 of relays SR1(15) and TN(17) and break contact 10 of relay NT(17) to the ring lead R(01) extending back to the ring lead R02 in FIG. 11 of the customer S02 line circuit. Ground in FIG. 14 is applied to the tip lead T(01) over make contacts 12 and 2 of relays SR1(15) and TN(17) and break contact 4 of relay NT(17), tip lead T(01) of FIG. 14 extending back to the tip lead T02 in FIG. 11 of the customer S02 line circuit. The customer SO2 thus receives the tone for about 300 ms, at which time relay SR1(15) releases to open at its make contact 1 in FIG. 14 the bridge across relay S(14) and to again close at its break contacts 7 and 9 in FIG. 14 the tip and ring leads T(01) and R(01) to the windings of relay S(14), which thereupon remains operated. The tone is removed from the line of customer S02 by the opening of make contacts 12 and 6 in FIG. 14 of relay SR1(15). Upon the release of relay SR1(15), relay T1(17) operates in FIG. 17 through break contact 3 of relay SR1(15) and make contact 12 of relay TN(17). Upon the operation of relay T1(17) the timer in FIG. 17 is started timing an interval of about 10 seconds during which the call waiting customer may or may not transfer to the second call.

If it is desired to transfer to the second call, customer S02 will depress the switchhook (go on-hook) for an interval of time greater than about 0.2 seconds and less than about 1.2 seconds. An on-hook condition lasting less than 0.2 seconds is treated as not a transfer signal. An on-hook condition lasting more than 1.2 seconds is treated as a disconnect. These time intervals are determined by the timers TM3 and TM1 in FIG. 16. Any on-hook signal by customer S02 will be detected by the release of relay S(14) due to the opening of the tip and ring leads T(01) and R(01) into FIG. 14.

If customer S02 does not go on-hook within the 10 second time-out interval of the timer in FIG. 17, relay S(14) remains operated, relay TN(17) releases at the time of the operation of relay T1(17), the operation of which starts the 10 second timing interval, and relay SR1(15) reoperates upon the release of relay TN(17). When the timer of FIG. 17 times-out, relay T(17) operates when tube T fires, as previously described. The operated relay T(17) locks under control of make contact 8 of relay T1(17), break contact 2 of relay T2(17) and make contact 9 of relay T(17). Also, the operated relay T(17) extinguishes tube T by opening its break contact 9 in FIG. 17. The operation of relay T(17) reoperates relay TN(17) over make contact 11 of relay T(17). The reoperation of relay TN(17) allows relay SR1(15) to release in about 300 ms during which time, as above, customer S02 is supplied with the call waiting tone and the holding bridge is applied in FIG. 14 to relay S(14). Upon the release of relay SR1(15), the tone is removed, the bridge across relay S(14) is removed, and the tip and ring leads T(01) and R(01) are again connected to relay S(14). The circuits remain as they are left, no further tone signal being provided to customer S02.

When customer S02 goes on-hook, relay S(14) releases to start the timers TM3 and TM1 of FIG. 16, as will be described, and to operate relay TR(16) in a circuit extending from ground in FIG. 16, over break contact 5 of relay S(14), make contact 9 of relay SM(16), break contact 5 of relay TR(16), to battery through the winding of relay TR(16), which locks over its own make contact 5, break contacts 4 and 9 of relays CWS(15) and SB(16) to ground over break contact 5 of relay S(14). Relay TR(16), in operating, causes the operation in FIG. 17 of relay NT(17) under control of make contacts 11 and 1 and 3 of relays ON(15) and TR(16) and TRA(16), relay NT(17) locking in a circuit extending from its winding, over its own make contact 5, break contact 9 of relay T2(17), through diode NT, make contact 12 of relay NT(17), and to ground over make contacts 12 and 1 and 3 of relays RSA(15) and ASA(15) and ON(15). The operation of relay NT(17) releases relays TN(17) and T1(17). The release of relay T1(17) releases relay T(17) if it had operated due to a time-out of the timer of FIG. 17. The operation of relay TR(16) establishes a bridge in FIG. 14 across the leads T1(01) and R1(01) toward the first party in preparation for a transfer, the circuit extending in FIG. 14 from tip lead T1(01), through resistor H1, make contact 4 of relay H1(15) and make contact 11 of relay TR(16) to ring lead R1(01). Also the operation of relay TR(16) completes an additional locking circuit in FIG. 17 for relay NT(17) over make contact 1 of relay TR(16) and make contact 3 of relay TRA(16). Also, in FIG. 14, the operation of relay TR(16) applies ground and battery to the upper and lower windings of relay S(14) so that a return to an off-hook condition of customer S02 can reoperate relay S(14) with relay TR(16) operated. The latter circuits extend in FIG. 14 (1) from ground, through resistor T and over make contacts 2 and 12 and 10 of relays ASM(17) and TRA(16) and TR(16) to the upper winding of relay S(14) and (2) from battery, through resistor R and over make contacts 4 and 10 and 8 of relays ASM(17) and TRA(16) and TR(16) to the lower winding of relay S(14); so that, when customer S02 of FIG. 11 goes off-hook, the loop between leads T(01) and R(01) in FIG. 14 will be completed to cause relay S(14) to reoperate.

One of three situations may occur incident to customer S02 going on-hook to release relay S(14), as above mentioned. A momentary on-hook situation lasting less than about 0.2 seconds will be treated as not a transfer signal. An on-hook situation lasting more than about 0.2 seconds and less than about 1.2 seconds is treated as a transfer signal. An on-hook situation lasting more than 1.2 seconds is treated as a disconnect by customer S02. The disconnect situation will be described in a subsequent section.

When customer S02 goes on-hook, relay S(14) will release, as above, due to the opening of the loop of the tip and ring leads T(01) and R(01) in FIG. 14. In FIG. 16 both of the timers TM1 and TM3 are held inoperative by ground on their terminals I under the control of make contacts 5 and 4 of relays S(14) and SM(16) and break contact 6 of relay SB(16). Upon the release of relay S(14), ground is removed from terminals I of the timers TM1 and TM3, which thereupon start to measure their respective time intervals of 1.2 seconds and 0.2 seconds.

If relay S(14) is reoperated, by customer S02 going back off-hook, before the 0.2 second time-out interval of timer TM3, ground will be reapplied by make contact 5 of relay S(14) to the terminals I of both timers, thus resetting both timers to normal with neither relay SB(16) nor TO(16) having been operated. The reoperation of relay S(14) causes the release of relay TR(16), thus removing the bridge in FIG. 14 across leads T1(01) and R1(01) toward the first party on the line link frame terminal of customer S02 and again, over break contacts 10 and 8 of relay TR(16), completing the insertion of relay S(14) into the tip and ring loop between the first party and customer S02. This situation in effect constitutes a disregard of the short on-hook flash from customer S02.

If the on-hook signal from customer S02 lasts for at least 0.2 seconds but not as long as 1.2 seconds, timer TM3 in FIG. 16 will time-out to cause the operation of relay SB(16), followed by reoperation of relay S(14) before timer TM1 can time-out. Thus, relay SB(16) will operate, followed by the reoperation of relay S(14) with relay T0(16) remaining released. This situation will cause a transfer of the customer S02 line from the first party on leads T1(01) and R1(01) in FIG. 14 to the second party on leads T(01) and R(01) at the line link frame terminal in FIG. 14 of the call waiting circuit. In FIG. 16 relay TR(16) will remain operated under control of its own make contact 5, break contact 4 of relay CWS(15), make contact 9 of relay SB(16) and make contact 1 of relay ON(15). Relay TRA(16) remains operated in a circuit extending over its own make contact 5, break contact 5 of relay CWS(15), make contact 3 of relay SB(16), make contact 7 of relay TR(16), make contact 9 of relay SM(16), to ground over break contact 5 of relay S(14). The reoperation of relay S(14), before the time-out interval of 1.2 seconds of timer TM1 in FIG. 16, causes the release of relay TRA(16), which at its break contacts 12 and 10 in FIG. 14 extends the tip and ring leads T(01) and R(01) from the customer S02 to the tip and ring leads T(01) and R(01) of the second party under the control also of make contacts 10 and 8 of relay TR(16) and make contacts 2 and 5 of relay ASA(15). The customer S02 is thus in conversation connection with the second party over the call waiting circuit line link frame terminal in FIG. 14; and, a bridge in FIG. 14, over make contact 11 of relay TR(16) and make contact 4 of relay H1(15) and through resistor H1, maintains a hold condition on the first party over the call waiting circuit connection to the line link frame terminal in FIG. 11 of customer S02. The release of relay TRA(16) causes the operation of relays H2(15) and CWS(15) in FIG. 15 from ground, over make contact 4 of relay ON(15), make contact 6 of relay TR(16), break contact 2 of relay TRA(16) to the winding of relay CWS(15) and over make contact 5 of relay SM(16) and break contact 9 of relay H2(15) and make contact 8 of relay AS(14) to the winding of relay H2(15). Relay CWS(15) locks operated over its own make contact 1 independently of relay TRA(16); and, relay H2(15) locks operated under the control of its own make contact 9 and make contact 8 of relay AS(14). In FIG. 16, ground is maintained at the I terminals of timers TM1 and TM3 to release relay SB(16) and to maintain these timers inactive. Terminal I of timer TM1 is grounded through diode T0 and make contacts 4 and 5 of relays SM(16) and S(14). Terminal I of timer TM3 is grounded through diode SB and over make contact 6 of relay SB(16), make contact 2 of relay TR(16), break contact 4 of relay TRA(16) and make contact 3 of relay CWS(15). Upon the release of relay SB(16), terminal I of timer TM3 is maintained grounded over break contact 6 of relay SB(16). Upon the operation of relay CWS(15), relay TR(16) remains locked operated in a circuit extending from its winding, over its make contact 5, over make contact 4 of relay CWS(15), over break contact 11 of relay SB(16), and to ground over make contact 1 of relay ON(15).

At this time the relays which are operated in the call waiting circuit of FIGS. 14 through 17 are S(14), RS(14), AS(14), ON(15), H1(15), CWS(15), H2(15), RSA(15), ASA(15), TR(16), SM(16) and NT(17); customer S02 is in conversation with the second party connected to the line link frame terminal in FIG. 14 of the call waiting circuit; and, a holding bridge exists in FIG. 14 across the tip and ring leads extending to the first party connected to the line link frame terminal in FIG. 11 of customer S02.

If customer S02 should desire to transfer back to the first party, another momentary (longer than 0.2 seconds and less than 1.2 seconds) on-hook signal will accomplish the transfer. During such an on-hook interval, relay S(14) will release and relay SB(16) will operate due to a time-out of timer TM3 in FIG. 16. The release of relay S(14) allows the timers TM1 and TM3 to become activated by ungrounding their terminals I. The release of relay S(14) causes relay TRA(16) to reoperate in the previously described circuit in FIG. 16 under the control of make contact 9 of relay SM(16) and break contact 5 of relay S(14), relay TRA(16) locking from its winding, over its own make contact 5, make contact 5 of relay CWS(15), break contact 1 of relay SB(16), to ground at break contact 5 of relay S(14). The operated relay TRA(16) places a bridge in FIG. 14 across the second party line via resistor H2, make contact 10 of relay H2(15) and make contact 9 of relay TRA(16). Also in FIG. 14, the operated relay TRA(16), at its transfer contacts 12 and 10, disconnects the upper and lower windings of relay S(14) from the tip and ring leads T(01) and R(01) of the second party line and connects resistance ground and resistance battery to those upper and lower windings. If the on-hook condition does not last long enough (less than 0.2 seconds) to cause the operation of relay SB(16) in FIG. 16, relay S(14) will reoperate to release relay TRA(16) and to deactivate both timers TM1 and TM3 of FIG. 16, thus to leave the connections as they were. If, on the other hand as assumed, the on-hook transfer signal lasts for at least 0.2 seconds, timer TM3 will time-out to operate relay SB(16) followed by the reoperation of relay S(14) before timer TM1 can time-out. The operation of relay SB(16) maintains relay TRA(16) locked operated over make contacts 5 and 1 and 1 of relays CWS(15) and SB(16) and ON(15); and, the operation of relay SB(16) maintains relay TR(16) locked operated over make contacts 5 and 4 of relays TR(16) and CWS(15), make contacts 11 and 7 of relays SB(16) and TRA(16), make contact 9 of relay SM(16) and break contact 5 of relay S(14). Upon the reoperation of relay S(14), at the end of the on-hook signal from customer S02, ground is reapplied to terminal I of timer TM1 in FIG. 16 to deactivate that timer and relay TR(16) is released, to in turn release relay CWS(15), the release of which grounds terminal I of timer TM3 to cause the release of relay SB(16). In FIG. 14, the release of relay TR(16) removes the bridge across the first party tip and ring leads T1(01) and R1(01) into FIG. 13 and reestablishes the connection of the upper and lower windings of relay S(14) to those first party tip and ring leads over break contacts 10 and 8 of relay TR(16). Customer S02 is now in conversation connection again with the first party on the line link frame terminal in FIG. 11 of customer S02 and a holding bridge exists across the line link frame terminal in FIG. 14 of the second party. Another on-hook transfer signal from customer S02, as above described, would cause the reoperation of relay TR(16) and CWS(15), the release of relay TRA(16) and the reoperation and re-release of relay SB(16) to transfer customer S02 back to the second party with a holding bridge across the first party line. Such transfers can be made back and forth as desired.

ON-HOOK DISCONNECT BY CUSTOMER S02

As previously mentioned, if customer S02 goes on-hook for longer than 1.2 seconds, such an on-hook signal will be treated as a disconnect. Under such circumstances, not only will timer TM3 of FIG. 16 time-out to operate relay SB(16) but also timer TM1 will time-out to operate relay TO(16).

It will be assumed for now that such an on-hook situation occurs when customer S02 is in conversation connection with the first party on leads T1(01) and R1(01) from FIG. 14 into FIG. 13 and when customer S02 has never transferred to the second party on the call waiting circuit line link frame terminal in FIG. 14. In FIG. 14 relays S(14), RS(14) and AS(14) will be operated; in FIG. 15 relays ON(15), H1(15), RSA(15) and ASA(15) will be operated; in FIG. 16 relays SM(16) and TRA(16) will be operated; and in FIG. 17 relays T(17), T1(17), ASM(17) and TN(17) will be operated. Upon the release of relay S(14) at the start of the on-hook interval, relays TR(16) and NT(17) will operate, as previously described, to in turn cause the release of relays TN(17), T1(17) and T(17). Relay SB(16) will operate at the end of 0.2 seconds as previously described. At about 1.2 seconds, with relay S(14) still released, timer TM1 of FIG. 16 will time-out to cause relay T0(16) to operate. Relay T0(16), in operating, releases relay H1(15), which opens at its make contact 4 in FIG. 14 the bridge across the leads T1(01) and R1(01) into FIG. 13 toward the customer S02 line link frame terminal in FIG. 11. The opening of this loop causes the release, as in Busch, of the circuits connected to that line link frame terminal. This release takes about 300 ms by example, at which time ground is removed from the sleeve lead S02 and 650 in FIG. 11 to release the line link hold magnet LH00(5)(11), the line relay LOO(5)(11) not reoperating due to the open bridge in FIG. 14. When ground is removed from the sleeve lead S02 in FIG. 11, relay RS(14) releases, releasing relay RSA(15). In the meantime, the operation of relay T0(16) causes the regrounding in FIG. 16 of terminal I of timer TM2 which becomes deactivated to release relay SM(16). The release of relay SM(16) continues to hold terminal I of timer TM2 grounded through diode SM and break contact 12 of relay SM(16), thus holding relay SM(16) released. The release of relay SM(16) applies ground over its break contact 4 in FIG. 16 to terminal I of timer TM1 to deactivate timer TM1 and release relay T0(16). Also, in FIG. 16, the release of relay SM(16) releases relay TRA(16), the release of which causes the operation in FIG. 15 of relay CWS(15) under the control of break contact 2 of relay TRA(16), relay CWS(15) locking over its make contact 1 independently of relay TRA(16). The operation of relay CWS(15) reapplies ground to terminal I of timer TM3 in FIG. 16 to deactivate timer TM3 and release relay SB(16).

The release of relay RSA(15), as above, releases relay NT(17) to cause the reoperation in FIG. 15 of relay SR1(15). At this point in the call waiting circuit, in FIG. 14 relay AS(14) is operated, in FIG. 15 relays ON(15) and CWS(15) and ASA(15) and SR1(15) are operated, in FIG. 16 relay TR(16) is operated, and in FIG. 17 relay ASM(17) is operated. In the CW LK, in FIG. 19, the entry point relays EP1(19) AND EP2(19) are operated and in FIG. 28 the CW LK hold magnet HM02(28) and the call waiting circuit busy relay CB1(28) are operated.

When the second call was connected to the line link appearance in FIG. 14 of the call waiting circuit, as previously described, with relays TRA(16) and ASA(15) operated, the marker was able to satisfy its continuity test of the termination by means of network CTA in FIG. 14 across the tip and ring leads T(01) and R(01) via make contact 9 of relay TRA(16) and ringing current from the connected trunk was supplied over leads T(01) and R(01) into FIG. 14. However, even though ringing induction was returned to the second calling party to inform that party of the ringing condition, no ringing signal was supplied to customer S02 since in FIG. 14 the tip and ring circuit was open at break contacts 12 and 10 of relay TRA(16). The ringing from the connected trunk will have continued, assuming that the second party remains off-hook, until a ringing trip bridge is established across the leads T(01) and R(01) into the line link frame from FIG. 14.

As previously discussed in connection with transfers, a transfer by customer S02 to the second party would have cut off the ringing by connecting the customer S02 loop across the incoming tip and ring leads. In the presently assumed circumstances, with customer S02 disconnecting without having answered the second call, upon the release of relay TRA(16) with relay TR(16) still operated, the ringing signal from the incoming trunk will extend in FIG. 14 from the line link frame terminal of call waiting circuit 01, over the tip and ring leads T(01) and R(01) to the on-hook customer S02 of FIG. 11. Tip lead T(01) in FIG. 14 extends over make contact 2 of relay ASA(15), break contact 12 of relay TRA(16), make contact 10 of relay TR(16), through the upper winding of relay S(14), and over break contacts 2 and 4 of relays TN(17) and NT(17) to tip lead T(01) into FIG. 13, et cetera and to the tip lead T02 of customer S02 in FIG. 11; and, ring lead R(01) in FIG. 14 extends over make contact 5 of relay ASA(15), break contact 10 of relay TRA(16), make contact 8 of relay TR(16), the lower winding of relay S(14), and over break contacts 4 and 10 of relays TN(17) and NT(17), to the ring lead R(01) into FIG. 13, et cetera, to the ring lead R02 of customer S02 in FIG. 11. This causes the telephone at customer S02 to ring. Customer S02 may go off-hook to answer that call, whereupon the ringing will be tripped in the incoming trunk and relay S(14) will operate in the loop established over the second party connection at the line link frame terminal in FIG. 14 of the call waiting circuit. Relay S(14), in operating, will, as previously described, allow timer TM2 in FIG. 16 to operate relay SM(16) after about 30 ms, and the operated relay SM(16) will operate relay H2(15) as previously described. The regular line link appearance of customer S02 in FIG. 11 will remain idle with conversation being held between customer S02 and the second party over the CW LK to the line link frame terminal in FIG. 14 of the call waiting circuit.

If customer S02 disconnects after having transferred to the second party with a hold condition maintained on the first party connection, relay TRA(16) will have been reoperated upon customer S02 going on-hook and relays SB(16) and T0(16) will have operated, as before, upon the time-outs of timers TM1 and TM3 of FIG. 16. The operation of relay TO(16) causes the release of relays SM(16) and H1(15). The release of relay H1(15) removes the holding bridge across leads T1(01) and R1(01) in FIG. 14 toward the first party connection at the line link frame terminal in FIG. 11 of customer S02, thus to release that connection after the time-out in the connected trunk. The release of relay SM(16) releases relay T0(16), releases relay TR(16) and operates relay CRL(17) in a circuit extending from ground in FIG. 17, over make contact 3 of relay ON(15), make contact 12 of relay H2(15), break contact 11 of relay SM(16), break contacts 2 and 10 of relays BY(17) and CH(17), to battery through the winding of relay CRL(17), which locks to off-normal ground over its own make contact 8. In the meantime, the release of relay TR(16) releases relay CWS(15), which in turn releases relay SB(16). The operation of relay CRL(17) causes the release of the call waiting circuit by releasing the off-normal relay ON(15) and the CW LK hold magnet HM02(28) by opening break contact 9 of relay CRL(17) in FIG. 15. The release of hold magnet HM02(28) releases the crosspoint in FIG. 11 to release relays RS(14) and RSA(15). The release of relay ON(15) releases relays TRA(16), CRL(17), NT(17) and H2(15). Upon the release of relay H2(15), the connected trunk on the second party connection in FIG. 14 will eventually time-out to release relays AS(14) and ASA(15), the release of relays ON(15), ASA(15) and CRL(17) causing the release in FIG. 28 of the CW LK call waiting circuit busy relay CB1(28). The release of relay CB1(28) and hold magnet HM02(28) in the CW LK returns the CW LK circuitry to normal, leaving only the entry point relays EP1(19) and EP2(19) operated. Also, the entire call waiting circuit of FIGS. 14 through 17 is returned to normal in condition to be reused.

If the customer S02 disconnects after having transferred from the second party (call waiting circuit line link appearance in FIG. 14) back to the first party (customer S02 line link appearance in FIG. 11), then prior to customer S02 going on-hook the following circuit situation will have prevailed, as previously described. In the CW LK, hold magnet HM02(28), call waiting circuit busy relay CB1(28) and entry point relays EP1(19) and EP2(19) will be operated; and, the crosspoint in FIG. 11 for vertical 02 and level 01 will be closed. The line link frame hold magnet LHOO(5)(11) in FIG. 11 for customer S02 will be operated with the associated line relay LOO(5)(11) released. In FIG. 14, relays S(14), RS(14) and AS(14) will be operated. In FIG. 15, relays ON(15), H1(15), H2(15), RAS(15) and ASA(15) are operated. In FIG. 16 relays TRA(16) and SM(16) are operated. In FIG. 17 relays ASM(17) and NT(17) are operated. Customer S02 in FIG. 11 is in conversation with the first party over the closed crosspoint through FIG. 14 and back to the customer S02 line link terminal in FIG. 11; and, in FIG. 14, a holding bridge is provided by make contacts 10 and 9 of relays H2(15) and TRA(16) across the line link terminal of the call waiting circuit. If customer S02 goes on-hook for longer than 1.2 seconds, relays S(14) releases to operate relays TR(16) and SB(16) as previously described. Upon the operation of relay T0(16), as previously described, relays SM(16) and H1(15) are released. The release of relay SM(16) operates relay CRL(17) and releases relays T0(16) and TRA(16). The operation of relay CRL(17) releases the off-normal relay ON(15) and the CW LK hold magnet HM02(28). The release of hold magnet HM02(28) opens the closed crosspoint in FIG. 11 thus to release relays RS(14) and RSA(15). The release of relay ON(15) releases relays TR(16) and H2(15), the release of relay TR(16) releasing relay SB(16). The release of relay ON(15) also releases relays NT(17) and ASM(17). Eventually, the trunk connected to the second party in FIG. 14 will time-out when the loop circuit thereto is opened in FIG. 14, the time-out causing the release of relay AS(14), in turn releasing relay ASA(15) and the circuit busy relay CB1(28) in the CW LK. All circuits will thus be returned to normal with the entry point relays EP1(19) and EP2(19) of the CW LK operated and with customer S02 (on-hook) being connected again in FIG. 11 over break contacts 1 and 3 of hold magnet HM02(28) to the regular line link frame appearance.

DISCONNECTS BY PARTIES OTHER THAN CUSTOMER S02

With customer S02 connected to two parties via the call waiting circuit, as previously described, either party could disconnect, for one reason or another, when on a hold condition. As above discussed, it is assumed that a first party connection exists to the line link frame terminal of customer S02 in FIG. 11 and over the CW LK into the call waiting circuit of FIGS. 14 through 17 and that a second party connection exists to the line link frame terminal of the call waiting circuit in FIG. 14.

Assuming that a transfer has taken place so that a conversation connection exists between customer S02 and the second party and so that a hold condition exists on the first party connection, in FIG. 14 relays S(14) and AS(14) and RS(14) will be operated; in FIG. 15 relays ON(15), H1(15), CWS(15), H2(15), RSA(15) and ASA(15) will be operated; in FIG. 16 relays TR(16) and SM(16) will be operated; in FIG. 17 relay NT(17) will be operated; in FIG. 28 of the CW LK, hold magnet HM02(28) and relay CB1(28) will be operated; and, the crosspoint in FIG. 11 for vertical 02 and level 01 will be closed. Customer S02 in FIG. 11 will have its tip and ring leads T02 and R02 connected over leads T(01) and R(01) into FIG. 14 and through the windings of relay S(14) and to the tip and ring leads T(01) and R(01) of the second party connection at the line link frame terminal of the call waiting circuit. The tip and ring leads T02 and R02 in FIG. 11 from the line link terminal of customer SO2, and to which the first party connection exists, will extend over leads T1(01) and R1(01) into FIG. 14 to the holding bridge of resistor H1 and make contacts 4 and 11 of relays H1(15) and TR(16).

If the first party disconnects while on a hold condition in FIG. 14, the sleeve ground on leads S02 and 650 in FIG. 11 will be removed and the line link hold magnet LHOO(5)(11) will be released. Removal of ground from the sleeve lead S02 in FIG. 11 releases relay RS(14), the release of which releases relays RSA(15) and H1(15). The released relay H1(15) removes, at its make contact 4 in FIG. 14, the holding bridge toward the customer S02 line link terminal in FIG. 11. The released relay RSA(15) releases relay NT(17) to reoperate relay SR1(15) and to again prepare the path in FIG. 14 to the call waiting tone supply. The line link frame terminal in FIG. 11 of customer S02 is now available to accept another connection.

If another call should be directed to customer S02 while connected to the call waiting circuit but with its regular line link frame terminal available, the marker will find the terminal idle and the network CTR in FIG. 14 will, through make contact 11 of relay TR(16), provide the marker with a satisfactory continuity test when the new connection is made to the line link terminal of customer S02 in FIG. 11 with the hold magnet LH00(5)(11) again operated. Ground reapplied to sleeve leads S02 and 650 in FIG. 11 will reoperate relay RS(14), which will reoperate relay RSA(15). Relay RSA(15), in operating, operates relay TN(17) from ground in FIG. 17, over make contacts 3 and 1 and 12 of relays ON(15) and ASA(15) and RSA(15), break contacts 12 and 10 of relays NT(17) and T1(17), make contact 1 of relay SM(16), to battery through the winding of relay TN(17). The operation of relay TN(17) starts the slow release (about 300 ms) of relay SR1(15) and applies call waiting tone to customer S02 during the release time of relay SR1(15). When relay SR1(15) releases, the call waiting tone is removed and relay T1(17) is operated to start the ten second timing of the timer in FIG. 17 and to release relay TN(17). Relay TN(17), in releasing, reoperates relay SR1(15) to prepare for another spurt of tone if required. If customer S02 does not answer the tone signal, by giving an on-hook transfer signal within 10 seconds, tube T in FIG. 17 fires to operate relay T(17), which will extinguish tube T and reoperate relay TN(17) to provide a second spurt of tone to customer S02. The reoperation of relay TN(17) releases relay SR1(15), which removes the tone and reestablishes the talking path, all as previously described. Customer S02 may effect an on-hook transfer or a disconnect as above described.

If the second party should disconnect while on a hole condition in FIG. 14, with customer S02 in conversation with the first party on the line link terminal of customer S02 in FIG. 11, relay AS(14) will release, to in turn release relays H2(15) and ASA(15) to remove the holding bridge in FIG. 14 toward the line link terminal of the call waiting circuit. Relay ASA(15) releases relay NT(17) to prepare the tone supply path in FIG. 14. Relay SR1(15) is reoperated upon the release of relay NT(17). Relays S(14), RS(14), ON(15), H1(15), RSA(15), SR1(15), TRA(16), SM(16), SB(16) and ASM(17) remain operated.

If a new call arises for customer S02, the marker will enter the line link frame, as usual, via the line link connector circuitry, part of which is shown in FIG. 31. As before, the marker will find the line link terminal of customer S02 busy and will operate relays CWS1(25) and CWS2(25) in FIG. 25 of the CW LK, which releases relay EP1(19), leaving relay EP2(19) operated. Relay LP02(22) in the CW LK is operated, as before, and with the CW LK hold magnet HM02(28) operated, a circuit is completed in FIG. 23 to operate the circuit reserve relay CRS(23) from ground in FIG. 23, over break contact 11 of relay DTM(19), make contacts 5 of relays CWS2(25) and CWS1(25), break contacts 8 of relays EP4(19) and EP3(19), make contact 8 of relay EP2(19), break contact 7 of relay EP1(19), break contact 1 of relay HMS(26), make contacts 1 and 2 of relay LP02(27) and hold magnet HM02(28), to battery through the winding of relay CRS(23), which operates to indicate that a call waiting circuit has been previously switched into the line circuit of customer SO2. It must then be ascertained whether the line link terminal in FIG. 14 of that call waiting circuit is busy or idle.

The operation of relay CRS(23) initiates circuit action to ascertain if the call waiting circuit line link terminal is busy or idle. In FIG. 28 of the CW LK, the operation of relay CRS(23) applies plus 130 volts through resistor CRS and make contacts 3 and 2 of relays CRS(23) and LP02(22) to lead HM02 at the operated hold magnet HM02(28), thus to maintain that hold magnet operated and to extend the high positive battery potential over lead HM02 into FIG. 11, thence over the vertical and horizontal wires 5 into FIG. 13, lead HM(01) into FIG. 15, thence over make contact 12 of relay ON(15) and through diode CI to ground through the winding of relay CI(15), which operates as a circuit status interrogation signal. If the line link frame terminal of the call waiting circuit is busy, relays AS(14) and ASA(15) will be operated; and, if that terminal is idle, relays AS(14) and ASA(15) will be released.

If the call waiting circuit line link terminal is busy, the operation of relay CI(15) causes the operation in FIG. 17 of relay BY(17) from ground, over make contact 4 of relay CI(15), break contact 4 of relay BY(17), make contacts 8 and 3 of relays ASM(17) and ASA(15), to battery through the winding of relay BY(17), which locks under control of its own make contact 4 and make contact 4 of relay CI(15). The operated relay BY(17) applies ground over its make contact 1 in FIG. 17 to lead BY(01) into FIG. 23 of the CW LK, thence over break contact 2 of relay HMS(26) to lead NCW into FIG. 31, thence over make contact 3 of connector relay MCW(31), lead NCW into FIG. 37 of the marker to cause the operation of relay NCW(37), the operation of which, as previously discussed, will result in the marker connecting the new calling party to busy tone and releasing from the line link frame.

If the call waiting circuit line link frame terminal in FIG. 14 is idle, the operation of relay CI(15) causes the operation in FIG. 17 of the circuit hold relay CH(17) from ground in FIG. 17, over make contact 4 of relay CI(15), break contact 4 of relay BY(17), make contact 8 of the operated memory relay ASM(17), break contact 3 of relay ASA(15), break contacts 8 and 10 of relays CH(17) and CRL(17), to battery through the winding of relay CH(17). The operation of relay CH(17) extends its operating ground in FIG. 17 over its make contact 11 and break contact 6 of relay T2(17) to lead CP(01) into FIG. 24 of the CW LK, thence to battery through the winding of relay CP1(24). Relay CP1(24) extends its operating ground over its own make contact 8 to lead CR from FIG. 24 into FIG. 23, thence over make contact 1 of relay CRS(23) and over lead CRS from FIG. 23 into FIG. 26 and thence over lead CWK into FIG. 31, over make contact 4 of connector relay MCW(31), and over lead CWK into FIG. 37 of the marker, where the ground on lead CWK will cause the operation of the marker call waiting check relay CWK(37) as soon as the call waiting circuit "directory number" relays of FIG. 40 are properly operated, as previously discussed, to enable the marker to consult a number group circuit for the call waiting circuit line link location. Upon the operation of the marker check relay CWK(37), the marker will release, as before, from the line link frame to thereby release relay CRS(23) in FIG. 23 of the CW LK, the release of which releases relay CI(15) in FIG. 15 of the call waiting circuit. Upon the release of the marker from the line link frame and from the CW LK, all relays of the CW LK are released, as previously described, except relay EP2(19) and relay EP3(19), which operates when relay CWS1(25) releases, and hold magnet HM02(28) and relay CB1(28). In FIG. 17 of the call waiting circuit, upon the release of relay CI(15), relay CH(17) remains operated under the control of break contact 10 of relay CRL(17), make contact 8 of relay CH(17), break contact 1 of relay ASA(15) and make contact 3 of relay ON(15). Relay T2(17) operates from ground in FIG. 17 at the left of break contact 1 of relay ASA(15), over make contact 12 of relay CH(17) and break contact 2 of relay CI(15) to the winding of relay T2(17). The operation of relay T2(17), as previously described, allows the timer in FIG. 17 to start timing the four second interval during which the marker must connect the new call to the line link terminal in FIG. 14 of the call waiting circuit.

If the marker fails to connect the new call before the timer of FIG. 17 times-out, as previously described, tube T fires, relay T(17) operates and locks, tube T is extinguished, and relays CH(17), T2(17) and T(17) release to leave the call waiting circuit's line link frame terminal in FIG. 4 available for another connection.

If the marker connects the new call before the timer of FIG. 17 times-out, relays AS(14) and ASA(15) will reoperate and relays CH(17) and T2(17) will release. Following these relay functions, as above discussed, the call waiting circuit supplies call waiting tone to customer S02, et cetera.

MISCELLANEOUS CONSIDERATIONS

In previous description, a level-zero connection on the CW LK has been shown to provide the so-called "dialing protection" feature for dial tone connections and for permanent signal connections. It will be apparent to those skilled in the art that other special types of connections could be afforded the level-zero treatment so that such connections would not be disturbed or interfered with by any attempt to connect thereto a call waiting circuit.

FIGS. 6 through 13, arranged as shown in FIG. 43 (on same sheet as FIGS. 3, 4 and 5), show by example a six-wire crossbar type of CW LK having twenty verticals and twelve horizontals or levels. It will be apparent that other configurations of crossbar links could be employed. It will also be apparent that a link other than a crossbar type could be used provided that at least one setting of such a link were identifiable as a setting reserved for the so-called "dialing protection" feature.

It will, of course, be understood that the various timers in FIGS. 16 and 17 of the call waiting circuit and in FIG. 26 of the CW LK, et cetera, could be assigned any time-out intervals desired, the ones specified in the description being typical but merely exemplary.

In FIG. 28 of the CW LK, a switch MB1 through MB11 is shown for each of the eleven call waiting circuits. Each switch is the means for rendering the associated call waiting circuit appear "busy" to the CW LK control circuitry. As is apparent from FIG. 28, the operation of any such switch will cause the operation of the associated call waiting circuit busy relay, such as relays CB1(28) through CB11(28), to prevent such a circuit from being seized. Such a make-busy situation is recognizable as a well-known expedient in the switching art.

It is to be understood that the above-described arrangement is illustrative of the applications of the principles of the invention. Other arrangements may be devised by those skilled in the art without departing from the spirit and scope of the invention.

What is claimed is:

1. A switching system having a plurality of special service customer lines; a plurality of special service circuits; a switching network having a network line terminal individual to each customer line; a selectively settable special service switching link terminating the customer lines, the special circuits, and the network line terminals; and, control means (1) effective upon the occurrence of a normal service condition with respect to a customer line to cause a normal setting of the switching link so as to cause the customer line to be normally connected to the corresponding network line terminal without the customer line being connected to a special circuit and (2) effective upon the occurrence of a special service condition with respect to a customer line to cause a special setting of the switching link so as to cause the customer line to be specially connected to the corresponding network line terminal and to a special circuit;

wherein the improvement comprises

A. means in the control means effective upon the occurrence of one of a plurality of different types of normal service conditions to cause one of two different types of normal settings of the switching link;

B. and, means in the control means effective upon the occurrence of a special service condition with respect to a normally connected customer line to change the normal setting to a special setting only if the normal setting is a particular one of the two types of normal settings.

2. The invention defined in claim 1 wherein the changing means comprises

A. means effective for changing the particular type of normal setting to a special setting;

B. and, means effective for maintaining without change the other type of normal setting.

3. The invention defined in claim 2 wherein

A. the switching link comprises 1. a plurality of primary sets of conductors,
2. a plurality of secondary sets of conductors,
3. each customer line and the network line terminal of said customer line being terminated in separate conductors of the same primary set,
4. each special circuit being terminated in a secondary set,
5. a tertiary set of conductors for each primary set;
6. and means controllable to cause selective settings of the switching link to interconnect selected conductors;

B. the other type of normal setting connects a primary set to the corresponding tertiary set;

C. a special setting connects a secondary set to a primary set;

D. and, the maintaining means is rendered effective with respect to any customer line connected by means of the corresponding tertiary set.

4. The invention defined in claim 3 wherein

A. the switching link comprises a select-and-hold-magnet-controlled crossbar switch array wherein 1. each primary set is a vertical conductor group associated with a corresponding hold magnet,
2. each secondary set is a special horizontal conductor group associated with a corresponding special select magnet,
3. and each tertiary set is a normal horizontal group associated with a corresponding normal select magnet;

B. the other type of normal setting is caused by the operation of a normal select magnet and of a hold magnet;

C. a special setting is caused by the operation of a special select magnet and of a hold magnet;

D. and, the maintaining means is rendered effective with respect to any customer line connected by means of the corresponding normal horizontal group.

5. The invention defined in claim 4 wherein the normal horizontal group for each vertical group is controlled by the same normal select magnet for all vertical groups.

6. The invention defined in claim 5 wherein

A. each vertical group includes at least two subgroups of conductors;

B. each customer line terminates in one subgroup of the vertical group particular to the said customer line;

C. the network line terminal of each customer line terminates in the other subgroup of the particular vertical group;

D. each hold magnet is provided with special contacts controlled only thereby;

E. each two subgroups of the same vertical group are connected together through the special contacts of the corresponding hold magnet whenever the hold magnet is released;

F. each two subgroups of the same vertical group are connected together by means of the corresponding normal horizontal group of conductors whenever the crossbar switch crosspoint corresponding to the said same vertical group and the said normal horizontal group is held closed by an operated hold magnet corresponding to the said same vertical group;

G. and, the maintaining means is rendered effective with respect to any customer line connected through a closed crosspoint corresponding to the normal horizontal conductor group for the said customer line.

7. The invention defined in claim 6 wherein the maintaining means comprises means for ascertaining, with respect to a normally connected customer line, whether the normal connection exists by means of a closed crosspoint.

8. A telephone switching system comprising a plurality of customer lines each having a called number and each provided with call-waiting service; a plurality of call-waiting service circuits each having a called number an unreal called line; a switching network having a customer network line terminal individual to each customer line and a call-waiting circuit network terminal individual to each called-waiting circuit; a selectively settable call-waiting service switching link terminating the customer lines, the call-waiting circuits, and the customer network line terminals; and, control means (A) effective upon the occurrence of a normal service condition with respect to a customer line to cause a normal setting of the switching link so as to cause the customer line to be normally connected to the corresponding customer network line terminal without the customer line being connected to a call-waiting circuit and so as to render busy the customer network line terminal and (B) effective upon the occurrence of a call-waiting service condition with respect to a busy customer network line terminal to cause a special setting of the switching link so as to cause the customer line to be specially connected to the corresponding customer network line terminal and to a call-waiting circuit; the control means including (1) first means effective upon the occurrence of one of a plurality of different types of normal service conditions to cause one of two different types of normal settings of the switching link and (2) second means effective upon the occurrence of a call-waiting service condition with respect to a normally connected busy customer line to change the normal setting to a special setting only if the normal setting is a particular one of the two types of normal settings.

9. The invention defined in claim 8 wherein

A. the system also comprises translating means from which a network terminal location is derivable from a corresponding called number;

B. the control means includes means for registering a called number;

C. the first means comprises 1. means effective upon the occurrence of a called condition with respect to a customer line, as indicated by registration of the called number of the customer line, to derive from the translating means the corresponding network line terminal location, to test the network location for its busy-idle status, and to cause the said particular type of normal setting only if the corresponding network line terminal location is idle;
2. and, means effective upon the occurrence of a special calling condition on a customer line to cause the other type of normal setting;

D. and, the second means comprises 1. means effective upon the occurrence of a called condition with respect to a normally connected line, as indicated by registration of the called number of the customer line, to derive from the translating means the corresponding network line terminal location, to test the network line location for its busy-idle status, and to ascertain which type of normal setting exists for the busy line location;
2. means effective if the other type of normal setting exists for maintaining without change the said other type of normal setting;
3. and, means effective if the particular type of normal setting exists for changing the particular type of normal setting to a special setting.

10. The invention defined in claim 9 wherein the changing means comprises

A. means effective to substitute the called number of an idle call-waiting circuit for the registered called number of the busy customer line;

B. means effective to derive from the translating means the corresponding network terminal location of the idle call-waiting circuit;

C. and, means effective to alter the particular type of normal setting to a special setting so as to cause the busy customer line to be specially connected to the corresponding customer network line terminal and to the idle call-waiting circuit.

11. The invention defined in claim 10 wherein

A. the switching link comprises
 1. a plurality of primary sets of conductors,
 2. a plurality of secondary sets of conductors,
 3. each customer line and the network line terminal of said customer line being terminated in separate conductors of the same primary set,
 4. each call-waiting circuit being terminated in a secondary set,
 5. a tertiary set of conductors for each primary set,
 6. and, means controllable to cause selective settings of the switching link to interconnect selected conductors;

B. the other type of normal setting connects a primary set to the corresponding tertiary set;

C. the particular type of normal setting leaves a primary set disconnected from any secondary set and from any tertiary set;

D. a special setting connects a secondary set to a primary set;

E. and, the changing means is rendered effective with respect to any customer line connected by means only of the corresponding primary set.

12. The invention defined in claim 11 wherein

A. the switching link comprises a select-and-hold-magnet-controlled crossbar switch array wherein
 1. each primary set is a vertical conductor group associated with a corresponding hold magnet,
 2. each secondary set is a special horizontal conductor group associated with a corresponding special select magnet,
 3. and each tertiary set is a normal horizontal group associated with a corresponding normal select magnet;

B. the other type of normal setting is caused by the operation of a normal select magnet and of a hold magnet;

C. the particular type of normal setting is caused by the released condition of a hold magnet;

D. a special setting is caused by the operation of a special select magnet and of a hold magnet;

E. and, the changing means is rendered effective with respect to any customer line connected to only a primary set of conductors under control of its corresponding released hold magnet.

13. The invention defined in claim 12 wherein

A. the normal horizontal group for each vertical group is controlled by the same normal select magnet for all vertical groups;

B. each vertical group includes at least two subgroups of conductors;

C. each customer line terminates in one subgroup of the vertical group particular to the said customer line;

D. the network line terminal of each customer line terminates in the other subgroup of the particular vertical group;

E. each hold magnet is provided with special contacts controlled only thereby;

F. each two subgroups of the same vertical group are connected together only through the special contacts of the corresponding hold magnet whenever the hold magnet is released;

G. each two subgroups of the same vertical group are connected together only by means of the corresponding normal horizontal group of conductors whenever the crossbar switch crosspoint corresponding to the said same vertical group and the said normal horizontal group is held closed by an operated hold magnet corresponding to the said same vertical group;

H. each two subgroups of the same vertical group are disconnected from each other and are connected to a special horizontal conductor group whenever the crossbar switch crosspoint corresponding to the said same vertical group and the said special horizontal group is held closed by an operated hold magnet corresponding to the said same vertical group;

I. and, the changing means is rendered effective with respect to any customer line connected only under control of the special contacts of its corresponding released hold magnet.

14. The invention defined in claim 13 wherein the changing means comprises means for ascertaining, with respect to a normally connected line, whether the normal connection exists by means of the special contacts of a hold magnet.

* * * * *